US012798581B2

(12) United States Patent
Zhang et al.

(10) Patent No.: US 12,798,581 B2
(45) Date of Patent: Nov. 17, 2026

(54) TRAJECTORY PLANNING METHOD AND RELATED DEVICE

(71) Applicant: HUAWEI TECHNOLOGIES CO., LTD., Shenzhen (CN)

(72) Inventors: Lei Zhang, Shenzhen (CN); Yeqing Zhang, Beijing (CN); Zhousu Li, Shenzhen (CN); Xia Zeng, Shanghai (CN); Siyuan Cheng, Beijing (CN); Xinyu Wang, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 258 days.

(21) Appl. No.: 18/481,467

(22) Filed: Oct. 5, 2023

(65) Prior Publication Data

US 2024/0025412 A1 Jan. 25, 2024

Related U.S. Application Data

(63) Continuation of application No. PCT/CN2021/086226, filed on Apr. 9, 2021.

(51) Int. Cl.

*B60W 30/18* (2012.01)
*B60W 30/09* (2012.01)
(Continued)

(52) U.S. Cl.

CPC ...... *B60W 30/18163* (2013.01); *B60W 30/09* (2013.01); *B60W 30/0956* (2013.01);
(Continued)

(58) Field of Classification Search

CPC ........... B60W 30/18163; B60W 30/09; B60W 30/0956; B60W 40/02; B60W 2552/53;
(Continued)

(56) References Cited

U.S. PATENT DOCUMENTS 9,187,117 B2 * 11/2015 Spero ........................ B62D 1/28
9,229,453 B1 * 1/2016 Lee ........................ B60W 30/09
(Continued)

FOREIGN PATENT DOCUMENTS

CN 104834520 A 8/2015
CN 107065886 A 8/2017
(Continued)

OTHER PUBLICATIONS

Extended European Search Report in European Appln. No. 21935600.3, mailed on Apr. 24, 2024, 9 pages.
(Continued)

*Primary Examiner* — Lindsay M Low
*Assistant Examiner* — Brian R Kirby
(74) *Attorney, Agent, or Firm* — Fish & Richardson P.C.

(57) ABSTRACT

Trajectory planning methods and devices are provided in this disclosure. In an implementation, a method performed by a targe vehicle comprises: obtaining target information comprising at least one of a driving status of the target vehicle and first road condition information, and determining a first planned trajectory of the target vehicle based on the target information, wherein the first planned trajectory comprises a target trajectory parallel to a center line of a lane, and the target trajectory is located in an area between the center line of the lane and a boundary of the lane, or on the boundary.

20 Claims, 31 Drawing Sheets

(51) Int. Cl.
*B60W 30/095* (2012.01)
*B60W 40/02* (2006.01)

(52) U.S. Cl.
CPC ......... *B60W 40/02* (2013.01); *B60W 2552/53* (2020.02); *B60W 2554/40* (2020.02)

(58) Field of Classification Search
CPC ........... B60W 2554/40; B60W 60/001; B60W 2520/10; B60W 2556/50; B60W 30/095; B60W 30/10; B60W 30/12; G01C 21/3407
USPC ........................................................ 701/23, 41
See application file for complete search history.

(56) References Cited

U.S. PATENT DOCUMENTS

| | | | | |
|---|---|---|---|---|
| 9,821,801 | B2 * | 11/2017 | Di Cairano | B60W 30/09 |
| 10,144,420 | B2 * | 12/2018 | Yoo | B60W 30/0956 |
| 10,145,953 | B2 * | 12/2018 | Talamonti | G01S 13/931 |
| 10,569,773 | B2 * | 2/2020 | Zhao | B60W 30/0956 |
| 10,725,470 | B2 * | 7/2020 | Mahabadi | B60W 30/00 |
| 11,718,290 | B2 * | 8/2023 | Ollis | B60W 30/09 701/26 |
| 2009/0112462 | A1 * | 4/2009 | Lo | G01C 21/3632 701/533 |
| 2014/0067250 | A1 * | 3/2014 | Bone | G08G 1/167 701/301 |
| 2016/0231743 | A1 * | 8/2016 | Bendewald | B60K 35/60 |
| 2016/0304126 | A1 * | 10/2016 | Yamaoka | B60K 35/22 |
| 2017/0334460 | A1 * | 11/2017 | Arakawa | B60W 30/18163 |
| 2017/0341653 | A1 * | 11/2017 | Kubota | B60W 50/0097 |
| 2018/0038953 | A1 * | 2/2018 | Choi | G01S 13/931 |
| 2018/0058879 | A1 * | 3/2018 | Tayama | B60W 30/16 |
| 2018/0093676 | A1 * | 4/2018 | Emura | G08G 1/0962 |
| 2018/0099676 | A1 * | 4/2018 | Goto | B60W 30/10 |
| 2018/0141569 | A1 * | 5/2018 | Ishisaka | B60W 50/082 |
| 2018/0345988 | A1 * | 12/2018 | Mimura | B60W 50/082 |
| 2019/0016338 | A1 * | 1/2019 | Ishioka | B60W 30/18163 |
| 2019/0152523 | A1 * | 5/2019 | Hajika | B62D 15/025 |
| 2019/0196487 | A1 * | 6/2019 | Akiyama | B60W 30/18163 |
| 2019/0315367 | A1 * | 10/2019 | Um | G08G 1/167 |
| 2022/0009526 | A1 * | 1/2022 | Campanale | G06V 20/588 |
| 2023/0009606 | A1 * | 1/2023 | Yamamoto | B60W 30/12 |

FOREIGN PATENT DOCUMENTS

| | | | |
|---|---|---|---|
| CN | 110228473 | A | 9/2019 |
| CN | 108583578 | B | 12/2019 |
| CN | 110550029 | A | 12/2019 |
| EP | 2253522 | A1 | 11/2010 |

OTHER PUBLICATIONS

International Search Report and Written Opinion in International Appln. No. PCT/CN2021/086226, mailed on Jan. 12, 2022, 20 pages (with English translation).
EP Communication Pursuant to Article 94(3) EPC in European Appln. No. 21935600.3, mailed on Aug. 1, 2025, 8 pages.

* cited by examiner

TRAJECTORY PLANNING METHOD AND RELATED DEVICE

CROSS-REFERENCE TO RELATED APPLICATIONS

This application is a continuation of International Application No. PCT/CN2021/086226, filed on Apr. 9, 2021, the disclosure of which is hereby incorporated by reference in its entirety.

TECHNICAL FIELD

This application relates to the autonomous driving field, furthermore, to a trajectory planning method and a related device.

BACKGROUND

In the autonomous driving field, a planned trajectory needs to be determined, and an autonomous vehicle may drive along the planned trajectory, to implement autonomous driving.

To smoothly and safely reach a destination, the vehicle needs to complete various target actions: driving along a current lane, changing a lane to a target lane, avoiding an obstacle, and the like. By planning the planned trajectory including a lane changing trajectory, an avoidance trajectory, or the like, the autonomous vehicle drives along the planned trajectory, to implement lane changing or obstacle avoidance between different lanes. In this way, the foregoing target action can be completed.

In prior art, to complete the target action, the autonomous vehicle may need to change lanes for a plurality of times or turn back and forth between different lanes for a plurality of times, which affects driving stability of the autonomous vehicle. In addition, changing lanes for a plurality of times may cause large curvature of a driving route of the autonomous vehicle. Consequently, change of a driving direction of the autonomous vehicle is great, and driving safety of the autonomous vehicle is affected.

SUMMARY

Embodiments of this application provide a trajectory planning method and a related device, to plan a sub-lane-level trajectory, so that an autonomous vehicle can drive along the sub-lane-level trajectory, and passing efficiency, stability, and driving safety of the autonomous vehicle are improved by using the sub-lane-level trajectory.

A first aspect of embodiments of this application provides a trajectory planning method, where the method is applied to a calculation unit of a target vehicle, and the method includes:

The calculation unit obtains target information, where the target information includes a driving status of the target vehicle and first road condition information; and the calculation unit determines a first planned trajectory of the target vehicle based on the target information, where the first planned trajectory includes a target trajectory, the target trajectory is parallel to a center line of a lane, and the target trajectory is located in an area between the center line of the lane and a boundary of the lane, or is located on the boundary of the lane.

In this embodiment of this application, the target trajectory is parallel to the center line of the lane, and is located in the area between the center line of the lane and the boundary of the lane, or is located on the boundary of the lane. In other words, the target trajectory is a trajectory that is parallel to the center line of the lane and that is not on the center line of the lane. The target trajectory may be a substitute or an intermediate transition of a plurality of lane changing trajectories or avoidance trajectories. In some embodiments, the substitute represents: When a target action is avoiding a plurality of obstacles, the target trajectory that is parallel to and deviates from the center line of the lane by a specific distance may be determined. The plurality of obstacles are avoided by using the target trajectory, to substitute the plurality of avoidance trajectories in which turning back and forth needs to be performed in a lane-level trajectory. The intermediate transition represents: When the target action is changing a lane to a target lane and avoiding an obstacle, the target trajectory located between a center line of a start lane and a center line of the target lane may be determined. The start lane is a lane on which a driving route of the target vehicle is located. The obstacle is avoided by using the target trajectory. Compared with changing a lane from the center line of the start lane, a distance between the target trajectory and the center line of the target lane is shorter, and lane changing is more convenient. Therefore, the target trajectory is considered as the intermediate transition between the center line of the start lane and the center line of the target lane. The intermediate transition of lane changing is implemented by using the target trajectory, and the obstacle is avoided at the same time, to substitute the plurality of lane changing trajectories or avoidance trajectories that need to be switched back and forth between the center lines of the lanes in the lane-level trajectory. In this embodiment of this application, the plurality of lane changing trajectories or avoidance trajectories are substituted with the target trajectory, so that when the target vehicle drives along the first planned trajectory including the target trajectory, the target vehicle does not need to change lanes for a plurality of times to change a driving direction, to improve driving stability and safety of the target vehicle.

With reference to the first aspect, in a first implementation of the first aspect of embodiments of this application, the driving status includes a driving route of the target vehicle, the first road condition information includes motion information of at least one obstacle and/or a target lane of the target vehicle. A direction of the driving route may be parallel to the center line of the lane, or may not be parallel to the center line of the lane. An action of determining the first planned trajectory of the target vehicle by the calculation unit based on the target information may include: The calculation unit determines the first planned trajectory based on the motion information of the at least one obstacle, where the first planned trajectory indicates the target vehicle to drive to the target trajectory, and the target trajectory is on a lane on which the at least one obstacle is located or on a lane adjacent to a lane on which the at least one obstacle is located. In this case, the first planned trajectory is used to avoid the obstacle. Alternatively, the target trajectory is between a center line of a start lane and a center line of the target lane. In this case, the first planned trajectory is used to change a lane to the target lane, and the start lane is a lane on which the driving route is located.

With reference to the first implementation of the first aspect, in a second implementation of the first aspect of embodiments of this application, the obstacle is an object or a risk area that the target vehicle needs to avoid, and may include at least one of a motor vehicle, a non-motor vehicle, a pedestrian, an animal, a robot, a roadblock, an intersection, a line-of-sight blind area of the vehicle, a speed limiting area, a road end, or a concave road surface. The obstacle may include: at least one of a first obstacle on an adjacent lane of the target vehicle, a second obstacle on a first side of the driving route of the target vehicle, a third obstacle on a second side of the driving route of the target vehicle, and a fourth obstacle in front of the target vehicle in the direction of the driving route of the target vehicle.

With reference to the first aspect, or the first or the second implementation of the first aspect, in a third implementation of the first aspect of embodiments of this application, the target trajectory may be used to provide an intermediate transition between lane center lines in a lane changing process. In some embodiments, the first road condition information includes a first lane on which the target vehicle is currently located, a second lane adjacent to the first lane, and motion information of a first obstacle on the second lane. The driving status of the target vehicle includes that the target vehicle drives along a lane changing trajectory, and the lane changing trajectory points from the first lane to the second lane. An action of determining the first planned trajectory by the calculation unit may include: The calculation unit determines the first planned trajectory as a lane changing keeping trajectory based on the motion information of the first obstacle. The lane changing keeping trajectory indicates the target vehicle to drive to the target trajectory, and the target trajectory is between a center line of the first lane and a center line of the second lane.

In this embodiment of this application, if the target vehicle finds, in a process of changing a lane from the first lane to the second lane, that the target vehicle drives along the given lane changing trajectory and may collide with the first obstacle on the second lane, the target vehicle may determine that the next first planned trajectory is the lane changing keeping trajectory. The lane changing keeping trajectory includes the target trajectory, and the target trajectory is used to enable the target vehicle to drive that is between the center line of the first lane and a boundary of the second lane and that is in parallel to the center line of the lane, to avoid collision with the first obstacle in a driving state. In addition, driving along the target trajectory may keep an intermediate transition of lane changing from the first lane to the second lane. Through the intermediate transition, a distance from the center line of the second lane may be kept, to facilitate turning to the center line of the second lane at any time. In addition, collision with the obstacle on the second lane can be avoided in an intermediate transition state. On the premise of ensuring driving safety, an intermediate transition state of changing a lane to the target lane is kept, and there is no need to change a lane back to the start lane and then change a lane to the target lane in the lane-level trajectory. This reduces a quantity of lane changing times and turning driving times of the target vehicle, and improves passing efficiency, stability, and driving safety of the target vehicle.

The lane-level trajectory has three turnings, a first turning and a third turning are directed to the target lane, and a second turning is directed to the start lane. However, the two turnings in this application are both directed to the target lane. The target action includes lane changing to the target lane, and by using the trajectory planned in this embodiment of this application, on the premise of only turning to the target lane, the obstacle is avoided and a lane is changed to the target lane at the same time. Therefore, compared with the planned trajectory in this embodiment of this application, an action of the second turning to the start lane in the lane-level trajectory is redundant, and may be considered as an invalid turning.

In this embodiment of this application, the passing efficiency represents a passing distance per unit time, and the passing efficiency is negatively correlated with a quantity of invalid turning times. A larger quantity of invalid turning times indicates lower passing efficiency.

With reference to the third implementation of the first aspect, in a fourth implementation of the first aspect of embodiments of this application, after the determining the first planned trajectory as a lane changing keeping trajectory, the method further includes: The calculation unit controls, based on the lane changing keeping trajectory, the target vehicle to drive to the target trajectory; the calculation unit obtains second road condition information of the target vehicle, where the second road condition information is road condition information obtained on the target trajectory after the target vehicle drives to the target trajectory, and the second road condition information may include road condition information of the first lane and the second lane; and the calculation unit determines a second planned trajectory of the target vehicle based on the second road condition information, where the second planned trajectory indicates a next action of the target vehicle, and the next action may include any one of the following: lane changing to the second lane, continuing to drive along the target trajectory, or lane changing back to the first lane.

In this embodiment of this application, the lane changing keeping trajectory provides the intermediate transition state of lane changing from the first lane to the second lane. When the target vehicle drives in the intermediate transition state of the target trajectory, the next action may be determined based on the current road condition information. For example, when it is determined that the target vehicle does not collide with the first obstacle in a case of lane changing to the second lane, the target vehicle changes a lane to the second lane; when it is determined that the target vehicle drives along the current trajectory and may collide with the first obstacle, the target vehicle changes a lane back to the first lane; or if it is determined that the target vehicle does not collide with first obstacle when driving along the current trajectory, and the target vehicle may collide with first obstacle when a lane is changed to the second lane, the target vehicle continues to drive along the current target trajectory. In the intermediate transition state of driving along the target trajectory, the target vehicle may determine the next action based on the current road condition information. Because the target trajectory is the intermediate transition between the center line of the first lane and the boundary of the second lane, regardless of whether a lane is changed to the first lane or the second lane, a deviation degree of the target vehicle in a normal direction L (lateral) of the center line of the lane in a Frenet coordinate system is less than a deviation degree of the target vehicle in an L direction when a lane is changed between lanes. A deviation degree in an L direction is small, and the driving direction of the target vehicle needs to be changed at a smaller angle per unit time during switching from being parallel to the center line of the lane to a lane changing state, to improve driving stability and safety of the target vehicle.

With reference to the third or the fourth implementation of the first aspect, in a fifth implementation of the first aspect of embodiments of this application, the first obstacle may include at least one of a motor vehicle, a non-motor vehicle, a pedestrian, an animal, a robot, a roadblock, a fence, an intersection, a line-of-sight blind area of the vehicle, or a speed limiting area, provided that the first obstacle is an object that may collide with the target vehicle or a risk area that the target vehicle may enter. This is not limited herein.

With reference to the third or the fourth implementation of the first aspect, in a sixth implementation of the first aspect of embodiments of this application, the motion information of the first obstacle includes: In the direction of the driving route of the target vehicle, the first obstacle is located behind the target vehicle, and the first obstacle is in an acceleration state, or a distance between the first obstacle and the target vehicle in a tangent direction S (longitude) of the center line of the lane in the Frenet coordinate system is reduced; alternatively, in the direction of the driving route of the target vehicle, the first obstacle is located in front of the target vehicle, and the first obstacle is in a deceleration state or a distance between the first obstacle and the target vehicle in an S direction is reduced.

With reference to any one of the first aspect, or the first to the sixth implementations of the first aspect, in a seventh implementation of the first aspect of embodiments of this application, the target trajectory may be used to avoid the obstacle. In some embodiments, the first road condition information includes the driving route of the target vehicle and motion information of a second obstacle, the second obstacle is located on a first side of the driving route, and the driving route is parallel to the center line of the lane. An action of determining the first planned trajectory by the calculation unit may include: The calculation unit determines the first planned trajectory as a lane deviation trajectory based on the motion information of the second obstacle. The lane deviation trajectory includes a deviation trajectory and a target trajectory. The deviation trajectory indicates the target vehicle to turn to a second side until the target vehicle drives to the target trajectory. The target trajectory is on the second side of the driving route, the second side and the first side are on different sides of the driving route, and there is at least one second obstacle.

In this embodiment of this application, the second obstacle on the first side of the driving route is avoided by using the lane deviation trajectory. The target vehicle may drive on the target trajectory for a distance and then turn back to an original driving trajectory. Compared with a practice in which the lane-level trajectory immediately turns back to the original driving trajectory after turning to drive to a target avoidance area, in the target avoidance area, the target vehicle does not need to immediately turn back to the original driving trajectory, but drives along the target trajectory, to reduce curvature of a trajectory point in the area. In this way, the planned trajectory is smoother, and the driving direction of the target vehicle per unit time needs to be changed at a smaller angle, to improve driving stability and safety of the target vehicle. In this embodiment of this application, directions of the two trajectories that are divided by the target avoidance area in an L direction are opposite. The target vehicle is located at any point in the target avoidance area, and does not collide with the obstacle.

When there are a plurality of second obstacles, the lane-level trajectory needs to separately avoid the plurality of second obstacles, to be specific, an avoidance action of turning and driving to a target avoidance point for one obstacle and then turning back to the driving route is repeated for a plurality of times. In this embodiment of this application, the plurality of second obstacles are avoided on the target trajectory by turning to the target trajectory once. Compared with a plurality of turning times in an existing technology, in this embodiment of this application, a quantity of turning times of the target vehicle is reduced by using the lane deviation trajectory, and an actual turning is a turning needed for completing a target task, to reduce a quantity of invalid turning times and improve passing efficiency of the target vehicle. In addition, in this embodiment of this application, an offset distance in an L direction is further reduced, and the offset distance is reduced from a product of the avoidance distance, the quantity of second obstacles, and two to a distance from the driving route to the target trajectory. Curvature of the planned trajectory is small, the planned trajectory is smoother, and the driving direction of the target vehicle needs to be changed at a smaller angle per unit time, to improve driving stability and safety of the target vehicle. The avoidance distance is a distance between the target avoidance point and a driving trajectory.

With reference to the seventh implementation of the first aspect, in an eighth implementation of the first aspect of embodiments of this application, after the determining a first planned trajectory as a lane deviation trajectory, the method further includes: The calculation unit controls, based on the lane deviation trajectory, the target vehicle to drive to the target trajectory; and the calculation unit obtains third road condition information of the target vehicle, where the third road condition information is road condition information obtained on the target trajectory when the target vehicle drives to the target trajectory, and the third road condition information includes road condition information of the first lane and the second lane. The calculation unit determines a third planned trajectory of the target vehicle based on the third road condition information, where the third planned trajectory indicates a next action of the target vehicle, and the next action includes: turning back to the driving route, changing a lane to a center line of the adjacent lane, or continuing to drive along the target trajectory.

In this embodiment of this application, after the target vehicle turns and drives to the target trajectory, the target vehicle may choose to turn and drive to the center line of the adjacent lane, or choose to turn and drive to the driving route, or continue to drive along the target lane.

When turning and driving to the adjacent lane is selected, according to the method in this embodiment of this application, the target vehicle needs to first turn to the second side and drive to the target trajectory, and then turn to the second side and drive to the adjacent trajectory after driving along the target trajectory. In comparison with the lane-level trajectory in which the target vehicle completes the avoidance action, returns to the driving route, and then changes a lane, to be specific, needs to first turn to the second side to the target avoidance point, turn to the first side back to the driving route, and then change a lane to the second side to the adjacent lane, in this embodiment of this application, both the two turnings are turnings to a same side, and a deviation degree in an L direction includes only a distance from the driving route to the center line of the adjacent lane. Compared with the lane-level trajectory in which three turnings are needed, and the deviation degree in an L direction is the distance from the driving route to the center line of the adjacent lane plus a double avoidance distance, in this embodiment of this application, a quantity of turning times of the determined planned trajectory is small, turning directions are basically consistent and are not changed, and a deviation degree of a turning driving route in an L direction is small. This reduces a plurality of changing times of the driving direction of the target vehicle, the target vehicle needs to change the driving direction at a smaller angle per unit time, cumulative curvature change of the planned trajectory is smaller, passing efficiency is high, and driving stability and safety of the target vehicle are improved. In this embodiment of this application, accumulated curvature change represents an accumulated sum of curvature change of points on the planned trajectory.

When the target vehicle continues to drive along the target trajectory, the target vehicle may drive along the target trajectory for a distance, and then determine an action of a next step. In this embodiment of this application, an action of changing a lane back and forth between the center lines of the lanes can be substituted with driving along the target trajectory. Compared with the lane-level trajectory in which the target vehicle needs to drive to the center line of the lane before the next step, the target trajectory provides smooth connection between different actions, to improve driving stability and safety of the target vehicle.

With reference to the seventh or the eighth implementation of the first aspect, in a ninth implementation of the first aspect of embodiments of this application, the second obstacle may include at least one of a motor vehicle, a non-motor vehicle, a pedestrian, an animal, a robot, a roadblock, a fence, an intersection, a line-of-sight blind area of the vehicle, or a speed limiting area, provided that the second obstacle is an object that may collide with the target vehicle or a risk area that the target vehicle may enter. This is not limited herein.

With reference to any one of the seventh to the ninth implementations of the first aspect, in a tenth implementation of the first aspect of embodiments of this application, the lane deviation trajectory may be further used to avoid obstacles on both sides of the driving route. In some embodiments, the first road condition information may further include motion information of a third obstacle, and the third obstacle is located on the second side of the driving route. An action of determining the first planned trajectory as the lane deviation trajectory by the calculation unit may include: The calculation unit determines the first planned trajectory as the lane deviation trajectory based on the motion information of the second obstacle and the third obstacle, where the lane deviation trajectory indicates the target vehicle to turn to the second side until the target vehicle drives to the target trajectory, where the target trajectory is on the second side of the second obstacle and the first side of the third obstacle, and there is at least one third obstacle.

In this embodiment of this application, there are obstacles on both sides of the driving route. In the lane-level trajectory, the target vehicle needs to turn to the first side to avoid the third obstacle and then turn to the second side to avoid the second obstacle, or first turn to the second side to avoid the second obstacle and then turn to the first side to avoid the third obstacle. In other words, the lane-level trajectory needs two turnings to avoid the obstacles on two sides. In the method in this embodiment of this application, the target trajectory is on the second side of the second obstacle, and is also on the first side of the third obstacle. The target vehicle is driven to the target trajectory by turning to the second side once, to avoid obstacles on two sides of the driving trajectory. A quantity of turning times of the target vehicle is reduced. In addition, an offset distance in an L direction is reduced, and the offset distance is reduced from twice the avoidance distance to a distance from the driving route to the target trajectory. The driving direction of the target vehicle needs to be changed at a smaller angle per unit time, and accumulated curvature change is small, to improve passing efficiency, stability, and driving safety of the target vehicle.

With reference to the tenth implementation of the first aspect, in an eleventh implementation of the first aspect of embodiments of this application, the third obstacle may include at least one of a motor vehicle, a non-motor vehicle, a pedestrian, an animal, a robot, a roadblock, an intersection, a line-of-sight blind area of the vehicle, or a speed limiting area, provided that the third obstacle is an object that may collide with the target vehicle or a risk area that the target vehicle may enter. This is not limited herein.

With reference to any one of the seventh to the ninth implementations of the first aspect, in a twelfth implementation of the first aspect of embodiments of this application, the target trajectory may be further used to avoid an obstacle in front of the target vehicle on the driving route. In some embodiments, the first road condition information may further include motion information of a fourth obstacle, the fourth obstacle is located in front of the target vehicle on the driving route, and there is at least one fourth obstacle. An action of determining the first planned trajectory as a lane deviation trajectory by the calculation unit may include: The calculation unit determines the first planned trajectory as the lane deviation trajectory based on the motion information of the second obstacle and the fourth obstacle, where the lane deviation trajectory indicates the target vehicle to turn to the second side along the deviation trajectory until the target vehicle drives to the target trajectory, where the target trajectory is on the second side of the second obstacle and the second side of the fourth obstacle.

In this embodiment of this application, the target trajectory is on both the second side of the second obstacle and the second side of the fourth obstacle, and the target trajectory directly avoids, through one turning, the obstacle on the first side of the driving route and the obstacle in front of the driving route. There is no need to turn to avoid the obstacle on one side and then overtake the obstacle in front, or avoid the obstacle on one side after overtaking the obstacle. This reduces a quantity of turning times of the target vehicle, and improves passing efficiency, stability, and driving safety of the target vehicle.

With reference to the tenth or the eleventh implementation of the first aspect, in a thirteenth implementation of the first aspect of embodiments of this application, the target trajectory may be used to avoid obstacles on both sides of the driving route and an obstacle in front on the driving route. In some embodiments, the first road condition information may further include motion information of a fourth obstacle, the fourth obstacle is located in front of the target vehicle on the driving route, and there is at least one fourth obstacle. An action of determining the first planned trajectory as a lane deviation trajectory by the calculation unit may include: The calculation unit determines the first planned trajectory as the lane deviation trajectory based on the motion information of the second obstacle, the third obstacle, and the fourth obstacle, where the lane deviation trajectory indicates the target vehicle to turn to the second side along the deviation trajectory until the target vehicle drives to the target trajectory, where the target trajectory is on the second side of the second obstacle, the second side of the fourth obstacle, and the first side of the third obstacle.

In this embodiment of this application, the target trajectory is on both the second side of the second obstacle, the second side of the fourth obstacle, and the first side of the third obstacle, the obstacles on the two sides of the driving route and in front of the target vehicle on the driving route are directly avoided through one turning, and there is no need to change lanes for a plurality of times to avoid the obstacles on the two sides and then overtake the obstacle in front, or turn for a plurality of times to avoid the obstacles on the two sides after overtaking the obstacle in front. This reduces a quantity of turning times and a quantity of invalid turning times of the target vehicle, and the target vehicle does not need to overtake the fourth obstacle, and does not need to change a lane to another lane for overtaking. This reduces a quantity of invalid lane changing times, improves passing efficiency of driving of the target vehicle, and improves driving stability and safety of the target vehicle.

With reference to any one of the first aspect, or the first to the sixth implementations of the first aspect, in a fifteenth implementation of the first aspect of embodiments of this application, the target trajectory may be further used to turn to the first side to avoid the obstacle on the first side of the driving trajectory and avoid an obstacle in front of the driving trajectory at the same time. In some embodiments, the first road condition information includes the motion information of the second obstacle and motion information of a fourth obstacle. The second obstacle is located on the first side of the driving route, the fourth obstacle is located in front of the target vehicle on the driving route. An action of determining the first planned trajectory by the calculation unit may include: determining the first planned trajectory as the lane deviation trajectory based on the first road condition information, where the lane deviation trajectory includes a first deviation trajectory, the target trajectory, and a second deviation trajectory, and the lane deviation trajectory indicates the target vehicle to turn to the first side and drive along the first deviation trajectory to the target trajectory, and then turn to the second side and drive along the second deviation trajectory to the front of the fourth obstacle on the driving route, where the target trajectory is on the second side of the second obstacle and the first side of the fourth obstacle.

With reference to any one of the twelfth to the fifteenth implementations of the first aspect, in a sixteenth implementation of the first aspect of embodiments of this application, the fourth obstacle may include at least one of a motor vehicle, a non-motor vehicle, a pedestrian, an animal, a robot, a roadblock, an intersection, a line-of-sight blind area of the vehicle, a speed limiting area, or a road end.

With reference to any one of the seventh to the sixteenth implementations of the first aspect, in a seventeenth implementation of the first aspect of embodiments of this application, the lane deviation trajectory is used to change a lane to the target lane. In some embodiments, the driving route is on the start lane, and the first planned trajectory indicates the target vehicle to drive to the target lane. In some embodiments, the first planned trajectory may indicate the target vehicle drive to the target trajectory on the target lane. Alternatively, the first planned trajectory indicates the target vehicle to drive to the center line of the target lane, and the start lane is different from the target lane.

In this embodiment of this application, the lane deviation trajectory is connected to a lane changing trajectory, and the lane changing trajectory may be used to change a lane to the target lane. A turning trajectory or an avoidance trajectory of the lane deviation trajectory is directed to the target lane, to avoid that the target vehicle frequently turns in different directions. The lane deviation trajectory is used to change a lane to the target lane, and driving stability and safety of the target vehicle are kept in a lane changing process. In addition, if the lane deviation trajectory includes a turning opposite to a target direction in an L direction, the target trajectory closer to the target lane may be determined by determining an appropriate offset. Compared with the lane-level trajectory in which only a lane that is in an L direction and that is opposite to the target direction can be changed, in this embodiment of this application, an offset distance in an L direction is smaller, the driving direction of the target vehicle needs to be changed at a smaller angle per unit time, and cumulative curvature change is small. This improves passing efficiency, stability, and driving safety of the target vehicle. The target direction is a direction to the target lane.

With reference to the seventeenth implementation of the first aspect, in an eighteenth implementation of the first aspect of embodiments of this application, the target lane is on the second side of the start lane, and the lane changing trajectory indicates the target vehicle to change a lane from the target trajectory to the second side to the target lane.

In this embodiment of this application, a target of the lane deviation trajectory is lane changing to the target lane on the second side, the lane changing trajectory is also a turning to the second side, the turning from the start lane to the target lane is a turning to the second side, and there is no turning to the first side that is opposite to the start lane. This ensures that direction change of the target vehicle in an L direction and a deviation distance are minimized, a quantity of direction changing times of the target vehicle is minimized, and the driving direction of the target vehicle per unit time needs to be changed at a smaller angle, to improve driving stability and safety of the target vehicle.

With reference to any one of the first aspect, or the first to the eighteenth implementations of the first aspect, in a nineteenth implementation of the first aspect of embodiments of this application, an action of determining a first planned trajectory of the target vehicle by the calculation unit includes: The calculation unit determines a plurality of candidate trajectories of the target vehicle based on the target information; and the calculation unit determines the first planned trajectory from the plurality of candidate trajectories based on cost and at least one piece of cost. The cost includes: degrees of deviation of points on the plurality of candidate trajectories from the center line of the lane, curvature of the plurality of candidate trajectories, switching degrees of the plurality of candidate trajectories relative to a current trajectory, and a possibility of collision with the obstacle.

In this embodiment of this application, the calculation unit may determine an optimal trajectory by using the cost. For example, the calculation unit may determine, by using the deviation degree of the point on the candidate trajectory from the center line of the lane, a candidate trajectory with a small deviation degree as the first planned trajectory, so that the determined first planned trajectory is closer to the center line of the lane.

Alternatively, it may be determined that a candidate trajectory with small curvature is the first planned trajectory by using the curvature of the candidate trajectory, so that the target vehicle drives along the determined first planned trajectory, and a change degree of the driving direction of the target vehicle is small, to ensure driving stability and safety of the target vehicle.

Alternatively, it may be determined that a candidate trajectory with a small switching degree is the first planned trajectory based on the switching degree of the candidate trajectory relative to the current trajectory, so that the determined first planned trajectory has a smaller switching degree than a driven trajectory, and a change degree of the driving direction of the target vehicle is smaller, to improve driving stability and safety of the target vehicle.

Alternatively, it may be determined that a candidate trajectory with a low collision probability is the first planned trajectory based on the possibility that the point on the candidate trajectory collides with the obstacle, so that the target vehicle drives along the first planned trajectory, to reduce a possibility that the target vehicle collides with the obstacle, and ensure driving safety of the target vehicle.

With reference to any one of the first aspect, or the first to the nineteenth implementations of the first aspect, in a twentieth implementation of the first aspect of embodiments of this application, an action of determining a first planned trajectory by the calculation unit may include: The calculation unit determines an action sequence based on the target information, where the action sequence includes at least one target action and an action time sequence between the at least one target action; and the calculation unit determines the first planned trajectory for implementing the action sequence. The target action may include at least one of lane changing, lane changing cancellation, lane deviation, lane changing keeping, and lane keeping.

In this embodiment of this application, benefits of a plurality of future actions are considered by using the action sequence. Compared with a current technology in which only a benefit of a next action is considered, in the methods in embodiments of this application, benefits of a plurality of actions in different time sequences are comprehensively considered, so that a time sequence between the actions is properly arranged, the time sequence between the actions is more proper, and the determined planned trajectory is more smooth as a whole. Therefore, the target vehicle drives along the planned trajectory, and passing efficiency, stability, and safety are improved. For example, in the current technology, only overtaking and lane changing are considered. The overtaking is implemented by overtaking by borrowing a lane to the target lane, and the lane changing is also lane changing to the target lane. As a result, the target vehicle needs to change lanes to the target lane twice. By using the action sequence, it may be determined that a lane is first changed to the target lane, and there is no need to overtake after the lane changing. This avoids meaningless returning to the original driving route and lane changing to the target lane again, so that the planned trajectory is smoother.

With reference to any one of the first aspect, or the first to the twentieth implementations of the first aspect, in a twenty-first implementation of the first aspect of embodiments of this application, the target trajectory indicates the target vehicle to drive in parallel to the center line of the lane.

With reference to any one of the first aspect, or the first to the twenty-first implementations of the first aspect, in a twenty-second implementation of the first aspect of embodiments of this application, the target vehicle is a movable apparatus, and may in some embodiments include an autonomous vehicle, a non-autonomous vehicle, a robot, or a movable transport apparatus.

With reference to any one of the first aspect, or the first to the twenty-second implementations of the first aspect, in a twenty-third implementation of the first aspect of embodiments of this application, the calculation unit may be a trajectory planning unit on the target vehicle, or may be a trajectory planning unit outside the target vehicle, and provides the planned trajectory for the target vehicle by using a coupling relationship with the target vehicle. The coupling relationship may include a limited coupling or a wireless coupling. The planned trajectory may include a first planned trajectory, a second planned trajectory, and a third planned trajectory.

With reference to the twenty-third implementation of the first aspect, in a twenty-fourth implementation of the first aspect of embodiments of this application, the calculation unit is a trajectory planning module on a cloud server, and is coupled to the target vehicle in a wireless manner, and the target information, the first planned trajectory, the second planned trajectory, and the third planned trajectory may be wirelessly transmitted.

A second aspect of embodiments of this application provides a calculation unit, configured to determine a planned trajectory for a target vehicle. The calculation unit is configured to: obtain target information, where the target information includes a driving status of the target vehicle and first road condition information; and determine a first planned trajectory of the target vehicle based on the target information, where the first planned trajectory includes a target trajectory, the target trajectory is parallel to a center line of a lane, and the target trajectory is located in an area between the center line of the lane and a boundary of the lane, or on the boundary of the lane.

The calculation unit is configured to implement the trajectory planning method in the first aspect.

For beneficial effects of the second aspect, refer to the first aspect. Details are not described herein again.

A third aspect of embodiments of this application provides a calculation unit, including:

a processor, a memory, an input/output device, and a bus.

The processor, the memory, and the input/output device are connected to the bus.

The processor is configured to perform the method in the first aspect.

A fourth aspect of embodiments of this application provides a computer-readable storage medium, where the computer-readable storage medium stores a program. When executing the program, a computer performs the method in the first aspect.

A fifth aspect of embodiments of this application provides a computer program product. When the computer program product is executed on a computer, the computer is enabled to perform the method in the first aspect.

DESCRIPTION OF EMBODIMENTS

Embodiments of the present invention are described below with reference to the accompanying drawings in embodiments of the present invention. Terms used in implementations of the present invention are merely intended to explain specific embodiments of the present invention, but not intended to limit the present invention.

The following describes embodiments of this application with reference to the accompanying drawings. A person of ordinary skill in the art may learn that, with development of technologies and emergence of a new scenario, the technical solutions provided in embodiments of this application are also applicable to a similar technical problem.

In this specification, the claims, and the accompanying drawings of this application, the terms “first”, “second”, and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms “include”, “contain” and any other variants mean to cover the non-exclusive inclusion, so that a process, method, system, product, or device that includes a series of units is not necessarily limited to those units, but may include other units not expressly listed or inherent to such a process, method, product, or device. Embodiments of this application provide a trajectory planning method and a related device, to plan a sub-lane-level trajectory, so that an autonomous vehicle can drive along the sub-lane-level trajectory, and driving stability and safety of the autonomous vehicle are improved by using the sub-lane-level trajectory.

The following explains some terms in embodiments of this application.

Center line of a lane: indicates a driving direction of a target vehicle, is located in the middle of two boundaries of the lane, and may be virtual or may actually exist.

Figure 1A:
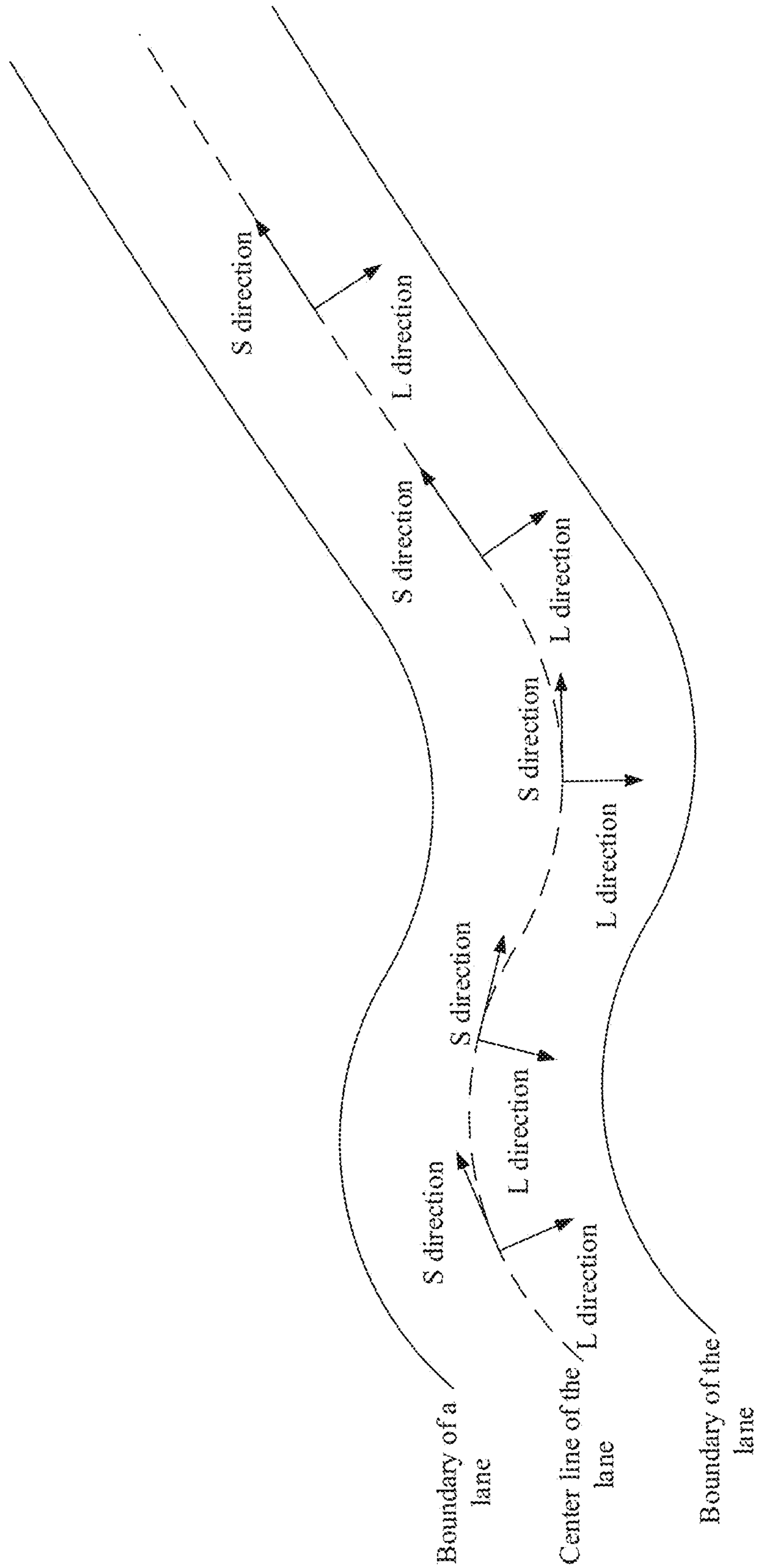
FIG. 1*a* is a schematic diagram of a direction of a sub-lane-level trajectory according to an embodiment of this application.

S direction and L direction: In the trajectory planning field, a planned trajectory is usually described by using a Frenet coordinate system. As shown in FIG. 1*a*, the Frenet coordinate system includes two coordinate axes: an S (longitude) axis and an L (lateral) axis. A direction of the S axis is a tangent direction of a reference line, and a direction of the L axis is a normal direction of the reference line. In embodiments of this application, the center line of the lane is used as the reference line, a tangent direction of the center line of the lane is an S direction, and a normal direction of the center line of the lane is an L direction.

Passing efficiency: The passing efficiency indicates a ratio of an average speed of a target vehicle in an S-axis direction to a speed limit of a road per unit time.

Stability: The stability is change of a driving direction of a target vehicle per unit time. Smaller change of the driving direction indicates higher stability.

Safety: The safety of a target vehicle is negatively correlated with the following three parameters: a possibility that the target vehicle collides with an obstacle, a possibility that the target vehicle enters a risk area, and curvature of a trajectory point.

Cumulative curvature change: The cumulative curvature change is an accumulated sum of curvature change of points on a trajectory.

Figure 1B:
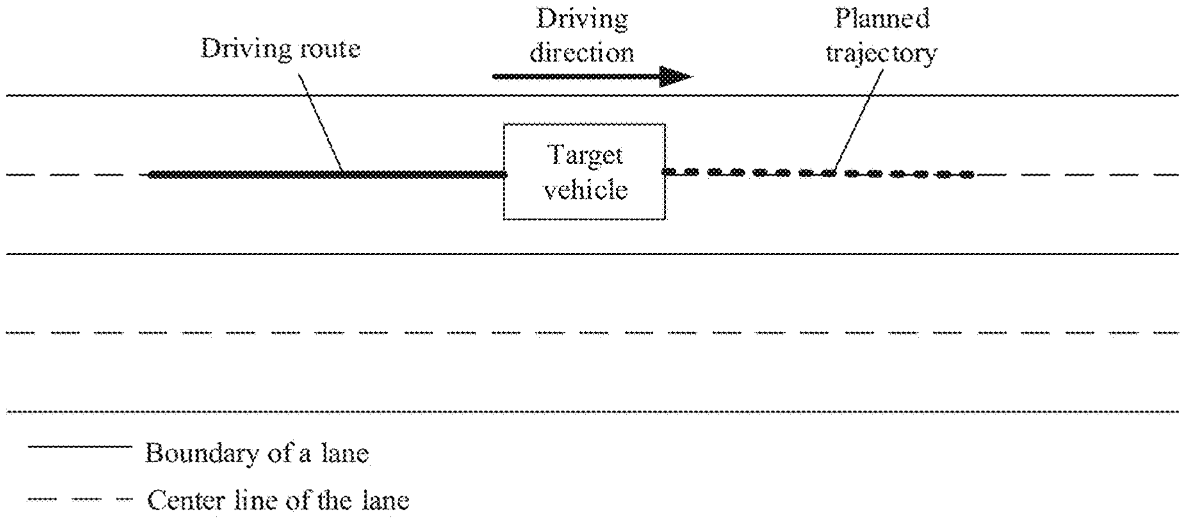
FIG. 1*b* is a schematic diagram of a driving route and a planned trajectory according to an embodiment of this application.

As shown in FIG. 1*b*, in embodiments of this application, a trajectory behind a driving direction of a target vehicle is a route on which the target vehicle has driven, and therefore is referred to as a driving route. A trajectory in front of the driving direction of the target vehicle is a trajectory on which the target vehicle is to drive, needs to be planned by a calculation unit, and therefore is referred to as a planned trajectory.

It should be noted that, in FIG. 1*b*, straight lines represent the driving route and the planned trajectory. The straight lines are merely examples of the driving route and the planned trajectory, and do not constitute a limitation on shapes of the driving route and the planned trajectory.

The planned trajectory generally includes two types of trajectories: a parallel trajectory parallel to an S direction and a connection trajectory connecting the parallel trajectory. The connection trajectory is used to implement switching of the target vehicle between different parallel trajectories.

1. Application Scenario of Embodiments of this Application

Embodiments of this application provide a sub-lane-level trajectory planning method. The method is applied to a calculation unit of a target vehicle, and configured to plan a sub-lane-level planned trajectory for the target vehicle by using the calculation unit.

In embodiments of this application, the target vehicle represents an object that drives on a lane, and is not limited to a motor vehicle that drives on a road. For example, the target vehicle may alternatively be a robot in an industrial scenario or a logistics scenario. This is not limited herein.

Similarly, the lane in embodiments of this application is not limited to a minimum unit of a passing area in which a vehicle drives in a traffic scenario, or may be a minimum unit of a passing area in which an object drives in another scenario, for example, a single transportation path of the robot in the logistics scenario. This is not limited herein. The minimum unit has boundaries and a center line. In most cases other than special cases such as avoiding an obstacle and lane changing to drive, the object moves parallel to the center line. The center line of the lane is located in the middle of two boundaries, and the center line of the lane may be virtual or may actually exist. This is not limited herein.

In embodiments of this application, a traffic scenario is used as an example for description, and a range indicated by the target vehicle and the lane and an application scope of embodiments of this application are not limited. Therefore, all “target vehicles” in embodiments of this application may be replaced with robots. This is not limited herein.

Figure 1C:
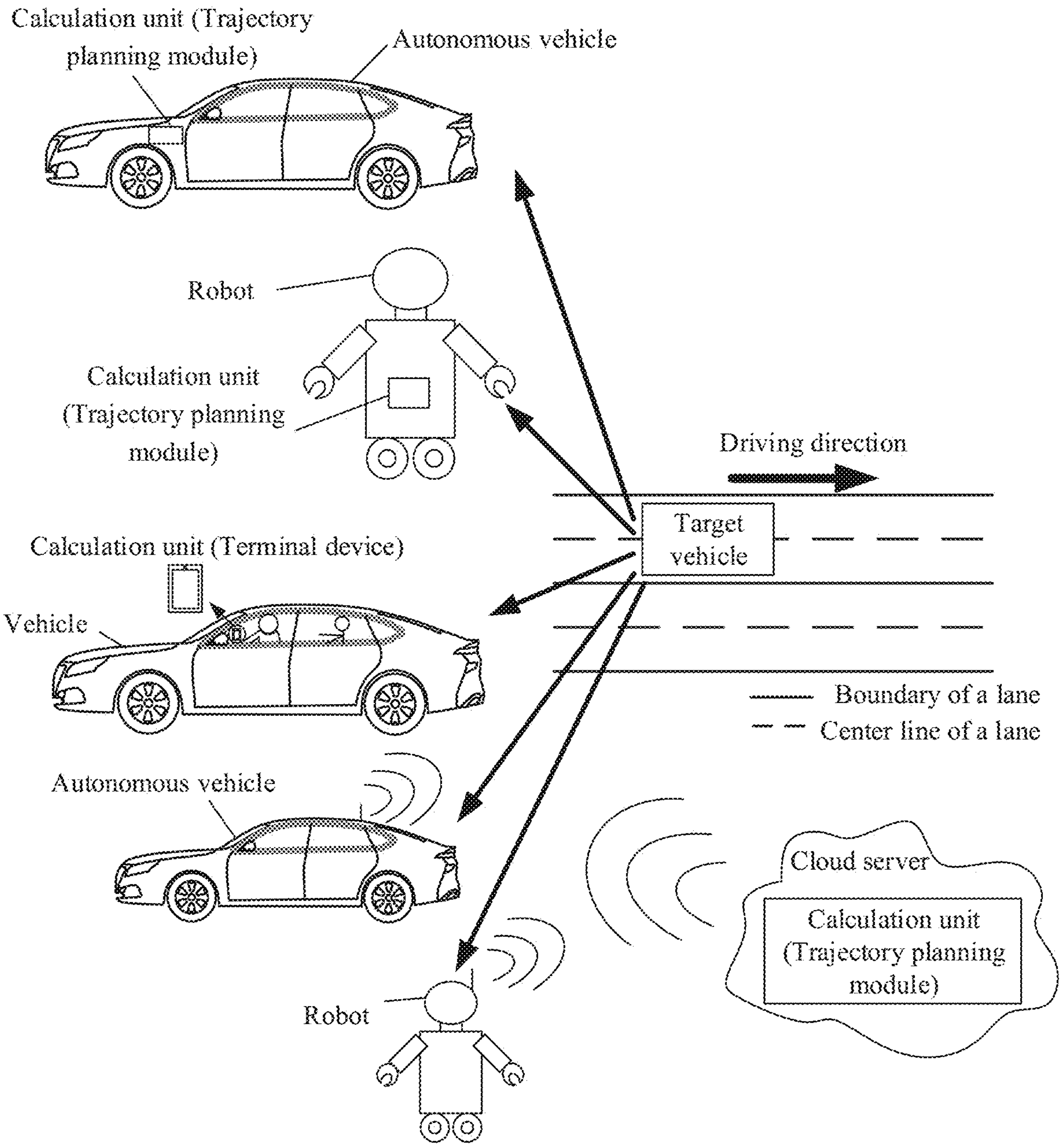
FIG. 1*c* is a schematic diagram of an application scenario of a sub-lane-level trajectory planning method according to an embodiment of this application.

As shown in FIG. 1*c*, in embodiments of this application, a calculation unit may be a part of a target vehicle, for example, a trajectory planning module of an autonomous vehicle or a robot. In addition to being a part of the target vehicle, there may be another relationship between the calculation unit and the target vehicle. For example, the calculation unit does not belong to the target vehicle, but may control a planned trajectory of the target vehicle by using a specific coupling relationship. This is not limited herein. In some embodiments, the calculation unit may alternatively be a mobile terminal, and the planned trajectory is displayed or notified to a driver, so that the driver drives the target vehicle based on the trajectory planning module, and the target vehicle drives along the planned trajectory. In some embodiments, the calculation unit may be alternatively the trajectory planning module on a cloud server, and exchanges data with an autonomous vehicle or a robot in a wireless transmission manner, and determines the planned trajectory for the autonomous vehicle or the robot.

The trajectory planning module is configured to indicate the autonomous vehicle to drive. To smoothly and safely reach a destination, the autonomous vehicle needs to complete various target actions: changing a lane to a target lane, avoiding an obstacle, and the like. The trajectory planning module determines the planned trajectory including a lane changing trajectory or an avoidance trajectory, the autonomous vehicle drives along the planned trajectory, to implement lane changing or obstacle avoidance between different lanes, so that the foregoing target action can be completed.

In a solution in a current technology, all planned trajectories are lane-level trajectories. The lane-level trajectory includes a parallel trajectory of the target vehicle on a center line of a lane and a lane changing trajectory of the target vehicle for lane changing between different lane center lines. A lane-level trajectory is described in detail in an embodiment shown in FIG. 3. Details are not described herein again.

To complete the target action, the autonomous vehicle may need to change lanes between different lanes or avoid obstacles for a plurality of times. As a result, curvature of the trajectory is large, and driving stability of the autonomous vehicle is affected. In addition, changing lanes for a plurality of times may cause large curvature of a driving route of the autonomous vehicle, so that change of a driving direction of the autonomous vehicle is great, and driving stability and safety of the autonomous vehicle are affected.

Based on various defects of the lane-level trajectory, embodiments of this application provide a concept of a sub-lane-level trajectory, and the foregoing problem is resolved by using the sub-lane-level trajectory. The following describes the sub-lane-level trajectory planning method in embodiments of this application.

2. Sub-Lane-Level Trajectory Planning Method

Figure 2:
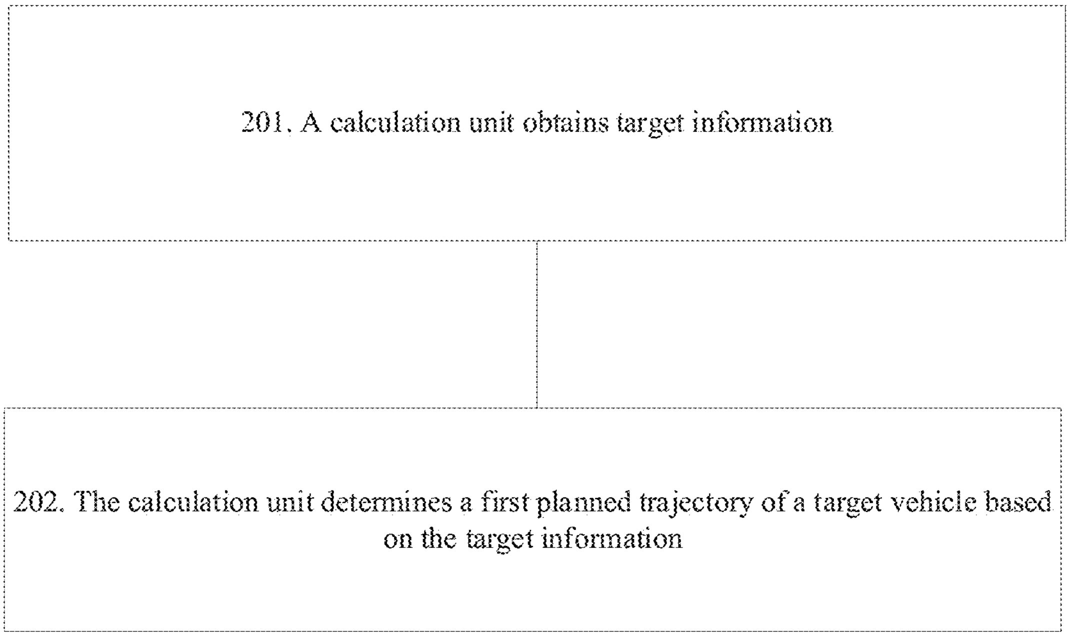
FIG. 2 is a schematic flowchart of a sub-lane-level trajectory planning method according to an embodiment of this application.

FIG. 2 is a schematic flowchart of a sub-lane-level trajectory planning method according to an embodiment of this application. The method includes the following steps.

201. A Calculation Unit Obtains Target Information.

In a process in which a target vehicle is about to drive or is driving, the calculation unit may obtain the target information, where the target information indicates a current driving status and road condition information of the target vehicle.

The driving status may include a micro posture of an ego vehicle. The micro posture of the ego vehicle may include a location of the target vehicle. In addition to the location, the micro posture of the ego vehicle may further include other information of the target vehicle, for example, a speed, an acceleration, and a turning angle relative to a center line of a lane. This is not limited herein.

The road condition information may include global recommendation information, road structure information, a dynamic or static obstacle, and the like. The global recommendation information indicates a target lane to which the target vehicle is recommended to drive. The road structure information indicates structure information such as a lane of a road. In addition to the lane, the road structure information may further indicate other information of the road, such as roadblock information and congestion information. This is not limited herein. The dynamic or static obstacle indicates information about an obstacle that may collide with the target vehicle.

In this embodiment of this application, the obstacle may be an object, for example, a dynamic or static object including a motor vehicle, a non-motor vehicle, a roadblock, a pedestrian, or an animal. In addition to the object, the obstacle may alternatively be a risk area. When the target vehicle enters the risk area, a collision may occur. For example, the risk area may be a speed-limited road section such as a blind area of the vehicle, or a campus, a road end, a collapsed road section, a concave road surface, an intersection, or the like. This is not limited herein.

202. the Calculation Unit Determines a First Planned Trajectory of the Target Vehicle Based on the Target Information.

The calculation unit may determine the first planned trajectory of the target vehicle based on the target information. The first planned trajectory includes a target trajectory, the target trajectory is parallel to the center line of the lane, and the target trajectory is located in an area between the center line of the lane and a boundary of the lane, or on the boundary.

In this embodiment of this application, the first planned trajectory is a sub-lane-level trajectory. In addition to the first planned trajectory, other trajectories planned in this embodiment of this application are all sub-lane-level trajectories. The following describes the sub-lane-level trajectory in detail.

1. Feature of a Sub-Lane-Level Trajectory

Figure 3:
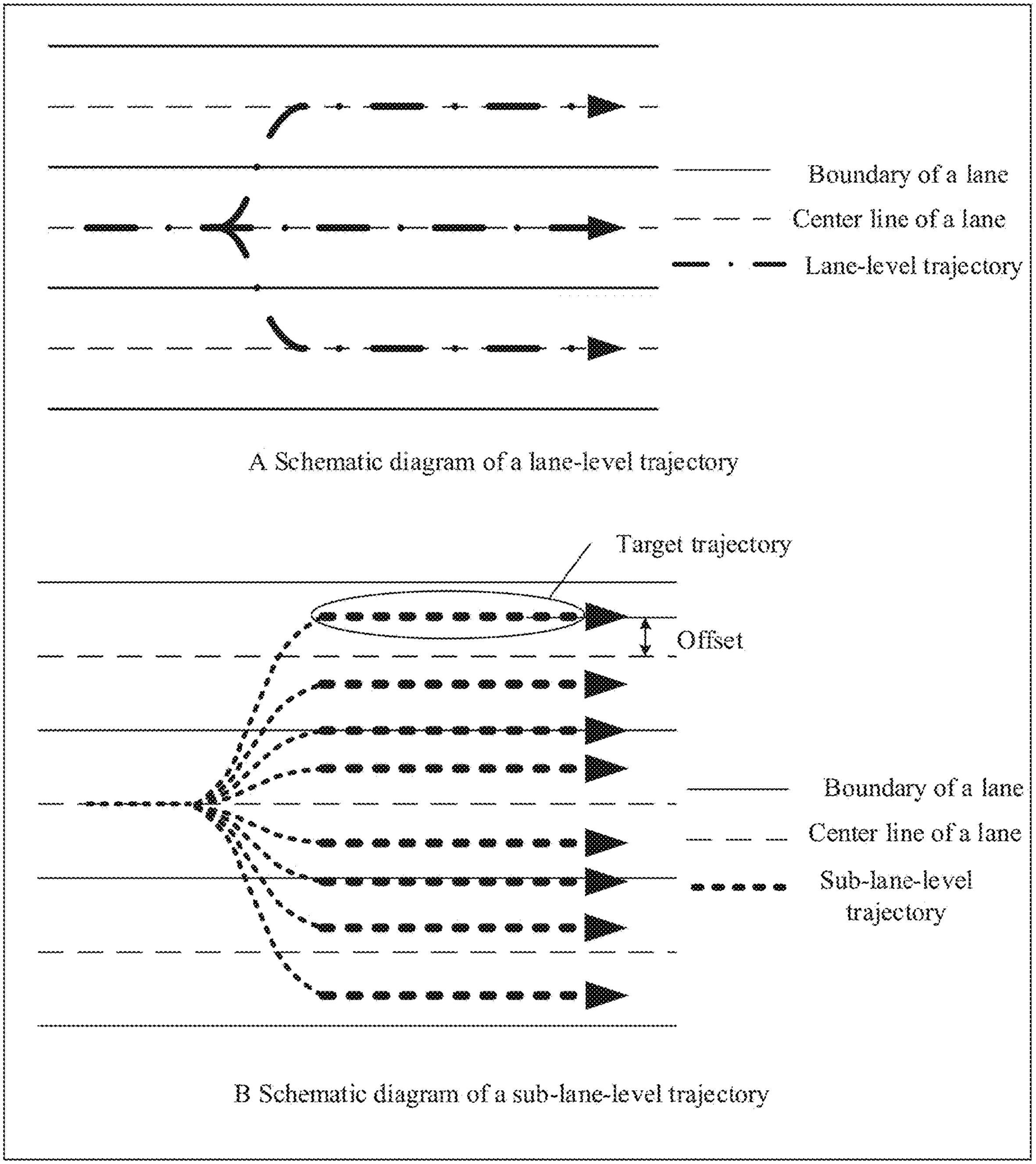
FIG. 3 is a schematic diagram of a sub-lane-level trajectory according to an embodiment of this application.

FIG. 3 is a Schematic Diagram of a Sub-Lane-Level Trajectory According to an embodiment of this application. As shown in FIG. 3, FIG. A is a schematic diagram of a lane-level trajectory. In the lane-level trajectory, all parallel trajectories are on lane center lines, and a connection trajectory is used to connect the parallel trajectories on different lane center lines.

The sub-lane-level trajectory provided in this embodiment of this application is shown in FIG. B in FIG. 3. In the sub-lane-level trajectory, the parallel trajectory is not on the center line of the lane, but between the center line of the lane and the boundary of the lane, or on the boundary of the lane. In this embodiment of this application, the parallel trajectory in the sub-lane-level trajectory is referred to as a target trajectory. A distance between the target trajectory and a center line of a target lane is referred to as an offset. Because the target trajectory is parallel to the center line of the lane, the offset may also represent a distance between the target trajectory and the center line of the target lane in an L direction.

In this embodiment of this application, an absolute value of the offset may be any value greater than 0 and less than a distance between the center line of the lane and the boundary of the lane. In other words, in a process of determining the sub-lane-level trajectory, a value of the offset may be adjusted based on a requirement, so that the target trajectory is located at any location other than the center line of the lane. However, in a current technology, the parallel trajectory can only be on the center line of the lane.

In this embodiment of this application, a planned trajectory may include a parallel trajectory whose offset is 0, namely, a parallel trajectory located on the center line of the lane. The sub-lane-level trajectory in this embodiment of this application needs to include only the target trajectory whose offset is greater than 0 and less than or equal to the distance between the center line of the lane and the boundary of the lane. In addition to the target trajectory, the sub-lane-level trajectory may also include the parallel trajectory whose offset is 0. This is not limited herein.

In this embodiment of this application, sub-lane-level trajectories include the target trajectory. To display the target trajectory in the sub-lane-level trajectories more clearly, in a diagram of the sub-lane-level trajectory in this embodiment of this application, bold processing is performed on the target trajectory. As shown in FIG. B in FIG. 3, all target trajectories parallel to the center line of the lane are represented by bold lines. In this embodiment of this application, as shown in FIG. 8 to FIG. 19*b*, all trajectories in bold in sub-lane-level trajectories are target trajectories.

Compared with the lane-level trajectory in the current technology, the sub-lane-level trajectory in this embodiment of this application mainly has the following advantages.

A. Control on a Vehicle Location is More Precise.

A parallel trajectory in a lane-level trajectory can only be on a center line of a lane. There is an offset between a parallel trajectory in the sub-lane trajectory and the center line of the lane. The offset can be adjusted as required. In other words, the parallel trajectory may be set at one location other than the center line of the lane, so that the control on the vehicle location is more precise, and control precision is improved.

On a premise that the control precision of the vehicle location is improved, when road condition information and a driving status are the same, compared with the lane-level trajectory, a more proper planned trajectory can be planned by using the sub-lane-level trajectory planning method provided in embodiments of this application. For example, a planned trajectory having higher passing efficiency, stability, and security is planned. Details are described in the embodiments shown in FIG. 8 to FIG. 19*b*. Details are not described herein again.

B. a Turning Amplitude is Small.

In the lane-level trajectory, to implement lane changing, the lane changing needs to be performed between a start lane and a target lane. To implement overtaking, a target vehicle needs to perform overtaking by borrowing a lane by using an overtaking lane. Therefore, the lane changing needs to be performed between the start lane and the overtaking lane. To be specific, to implement the lane changing or the overtaking, the lane-level trajectory may include parallel trajectories located on different lane center lines. Between the different parallel trajectories, a variation amplitude in an L direction is large, resulting in large curvature and a large turning amplitude of the entire planned trajectory. The start lane is a lane on which a driving route is located, the target lane is a lane to which the target vehicle needs to change a lane, the overtaking lane is a lane that the target vehicle passes through when overtaking by borrowing a lane, and the driving route is a route on which the target vehicle has driven.

A proper offset may be set for the sub-lane-level trajectory, so that the lane changing or the overtaking in the lane-level trajectory is converted into turning driving to a target trajectory. To implement lane changing, the target trajectory only needs to be on the target lane, and does not need to be on the center line of the target lane. Therefore, the target trajectory may be set between a center line of a lane of the start lane and the center line of the lane of the target lane. To implement overtaking, the target trajectory may be set between a center line of a lane of the driving lane and a center line of a lane of the overtaking lane. In other words, compared with the lane-level trajectory, a change amplitude in an L direction between two parallel trajectories before and after the changing can be reduced by using the target trajectory, to reduce curvature of the planned trajectory and a change amplitude of a driving direction of an autonomous vehicle, and improve driving stability and safety of the target vehicle.

C. a Planned Trajectory is Smooth.

In the lane-level trajectory, to avoid an obstacle, a target avoidance area needs to be set, so that the target vehicle turns to the target avoidance area, and then turns back to an original driving route. In embodiments of this application, an action of turning to the target avoidance area and then turning back to the original driving route to avoid the obstacle is referred to as an avoidance action, and one avoidance action includes two turnings.

In embodiments of this application, the avoided obstacle may be an object or may be a risk area. If the avoided obstacle is an object, the target vehicle is located at any point in the target avoidance area, and does not collide with the object. If the avoided obstacle is a risk area, the target avoidance area and the risk area have no intersection.

In the sub-lane-level trajectory, the target trajectory may be set in the target avoidance area, and the target trajectory is extended outside the target avoidance area, so that the target vehicle drives for a distance along the target trajectory parallel to the driving route and then turns back to the driving route. A plurality of obstacles may be avoided by using the target trajectory. Compared with the lane-level trajectory in which only one obstacle can be avoided by using one avoidance action, that is, two turnings are needed for avoiding the obstacle, in the sub-lane-level trajectory, avoiding the plurality of obstacles can be implemented through two turnings by using the target trajectory, to reduce a quantity of avoidance times and a quantity of turning times, and improve passing efficiency, stability, and driving safety of the target vehicle.

In embodiments of this application, the passing efficiency is negatively correlated with a quantity of invalid turning times or a quantity of invalid lane changing times. To be specific, a larger quantity of invalid turning times or invalid lane changing times indicates lower passing efficiency. An invalid turning and invalid lane changing are defined as a turning or lane changing that can be avoided by using the target trajectory. For example, in the foregoing case in which the plurality of obstacles are avoided by using the target trajectory, in the lane-level trajectory, other than the first and last turning, all turnings in the middle are invalid turnings.

Figure 4:
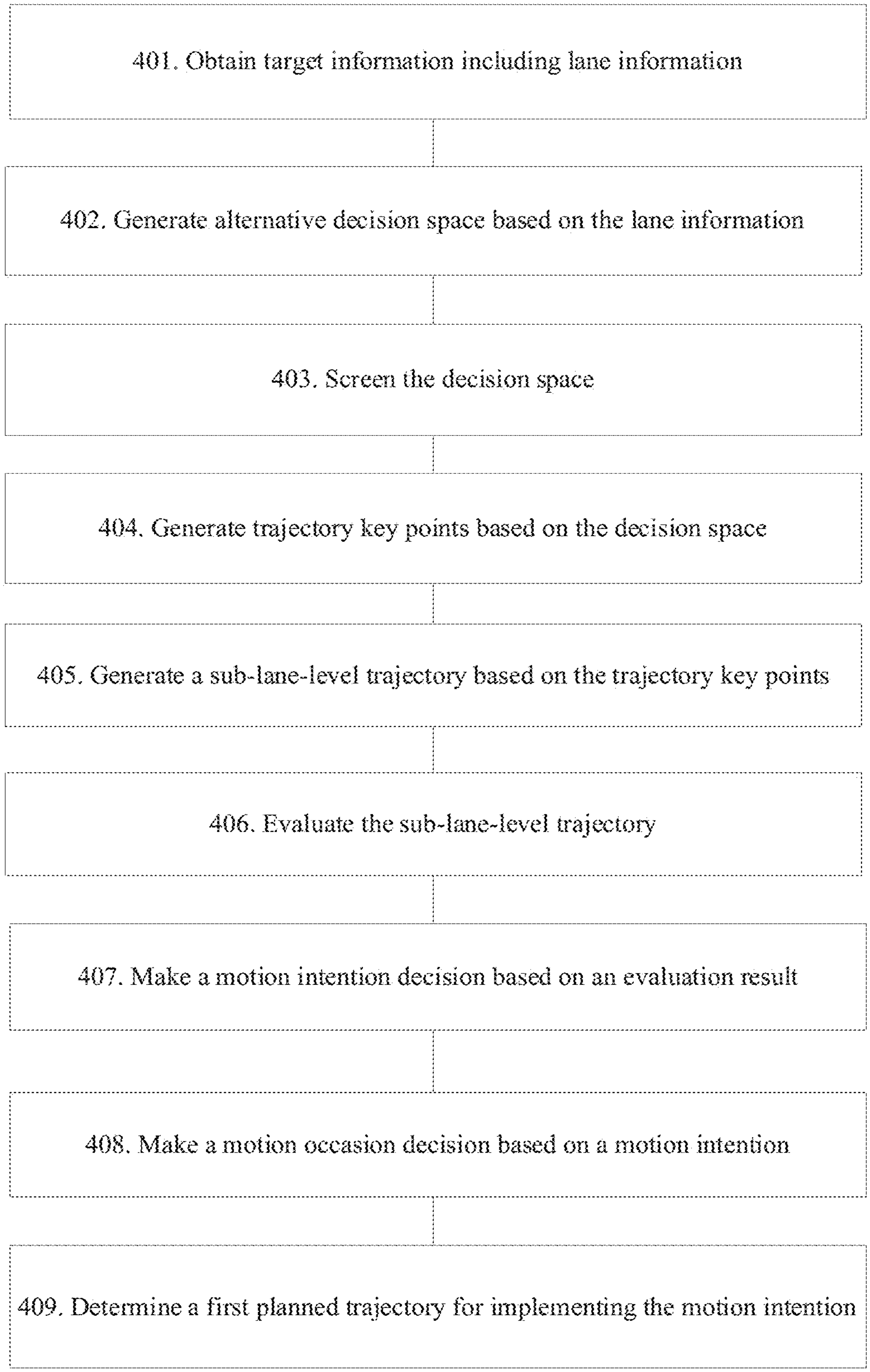
FIG. 4 is another schematic flowchart of a sub-lane-level trajectory planning method according to an embodiment of this application.

FIG. 4 is an overall flowchart of a sub-lane-level trajectory planning method according to an embodiment of this application. The following describes step 202 in detail, to obtain a method procedure shown in FIG. 4. The method is applied to a calculation unit, and the method includes the following steps.

401. Obtain Target Information Including Lane Information.

For this step, refer to step 201 in the embodiment shown in FIG. 2. Details are not described herein again.

402. Generate Alternative Decision Space Based on the Lane Information.

The target information includes road structure information, and the road structure information includes the lane information. As shown in FIG. A in FIG. 5, the calculation unit may determine a local road topology structure based on the lane information in the target information, to generate a series of road-level drivable sliding windows as the candidate decision space.

403. Screen Decision Space.

Figure 5:
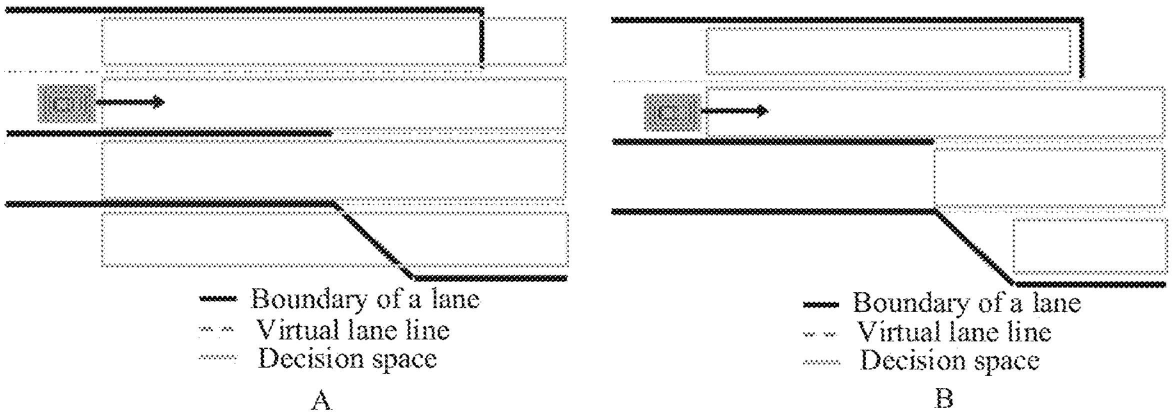
FIG. 5 is a schematic diagram of determining decision space according to an embodiment of this application.

As shown in FIG. B in FIG. 5, the calculation unit may screen, on each lane based on a plurality of conditions and based on the alternative decision space obtained in step 402, the sliding window that can be used by a target vehicle to drive as the decision space. In some embodiments, the condition used may include: a location, posture information, and motion information of the target vehicle, a length, passability, and crossability of each piece of alternative decision space, a road structure, a location of a road hard boundary such as a road boundary, or a lane end, or a static obstacle such as a road edge, a building fence, a road water-filled barrier, or a green belt.

404. Generate Trajectory Key Points Based on the Decision Space.

The calculation unit may generate an action sequence of motion statuses on each lane based on the decision space selected in step 403 and the motion statuses of the target vehicle, and determine key point information of each trajectory based on the action sequence. The key points may include a start point and an end point of each action in the action sequence, for example, a lane changing start point and a lane changing end point of a lane changing action.

The action sequence includes a plurality of actions and a time sequence between the plurality of actions. The plurality of actions in each action sequence include at least one target action. To implement the target action, the target vehicle needs to drive in an area outside a center line of a lane in parallel to the center line of the lane, that is, drive on a target trajectory. In some embodiments, the target action may include lane keeping, lane changing, lane deviation, or the like. The target action is described in detail in the embodiments shown in FIG. 8 to FIG. 19*b*. Details are not described herein again.

405. Generate a Sub-Lane-Level Trajectory Based on the Trajectory Key Points.

The calculation unit may connect, based on the key point information generated in step 404, the key points in a same action sequence by using a smooth curve, to obtain a plurality of sub-lane-level trajectories corresponding to a plurality of action sequences.

406. Evaluate the Sub-Lane-Level Trajectory.

The calculation unit may calculate, according to an evaluation function, a cost of each sub-lane-level trajectory obtained in step 405. The evaluation function may be designed based on an evaluation principle. For example, to complete a driving task, a task completion evaluation function may be designed to measure a possibility that the target vehicle drives along a trajectory to complete the driving task.

In this embodiment of this application, an optimal trajectory needs to be selected from the plurality of sub-lane-level trajectories. Therefore, the plurality of sub-lane-level trajectories may also be referred to as candidate trajectories.

For example, the following describes several types of representative cost and corresponding evaluation functions.

a. Task Completion Cost $Cost_{achieveGoal}$:

The task completion cost $cost_{achieveGoal}$ of driving along the candidate trajectory to a target lane is calculated by using the target lane recommended by using global recommendation information, and calculation is performed based on a recommendation degree $lane_{recommend}$ of a lane on which the trajectory is located, where a corresponding evaluation function includes:

$$cost_{achieveGoal}=lane_{recommend}$$

b. Trajectory Passing Efficiency Cost $cost_{trafficEfficiency}$:

Passing efficiency of the plurality of sub-lane-level trajectories are calculated based on information about an obstacle on each lane, and the passing efficiency is used as the cost, where a corresponding evaluation function includes:

$$\begin{cases} cost_{stationary\ Object} = cost_{dis} \\ cost_{other\ Object} = cost_{object\ Type} \times cost_{object\ Speed} \times cost_{dis} \end{cases}$$

$cost_{stationaryobject}$ represents cost of a static obstacle, $cost_{otherObject}$ represents cost of another obstacle other than the static obstacle, $cost_{dis}$ represents a distance between the obstacle and a point on the planned trajectory, $cost_{objectType}$ represents a type of the obstacle, and $cost_{objectSpeed}$ represents speed information of the obstacle.

When the passing efficiency cost is calculated, a type of the obstacle, a distance between the obstacle and a start point of the planned trajectory in an S direction, speed information of the obstacle, and a motion status of the obstacle such as a static obstacle or a moving obstacle need to be considered, and passing efficiency of a lane on which the obstacle is located is calculated, for example, passing efficiency of a lane on which the static obstacle is located is low. Passing efficiency of a lane on which a dynamic obstacle is located depends on a relative distance, a relative speed, and a relative acceleration between the target vehicle and the dynamic obstacle.

c. Trajectory Safety Cost $cost_{safe}$:

The trajectory safety cost is calculated based on a collision distance between the trajectory and the obstacle. All points on the entire trajectory are traversed. If any point on the trajectory is in a corresponding location with the obstacle at a corresponding moment, the point collides with the obstacle. In this case, a status of the entire trajectory is collision.

Figure 6:
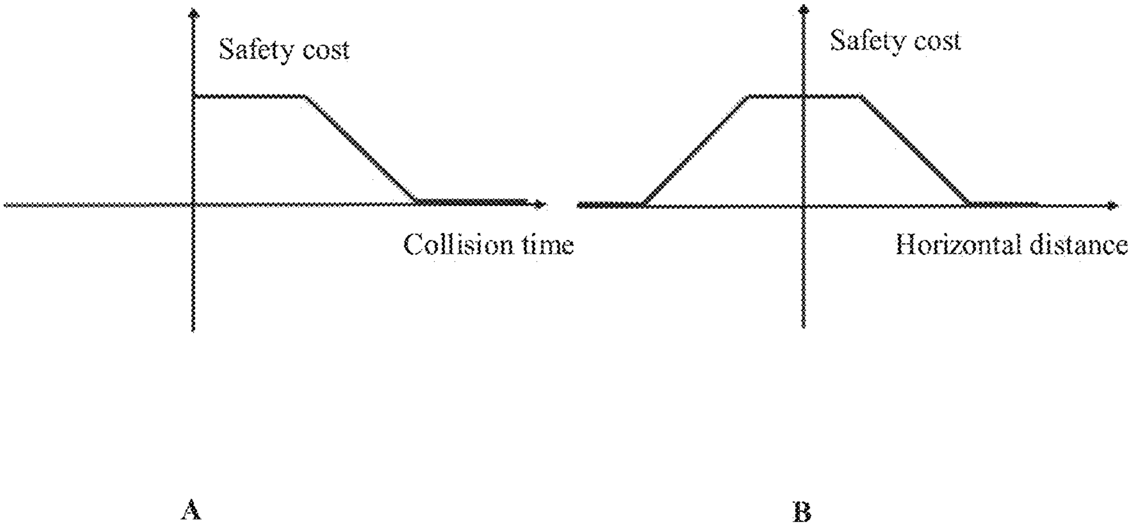
FIG. 6 is a schematic diagram of cost according to an embodiment of this application.

Two conditions are considered for the collision. One is longitudinal collision time, which refers to duration in which the target vehicle collides with the obstacle in front of the target vehicle when the target vehicle drives at a maximum deceleration. As shown in FIG. A in FIG. 6, shorter collision time indicates higher cost. The other is a horizontal collision distance, which refers to a distance between projections of the obstacle and the target vehicle on an L axis when projections of the obstacle and the target vehicle on an S axis overlap, and is also referred to as a horizontal distance. A larger horizontal distance indicates higher safety cost, as shown in FIG. B in FIG. 6. Total collision cost of the trajectory is obtained by summing up weighted collision cost of each trajectory point.

d. Potential Lane Risk Cost $cost_{risk}$:

To check whether the candidate trajectory passes through a risk area, for example, a gate where a moving obstacle frequently occurs, a bus stop where a bus is parked, a large truck that may drop goods, pedestrians gathering, a road hard boundary, and a roadside parking, the risk cost $cost_{risk}$ is calculated by calculating a distance between the target vehicle and the risk area.

Figure 7:
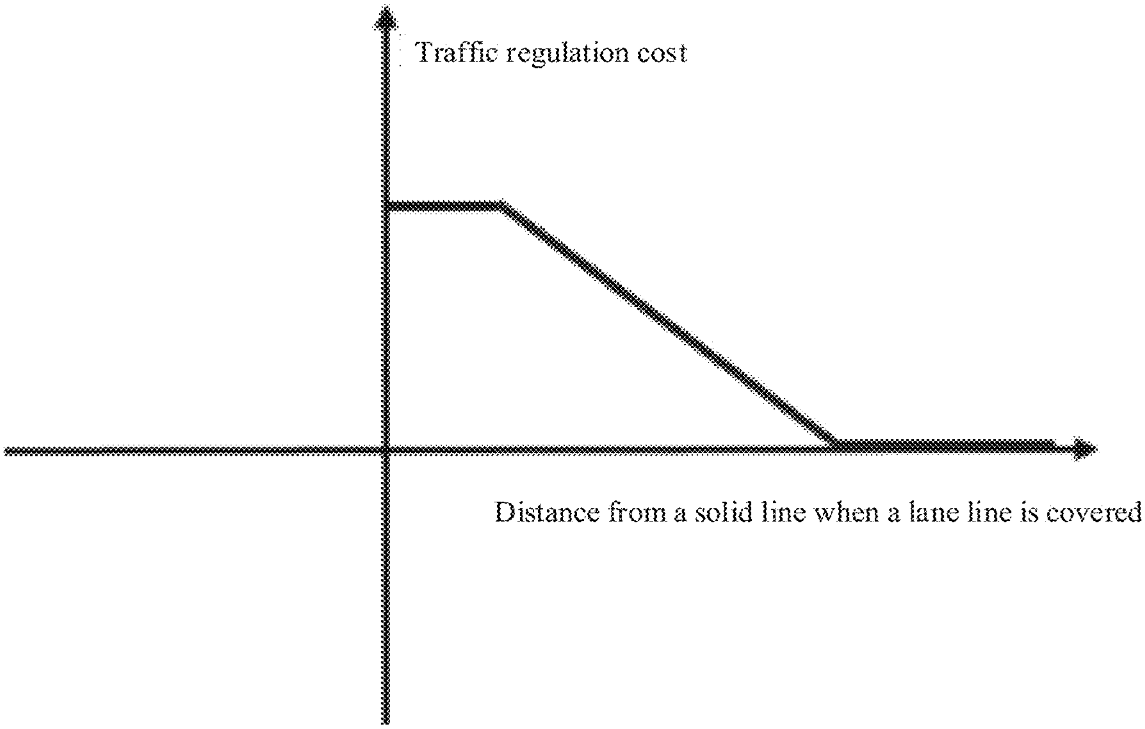
FIG. 7 is another schematic diagram of cost according to an embodiment of this application.

Being closer to the risk area indicates higher risk cost. Therefore, the risk cost is mainly related to a type $cost_{type}$ of the risk area, a distance $cost_{lateralDis}$ between the point on the trajectory and the risk area in a normal direction, and a distance $cost_{longitudeDis}$ in a tangent direction. A corresponding evaluation function includes:

$$cost_{risk}=cost_{type}*cost_{longitudeDis}*cost_{lateralDis}$$

e. Traffic Regulation Violation Cost $cost_{trafficRule}$:

The cost mainly considers whether the candidate trajectory violates a traffic regulation. For example, if the trajectory covers a solid lane line, the traffic regulation cost is excessively high. If the trajectory does not cover the solid line, a distance between the trajectory and the solid line is calculated when the trajectory covers the lane line. As shown in FIG. 7, within a specified range, as the distance decreases, the cost increases, and a corresponding evaluation function includes:

$$cost_{traffic\ Rule} = \frac{1.0}{dis_{max}} dis_{virtualLane\ Line}$$

$dis_{LaneLine}$ represents a distance between a start point and an intersection point of the trajectory, where the intersection point is an intersection point between the trajectory and a boundary of the lane, and $dis_{max}$ represents a threshold for calculating the traffic regulation violation cost. If $dis_{LaneLine}$ is lower than the threshold, the traffic regulation violation cost is not calculated.

f. Horizontal Offset Cost $cost_{laneoffset}$:

The cost describes a degree to which the candidate trajectory deviates from the road center line in an L direction, and a corresponding evaluation function includes:

$$cost_{laneoffset}=|l/l_{max}|$$

l represents a deviation distance between a point on the trajectory and a center line of a target lane in an L direction, $l_{max}$ represents a threshold for calculating the foregoing horizontal deviation cost. If l is less than the threshold, the horizontal deviation cost is not calculated. In embodiments of this application, the deviation distance in an L direction is also referred to as a horizontal distance. This is not limited herein.

g. Comfort Cost $cost_{curvture}$:

The cost describes stability of the target vehicle when the target vehicle drives along the trajectory. For example, the cost may be calculated by using an integral of a square of curvature of each point on the candidate trajectory, and a corresponding evaluation function includes:

$$cost_{curvture} = \sum_i pt_i \cdot curve^2$$

$pt_i$. curve represents the curvature of the point on the trajectory, and $pt_i$. $curve^2$ represents the square of the curvature of the point on the trajectory.

h. Switching Cost $cost_{actionChange}$:

A sudden change degree of a forward direction of the target vehicle along the candidate trajectory is determined based on a current action $num_{currentAction}$, a historical action $num_{historyAction}$, and a deviation between the candidate trajectory and a historical trajectory on which the target vehicle has driven. For example, difficulty of action connection is arranged in ascending order as follows: lane keeping, lane deviation, lane changing in a same direction as a previous driving action, returning to an original lane, and lane changing in a reverse direction of the previous driving action. Higher difficulty of action connection indicates higher cost in two connected actions. The historical action is an action performed before the current action and connected to the current action. A corresponding evaluation function includes:

$$cost_{actionChange}=|num_{currentAction}-num_{historyAction}|$$

i. Total Candidate Trajectory Cost $cost_{total}$:

The total candidate trajectory cost is a weighted summation result of all the foregoing cost, where W represents a weighting coefficient of each piece of cost:

$$\begin{aligned} Cost_{total} = {} & W_{achieve\ Goal} * cost_{achieve\ Goal} + \\ & w_{traffic\ Efficiency} * cost_{traffic\ Efficiency} + w_{risk} * cost_{risk} + w_{safe} * cost_{safe} + \\ & w_{traffic\ Rule} * cost_{traffic\ Rule} + w_{curvature} * cost_{curvature} + \\ & w_{lane\ Offset} * cost_{lane\ Offset} + w_{action\ Change\ Cost} * cost_{action\ Change} \end{aligned}$$

$W_{achieveGoal}$ represents a weighting coefficient of the task completion cost, $W_{trafficEfficiency}$ represents a weighting coefficient of the trajectory passing efficiency cost, $W_{risk}$ represents a weighting coefficient of the potential lane risk cost, $W_{safe}$ represents a weighting coefficient of the trajectory safety cost, $W_{trafficRule}$ represents a weighting coefficient of the traffic regulation violation cost, $W_{curvture}$ represents a weighting coefficient of the comfort cost, $W_{laneoffset}$ represents a weighting coefficient of the horizontal offset cost, and $W_{actionChangeCost}$ represents a weighting coefficient of the switching cost.

407. Make a Motion Intention Decision Based on an Evaluation Result.

The calculation unit may select the optimal candidate trajectory from the plurality of candidate trajectories based on the cost of each candidate trajectory obtained in step 406, and generate a lane decision policy corresponding to the optimal candidate trajectory. The lane decision policy may include a motion intention. In addition to the motion intention, the lane decision policy may further include an identifier of the target lane, a deviation distance relative to a center line of a lane of the target lane in an L direction, an urgency degree of executing the motion intention, and the like. This is not limited herein. The motion intention may include lane changing, lane keeping, lane deviation, lane changing keeping, lane changing cancellation, and the like.

In some embodiments, for selection of the optimal candidate trajectory, a candidate trajectory having minimum cost or a maximum cost may be selected. For example, when the cost is negatively correlated with a corresponding selection principle, the trajectory having the lowest cost is selected, and vice versa.

408. Make a Motion Occasion Decision Based on the Motion Intention.

The calculation unit may screen, based on the motion intention determined in step 407 and based on the road condition information, an obstacle that may collide with the target vehicle, perform sampling and derivation on motion trajectories of the target vehicle and the obstacle in terms of time and space, select an appropriate motion occasion, and output an occasion, a speed, and an acceleration for performing a related action. The action may include lane deviation, lane keeping, lane changing preparation, lane changing, lane changing keeping, lane changing cancellation, and the like.

409. Determine a First Planned Trajectory for Implementing the Motion Intention.

A first trajectory planning module is configured to determine, based on the motion occasion and the lane decision policy generated by a sub-lane-level lane decision maker, the first planned trajectory used to implement the motion intention.

In this embodiment of this application, the target trajectory is parallel to the center line of the lane, and is located in an area between the center line of the lane and the boundary of the lane, or is located on the boundary of the lane. In other words, the target trajectory is a trajectory that is parallel to the center line of the lane and that is not on the center line of the lane. The target trajectory provides a substitute or an intermediate transition for a plurality of lane changing trajectories or avoidance trajectories for implementing a plurality of target actions. The substitute represents: When the target action is avoiding a plurality of obstacles, the target trajectory that is parallel to and deviates from the center line of the lane by a specific distance may be determined. The plurality of obstacles are avoided by using the target trajectory, to substitute the plurality of avoidance trajectories in which turning back and forth needs to be performed between lanes in the lane-level trajectory. For details, refer to FIG. 10*d*, FIG. 12, FIG. 13, FIG. 14*a*, FIG. 14*b*, FIG. 15, FIG. 16*b* and FIG. 18*b*. The intermediate transition represents: When the target action is changing a lane to the target lane and avoiding an obstacle, the target trajectory located between a center line of a start lane and the center line of the target lane may be determined. The start lane is a lane on which a driving route of the target vehicle is located. The obstacle is avoided by using the target trajectory. Compared with changing a lane from the center line of the start lane, a distance between the target trajectory and the center line of the target lane is shorter, and lane changing is more convenient. Therefore, the target trajectory is considered as the intermediate transition between the center line of the start lane and the center line of the target lane. The intermediate transition of lane changing is implemented by using the target trajectory, and the obstacle is avoided at the same time, to substitute the plurality of lane changing trajectories that need to be switched back and forth between the center lines of the lanes in the lane-level trajectory. For details, refer to FIG. 8 to FIG. 18*b*. In this embodiment of this application, the plurality of lane changing trajectories or avoidance trajectories are substituted with the target trajectory, so that when the target vehicle drives along the first planned trajectory including the target trajectory, the target vehicle does not need to change lanes for a plurality of times to change a driving direction, to improve driving stability and safety of the target vehicle.

In addition, because trajectory selection is performed based on an evaluation of the candidate trajectory in step 406 and step 407, the optimal trajectory may be selected by combining a plurality of evaluation functions, that is, by combining a plurality of evaluation principles. The trajectory may be selected by balancing each evaluation principle, or based on importance of each evaluation principle may be adjusted based on a use requirement. In some embodiments, a weight corresponding to each piece of cost may be changed. The trajectory is selected based on the most important or relatively important evaluation principle, to enable the trajectory selection to be more proper. In addition, flexibility of a location of the trajectory is improved by using the sub-lane-level trajectory.

In this embodiment of this application, different sub-lane-level trajectories need to be determined based on different target information. In addition to the method shown in FIG. 4, the sub-lane-level trajectories may alternatively be determined by using a machine learning method. For example, the target information and the optimal sub-lane-level trajectory corresponding to the target information may be used as a sample pair, a plurality of sample pairs are output for training a model to obtain a target model, and the sub-lane-level trajectory corresponding to the target information is determined by using the target model. This is not limited herein.

The foregoing describes the sub-lane-level trajectory planning method. The following describes, for different scenarios, a form of the sub-lane-level trajectory determined in this embodiment of this application.

3. Sub-Lane-Level Trajectories Planned in Different Scenarios.

Based on a motion status of a target vehicle, the scenarios may be roughly classified into three types: 1. The target vehicle is in a lane changing state. 2. The target vehicle is in a straight state. 3. The target vehicle is in a state in which the target vehicle is to change a lane.

The following subdivides the three scenarios and describes possible scenarios in the three scenarios.

1. the Target Vehicle is in the Lane Changing State.

1.1. Lane Changing Keeping Trajectory

Figure 8:
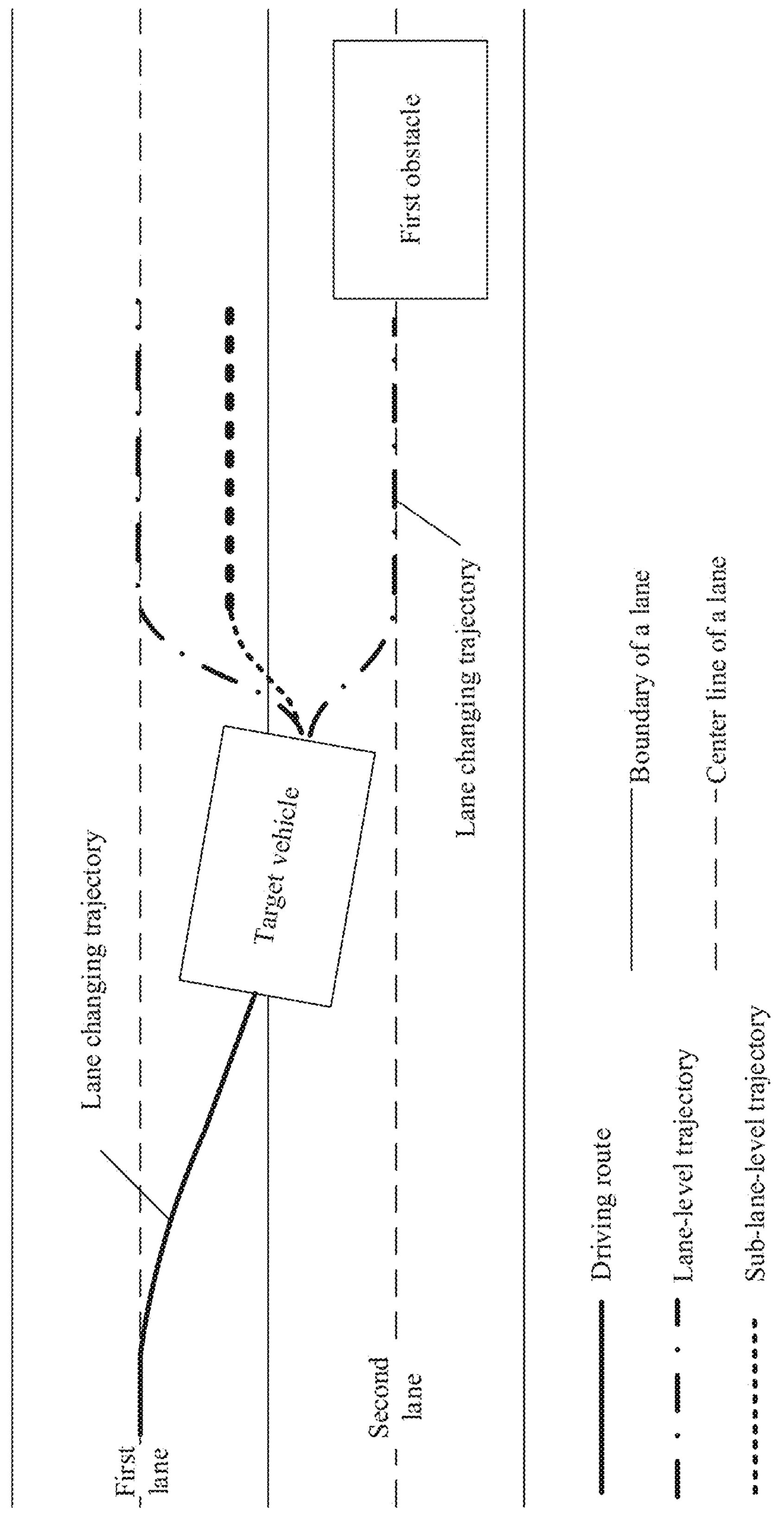
FIG. 8 is a schematic diagram of another application scenario of a sub-lane-level trajectory planning method according to an embodiment of this application.

As shown in FIG. 8, if the target vehicle is driving along a lane changing trajectory, to be specific, when the target vehicle changes a lane from a first lane to a second lane, a first obstacle appears on the second lane. In this case, road condition information may include motion information of the first obstacle. In this case, the second lane may also be referred to as a target lane.

If a calculation unit determines the target vehicle to drive along the current lane changing trajectory, the target vehicle may collide with the first obstacle, and needs to turn to the first lane to avoid the first obstacle.

As shown in FIG. 8, in a lane-level trajectory in a current technology, the target vehicle needs to return to a center line of the first lane.

In this embodiment of this application, a sub-lane-level trajectory may be determined. A target trajectory of the trajectory is between the center line of the first lane and a center line of the second lane, and a connection trajectory is used to connect a current driving location and the target trajectory. In this embodiment of this application, the trajectory that is connected to the lane changing trajectory and that is used to avoid an obstacle on the target lane is also referred to as a lane changing keeping trajectory.

In this embodiment of this application, the target vehicle drives along the target trajectory, and may keep an intermediate transition from the first lane to the second lane. Through the intermediate transition, a distance less than lane spacing may be kept between the target lane and the center line of the second lane, so that the target vehicle can change a lane to the second lane at any time. In addition, in an intermediate transition state, collision with the obstacle on the second lane can be avoided. On the premise of ensuring driving safety, the intermediate transition state of changing a lane to the target lane is kept, and there is no need to change a lane back to the first lane and then change a lane to the target lane as in the lane-level trajectory. This reduces a quantity of invalid lane changing times and invalid turning times of the target vehicle, improves passing efficiency, and improves driving stability and safety of the target vehicle by cutting in line to the second lane by using the target trajectory. The lane spacing represents a distance between lane center lines of two adjacent lanes.

1.2. Decision after the Lane Changing Keeping Trajectory

After the target vehicle drives to the target trajectory in the lane changing keeping trajectory, the calculation unit may determine a next action of the target vehicle based on the current road condition information and the like. In some embodiments, the target vehicle may change a lane from the target trajectory to the second lane, return from the target trajectory to the first lane, or continue to drive along the target trajectory. The following separately discusses the three possibilities.

A. Change a Lane from the Target Trajectory to the Second Lane.

The target trajectory in the lane changing keeping trajectory provides the target vehicle with the intermediate transition state of changing a lane from the first lane to the second lane. In a process in which the target vehicle drives in the intermediate transition state of the target trajectory, the calculation unit may determine the next action of the target vehicle based on the current road condition information. The following analyzes a possibility of the next action based on a cause of appearance of the first obstacle.

In a process of planning the lane changing trajectory, the lane changing trajectory should be a safe trajectory, and the target vehicle should not collide with the obstacle when driving along the lane changing trajectory. Therefore, the first obstacle is an obstacle that may be collided and that appears temporarily after the lane changing trajectory is determined. There are two possible causes of the appearance of the first obstacle.

A first possibility is that in a process of changing a lane to the target lane, the first obstacle, for example, a vehicle, located behind the target vehicle on the target lane does not want the target vehicle to change a lane to drive to front of the first obstacle. In this case, the first obstacle may accelerate driving, so that the target vehicle may collide with the first obstacle when driving along the determined lane changing trajectory. Therefore, the target vehicle cancels lane changing to the second lane, and the target vehicle does not change a lane to drive to the front of the first obstacle.

Figure 9A:
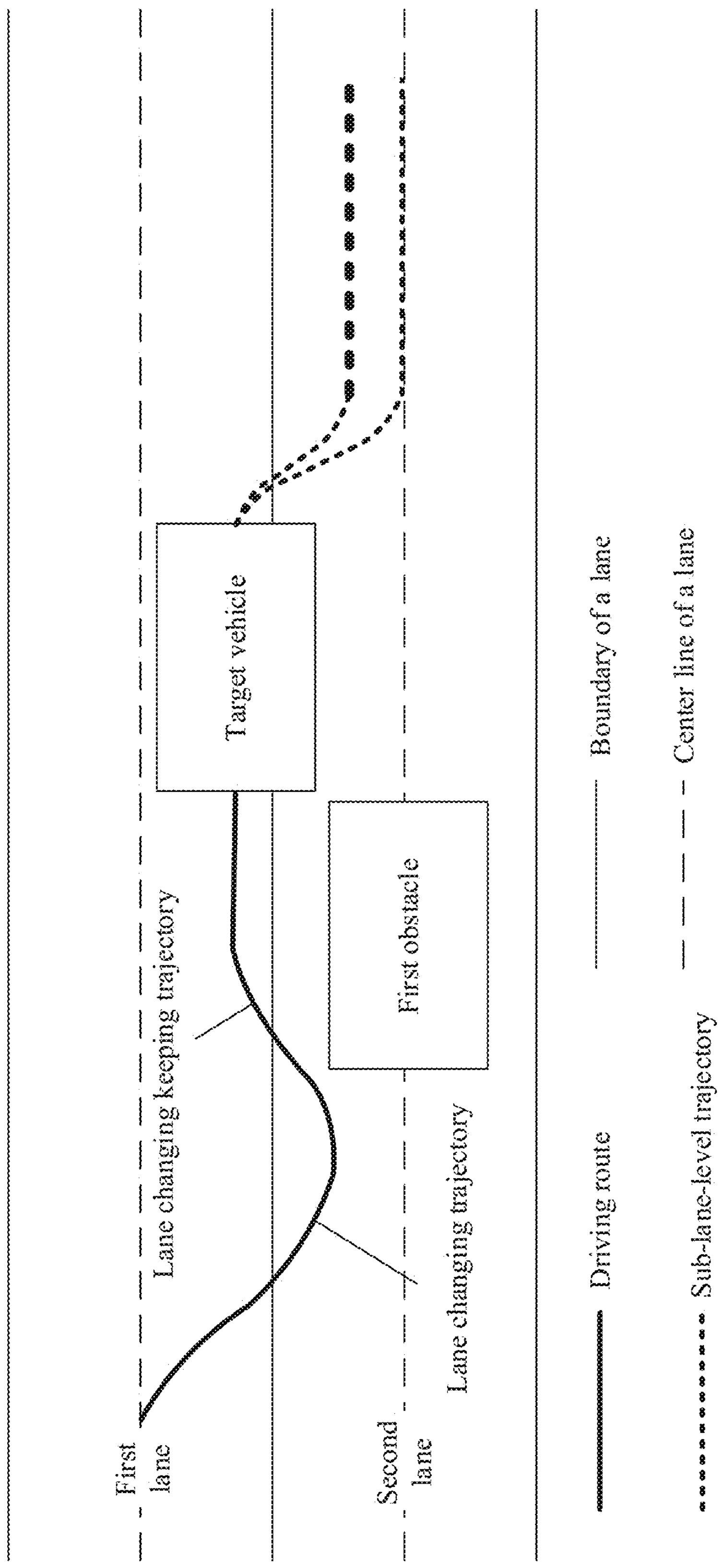
FIG. 9*a* is a schematic diagram of another application scenario of a sub-lane-level trajectory planning method according to an embodiment of this application.
Figure 9B:
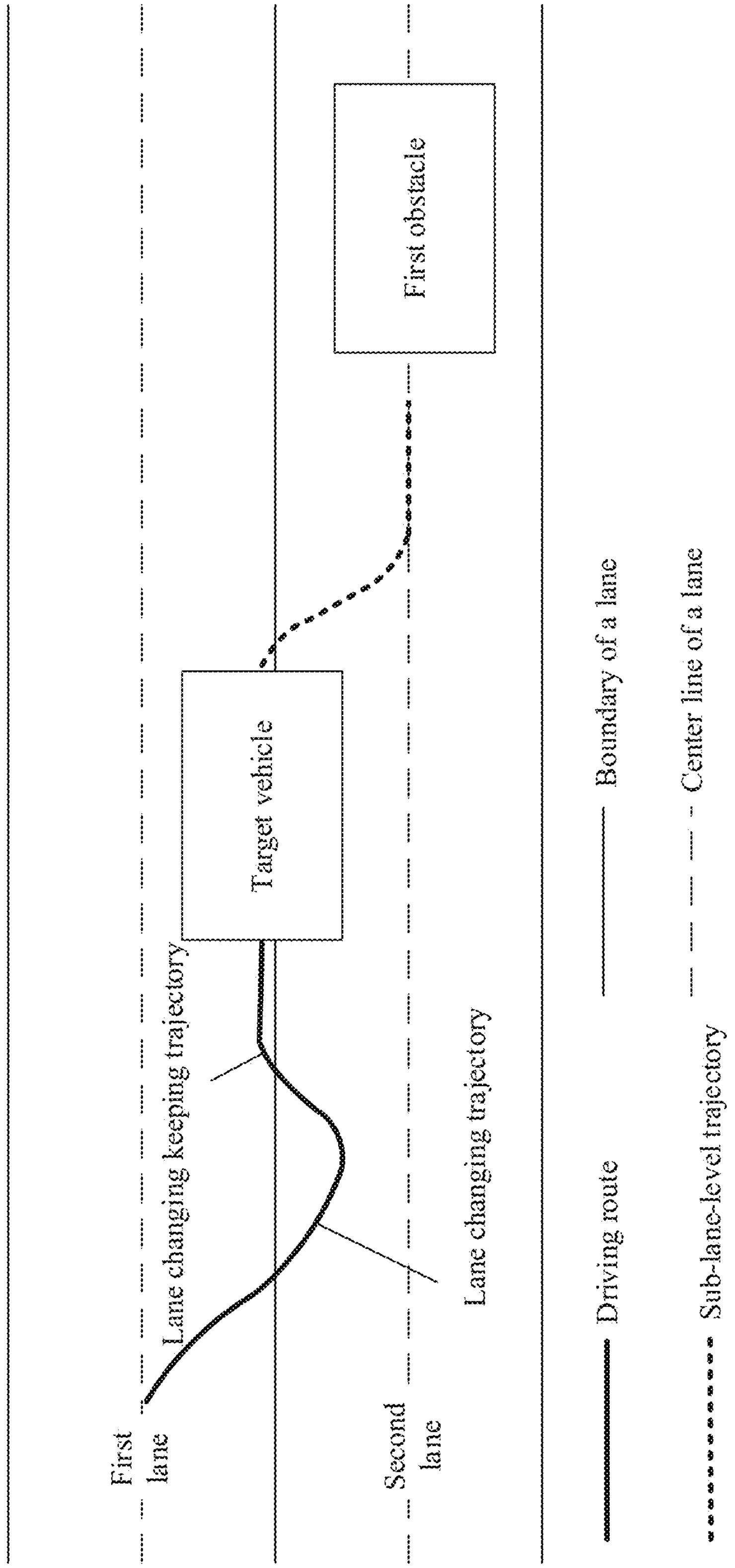
FIG. 9*b* is a schematic diagram of another application scenario of a sub-lane-level trajectory planning method according to an embodiment of this application.

In this case, the target vehicle drives along the target trajectory of the sub-lane-level trajectory, and may decelerate driving behind the first obstacle, as shown in FIG. 9*b*; or may accelerate driving to the front of the first obstacle, as shown in FIG. 9*a*. When the target vehicle determines not to collide with the first obstacle when the target vehicle changes a lane to the second lane, the target vehicle may change a lane to the second lane, to implement an action similar to "cutting in line" when a driver drives the vehicle.

A second possibility is that in a process of changing a lane to the target lane, the first obstacle, for example, a vehicle, in front of the target vehicle on the target lane suddenly decelerates. As a result, the target vehicle may collide with the first obstacle when continuing to change a lane, and can only turn to the first lane to avoid the obstacle.

In this case, as shown in FIG. 9*a*, the target vehicle may drive along the target trajectory in the sub-lane-level trajectory, to the front of the first obstacle, and then change a lane from the target trajectory to the front of the first obstacle on the second lane. In this way, the obstacle that suddenly decelerates can be safely avoided, and lane changing to the target lane is not affected.

B. Change a Lane from the Target Trajectory Back to the First Lane.

If it is determined that the target vehicle drives along the current trajectory and may collide with the first obstacle, the target vehicle may change a lane back to the first lane to avoid the first obstacle.

C. Drive Along the Target Trajectory.

If it is determined that the target vehicle does not collide with the first obstacle when driving along the current trajectory, and may collide with the first obstacle when the target vehicle changes a lane to the second lane, the target vehicle may continue to drive along the current target trajectory.

In the intermediate transition state of driving along the target trajectory, the calculation unit may determine the next action based on the current road condition information of the target vehicle. Because the target trajectory is the intermediate transition between the center line of the first lane and the center line of the second lane, regardless of whether a lane is changed to the first lane or the second lane, a deviation degree of the target vehicle in an L direction is less than a deviation degree of the target vehicle in an L direction when a lane is changed between the lanes. The deviation degree in an L direction is small, and the driving direction of the target vehicle needs to be changed at a smaller angle per unit time during switching from being parallel to the center line of the lane to a lane changing state, to improve driving stability and safety of the target vehicle.

2. the Target Vehicle is in a Parallel State.

In a second scenario, the target vehicle is in the parallel state, to be specific, the target vehicle drives on a parallel trajectory.

When the target vehicle is in the parallel state, in addition to that the target vehicle needs to change a lane to the target lane or avoid the obstacle, the target trajectory usually continues to be driven along the parallel trajectory. The following describes various possibilities of avoiding the obstacle and various possibilities of changing a lane to the target lane in detail.

Figure 10A:
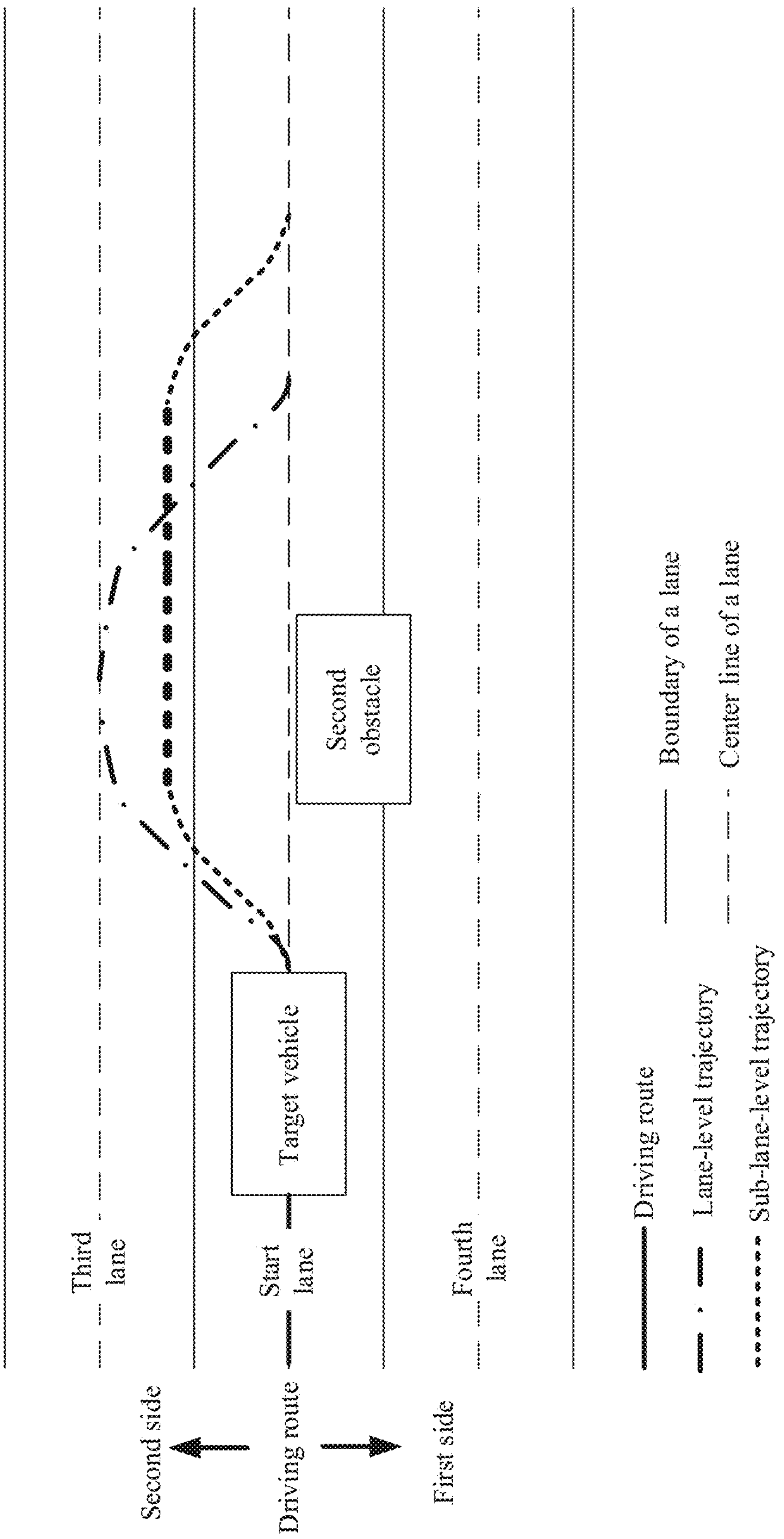
FIG. 10*a* is a schematic diagram of another application scenario of a sub-lane-level trajectory planning method according to an embodiment of this application.

The following describes road information when the target vehicle is in the parallel state. The target vehicle drives on the parallel trajectory, and a trajectory that has driven is referred to as a driving route. As shown in FIG. 10*a*, a lane on which the driving route is located is referred to as a start lane, an adjacent lane on a first side of the start lane is referred to as a fourth lane, and an adjacent lane on a second side of the start lane is referred to as a third lane. All the embodiments in FIG. 10*a* to FIG. 18*b* are embodiments based on the foregoing road information. Details are not described in the following when corresponding embodiments are described.

It should be noted that the obstacle may be on the lane or may not be on the lane, provided that the obstacle is on one side of the driving route. This is not limited herein. FIG. 10*a* is used as an example for description. In the figure, a second obstacle is on the start lane. Actually, the second obstacle may be on the fourth lane. Alternatively, when the fourth lane does not exist, the second obstacle may be on the first side of the start lane. This is not limited herein.

2.1. There is an Obstacle on One Side of the Driving Route.

As shown in FIG. 10*a*, if the second obstacle appears on the first side of the driving route of the target vehicle, the obstacle needs to be avoided on the second side, where the first side and the second side are located on two sides of the driving route.

In the lane-level trajectory, because a distance between the second obstacle and the driving route is small, the target vehicle needs to overtake the second obstacle by using the third lane to borrow a lane, to avoid the second obstacle. In some embodiments, the target vehicle needs to change a lane to a center line of a lane of the third lane.

In this embodiment of this application, the sub-lane-level trajectory may be determined. The target trajectory of the trajectory is between a boundary on the first side of the start lane and the center line of the third lane, is located on the second side of the second obstacle, and keeps a safe distance from the second obstacle. A connection trajectory is used to connect a current driving location and the target trajectory. In this embodiment of this application, the trajectory that is connected to a straight trajectory and that is used to avoid the obstacle on one side of the driving route is also referred to as a lane deviation trajectory.

In this embodiment of this application, the target vehicle avoids the second obstacle on the first side of the driving route by using the lane deviation trajectory, and the target vehicle does not need to change a lane to a center line of an adjacent lane on the second side of the driving route. Compared with an action of the lane-level trajectory in which a lane is changed to the center line of the adjacent lane, in a process in which the target vehicle drives from the driving route to the target trajectory, a degree of deviation between the target trajectory and the driving trajectory in an L direction is smaller than a degree of deviation between the center line of the adjacent lane and the driving route in an L direction. The deviation degree in an L direction is small. In a process in which the target vehicle turns to the second side to avoid the second obstacle, compared with a process in which a lane is changed to the center line of the adjacent lane, the driving direction of the target vehicle per unit time needs to be changed at a smaller angle, to improve driving stability and safety of the target vehicle.

In this embodiment of this application, the driving route may be located on a center line of a lane shown in FIG. 10*a*, or may be the target trajectory in the sub-lane-level trajectory. This is not limited herein.

2.1.1. Route after Driving to the Target Trajectory

After the target vehicle drives to the target trajectory in the lane deviation trajectory, the calculation unit may determine a next action of the target vehicle based on current road condition information. In some embodiments, the next action may be returning from the target trajectory to the driving route shown in FIG. 10*a*, changing a lane from the target trajectory to the adjacent lane on the second side shown in FIG. 10*b*, or continuing to drive along the target trajectory shown in FIG. 10*c*. The following separately discusses the three possibilities.

A. Return to the Driving Route from the Target Trajectory.

As shown in FIG. 10*a*, the calculation unit may determine a planned trajectory for returning to the driving route. In this case, compared with the lane-level trajectory in which the target vehicle changes a lane to the center line of the adjacent lane and then to the driving route, and needs to turn to the second side and then turn to the first side to return to the start lane, the deviation degree between the target trajectory and the driving trajectory in an L direction is smaller than the deviation degree between the center line of the third lane and the driving route in an L direction. In other words, in this embodiment of this application, the deviation degrees of the two turnings in an L direction are small, and the driving direction of the target vehicle per unit time needs to be changed at a smaller angle, to improve driving stability and safety of the target vehicle.

B. Change a Lane from the Target Trajectory to the Adjacent Lane on the Second Side.

In the lane-level trajectory, it may be determined, based on a distance between the second obstacle and the driving route, whether the second obstacle is avoided by overtaking by borrowing a lane as shown in FIG. 10*a*, or the second obstacle is avoided by using the avoidance trajectory. The following describes an advantage of the sub-lane-level trajectory when the second obstacle is avoided by using the avoidance trajectory in the lane-level trajectory. Actually, in the lane-level trajectory, when the second obstacle is avoided by overtaking by borrowing a lane, the sub-lane-level trajectory also has a same advantage. This is not limited herein.

Figure 10B:
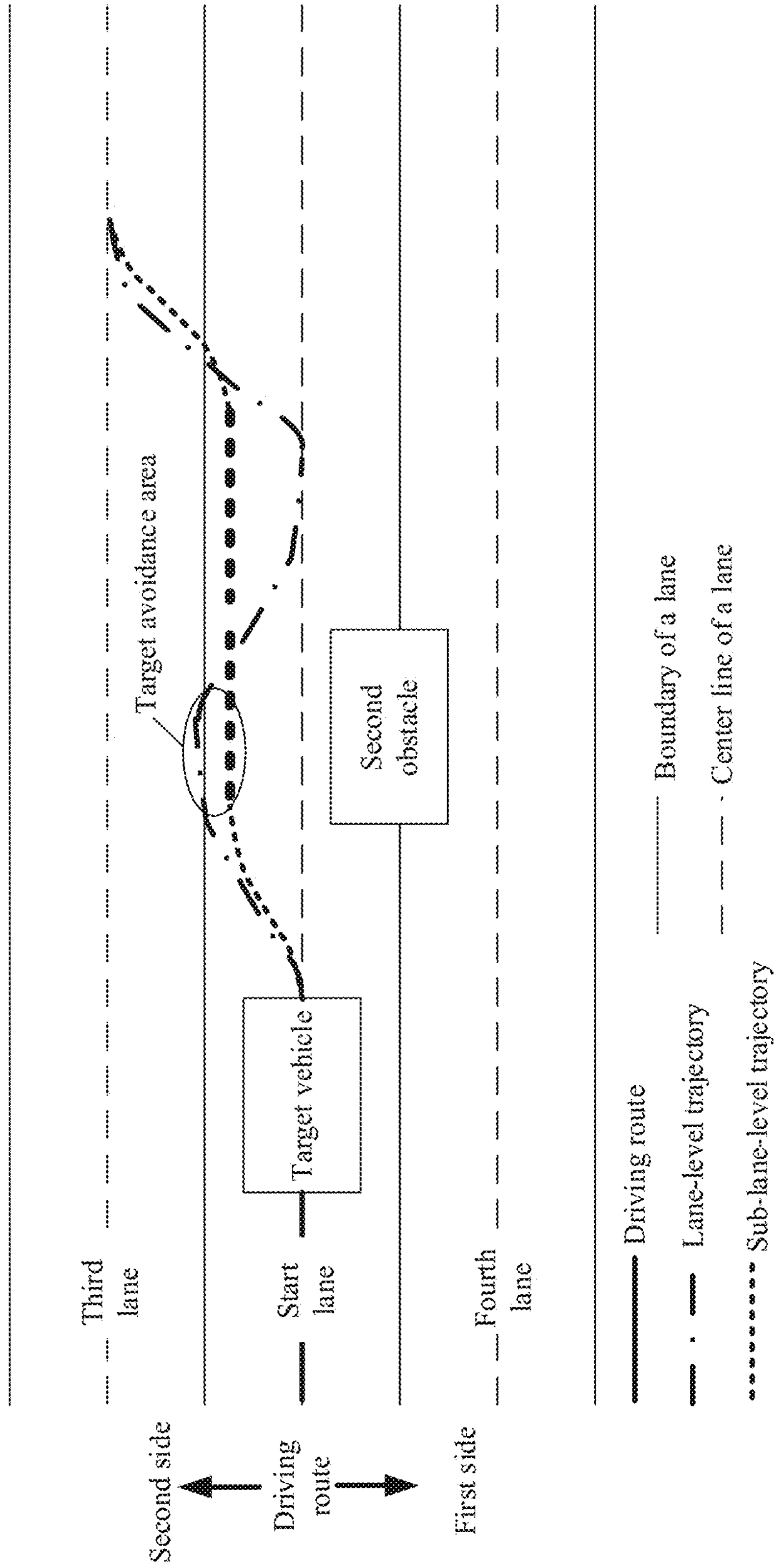
FIG. 10*b* is a schematic diagram of another application scenario of a sub-lane-level trajectory planning method according to an embodiment of this application.

As shown in FIG. 10*b*, in the lane-level trajectory, the calculation unit may choose to avoid the second obstacle by the avoidance trajectory. In some embodiments, the avoidance trajectory includes two segments. One segment is from a current location of the target vehicle to a point in a target avoidance area, and the other segment is from the point in the target avoidance area to the driving route. The target avoidance area is located on the second side of the driving route.

In this embodiment of this application, the second obstacle may be an object or a risk area. If the second obstacle is an object, the target vehicle is located at any point in the target avoidance area, and does not collide with the object. If the second obstacle is a risk area, the target avoidance area and the risk area have no intersection.

In a case in which the target vehicle chooses to turn to the adjacent lane, in the sub-lane-level trajectory, the calculation unit may determine the target trajectory from the boundary on the first side of the start lane and the center line of the third lane. The target trajectory is on the second side of the second obstacle. The calculation unit may further determine a first segment of connection trajectory connecting the current location of the target vehicle and the target trajectory, and a second segment of connection trajectory connecting the target trajectory and the center line of the third lane. The first segment of connection trajectory, the target trajectory, and the second segment of connection trajectory are included the lane deviation trajectory. When the target vehicle drives along the lane deviation trajectory, the target vehicle first turns to the second side along the first segment of connection trajectory and drives to the target trajectory. In a process of driving along the target trajectory, the target vehicle can avoid the second obstacle, and then turn to the second side along the second segment of connection trajectory and drives to the third lane.

The risk area may include an intersection. In addition to the intersection, the risk area may be another area, for example, a speed-limited road section such as a school.

Compared with the lane-level trajectory method, in which an avoidance action is first completed and then a lane is changed, to be specific, the target vehicle needs to first turn to the target avoidance area on the second side, then turn to the first side to return to the lane on which the driving route is located, and then change a lane to the adjacent lane on the second side. In this embodiment of this application, the two turnings are turnings to a same side, and the deviation degree in an L direction includes only the distance from the driving route to the center line of the adjacent lane. Compared with the lane-level trajectory in which three turnings and lane changing are needed, and the deviation degree in an L direction is greater than the distance from the driving route to the center line of the adjacent lane, in this embodiment of this application, a quantity of turning times of the planned trajectory is small, a turning direction is consistent and is not changed, and a deviation degree of a turning driving route in an L direction is small. This can reduce a quantity of times that the target vehicle changes the driving direction, reduce a quantity of invalid direction changing times, and improve passing efficiency. A driving direction angle that needs to be changed per unit time is smaller, to improve driving stability and safety of the target vehicle.

C. Continue to Drive Along the Target Trajectory.

Figure 10C:
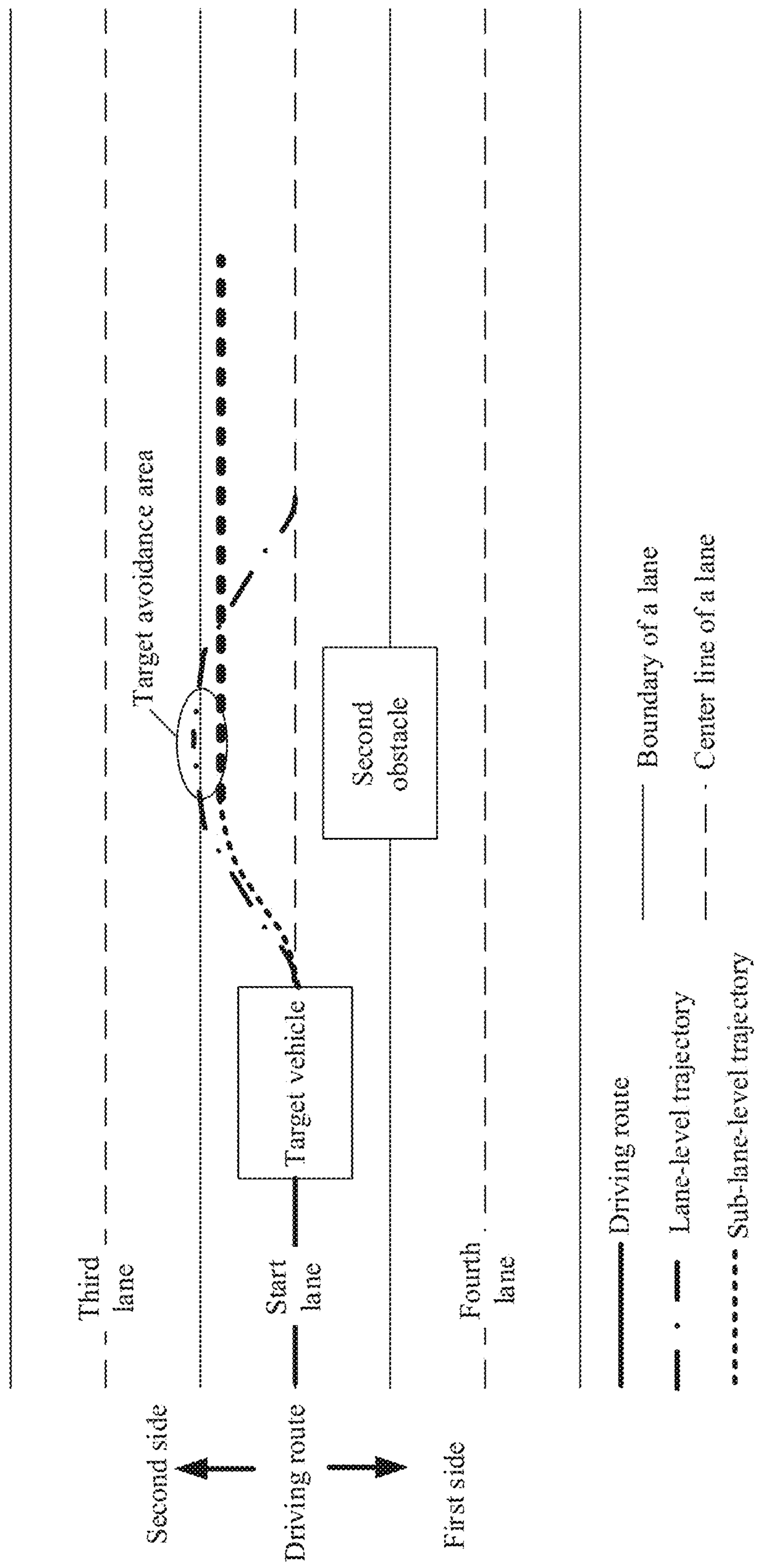
FIG. 10*c* is a schematic diagram of another application scenario of a sub-lane-level trajectory planning method according to an embodiment of this application.

As shown in FIG. 10*c*, the calculation unit may choose to continue to drive along the target trajectory. When choosing to continue driving along the target trajectory, the calculation unit may determine the target trajectory between the boundary on the first side of the start lane and the center line of the third lane, and the target trajectory is on the second side of the second obstacle. The target vehicle may drive along the target trajectory for a distance, and then determine an action of a next step. In this embodiment of this application, an action of immediately returning to the center line of the lane after avoidance is substituted with driving along the target trajectory. Compared with the lane-level trajectory in which the lane needs to be changed to the center line of the lane before a next step, the target trajectory provides smooth connection between different actions, to improve driving stability and safety of the target vehicle.

In this embodiment of this application, there may be one or more second obstacles. The following describes a case in which there are a plurality of second obstacles.

2.1.2 Avoid the Plurality of Second Obstacles.

Figure 10D:
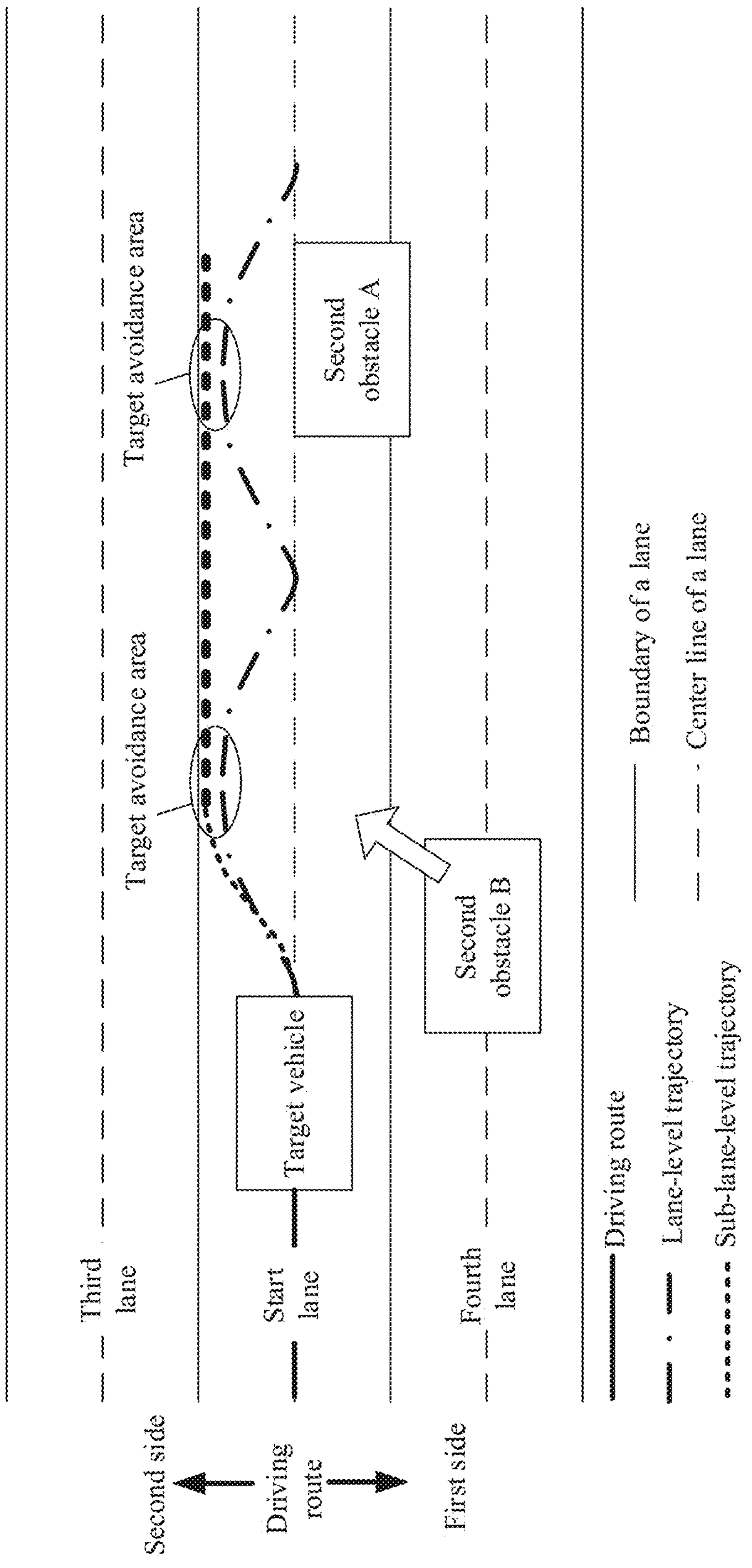
FIG. 10*d* is a schematic diagram of another application scenario of a sub-lane-level trajectory planning method according to an embodiment of this application.

When there are the plurality of second obstacles, for example, the second obstacles shown in FIG. 10*d* include a second obstacle A and a second obstacle B, and the second obstacle B is in a state of approaching the start lane.

In the lane-level trajectory, the target vehicle turns to the target avoidance area and then returns to the center line of the lane in which the driving route is located, to avoid the one second obstacle. If there are the plurality of second obstacles, in a lane-level trajectory solution, avoidance needs to be performed for a plurality of times, and the target vehicle needs to turn back and forth between the driving route and the corresponding target avoidance area, and continuously change the driving direction. As a result, driving is not stable and safety is poor. In this embodiment of this application, the target vehicle can drive on the target trajectory to avoid the plurality of obstacles, and the target vehicle does not need to change the driving direction back and forth, so that the target vehicle is more stable and safe. The target trajectory is between the boundary on the first side of the start lane and the center line of the third lane, and is on the second side of the second obstacle A and the second side of the second obstacle B.

When there are the plurality of second obstacles, in the lane-level trajectory method, the plurality of second obstacles need to be separately avoided, and a plurality of turning times needs to be performed. In this embodiment of this application, the plurality of second obstacles are avoided on the target trajectory by turning to the target trajectory once. Compared with changing lanes for a plurality of times in a current technology, in this embodiment of this application, a quantity of invalid turning times of the target vehicle is reduced by using the lane deviation trajectory, passing efficiency is improved, and the deviation degree of the trajectory in an L direction is reduced. The deviation degree is reduced from a product of an avoidance distance, the quantity of second obstacles, and 2 to a distance from the driving route to the target trajectory. The distance may be equal to the avoidance distance, the driving direction of the target vehicle per unit time needs to be changed at a smaller angle, and accumulated curvature of trajectory points on the trajectory is smaller, to improve driving stability and safety of the target vehicle. The avoidance distance is a distance between a point in the target avoidance area and the driving route.

It should be noted that, in FIG. 10*d*, only the second obstacle A and the second obstacle B are used as an example to describe the plurality of second obstacles. This does not limit statuses of the plurality of second obstacles. The second obstacles may be located on the start lane as the second obstacle A, may be in a state in which the obstacle is close to the start lane as the second obstacle B, or may be randomly arranged and combined in the foregoing two states. This is not limited herein.

In this embodiment of this application, the driving route may be located on the center line of the lane, or may not be located on the center line of the lane. This is not limited herein.

2.1.3. A Lane Needs to be Changed to the Target Lane.

While avoiding the obstacle on one side, the target vehicle may further need to change a lane to the target lane. In some embodiments, the target lane may be located on the first side of the driving route, or may be located on the second side of the driving route. The following separately describes the cases.

A. The Target Lane is Located on the First Side of the Driving Route.

When both the target lane and the obstacle are located on the first side of the driving route, and the target lane is the fourth lane, in the sub-lane-level trajectory, because the target trajectory may be determined between the center lines of the lanes, the target trajectory may be determined between the driving route and the target lane, and the obstacle on the first side is avoided by using the target trajectory.

Figure 11:
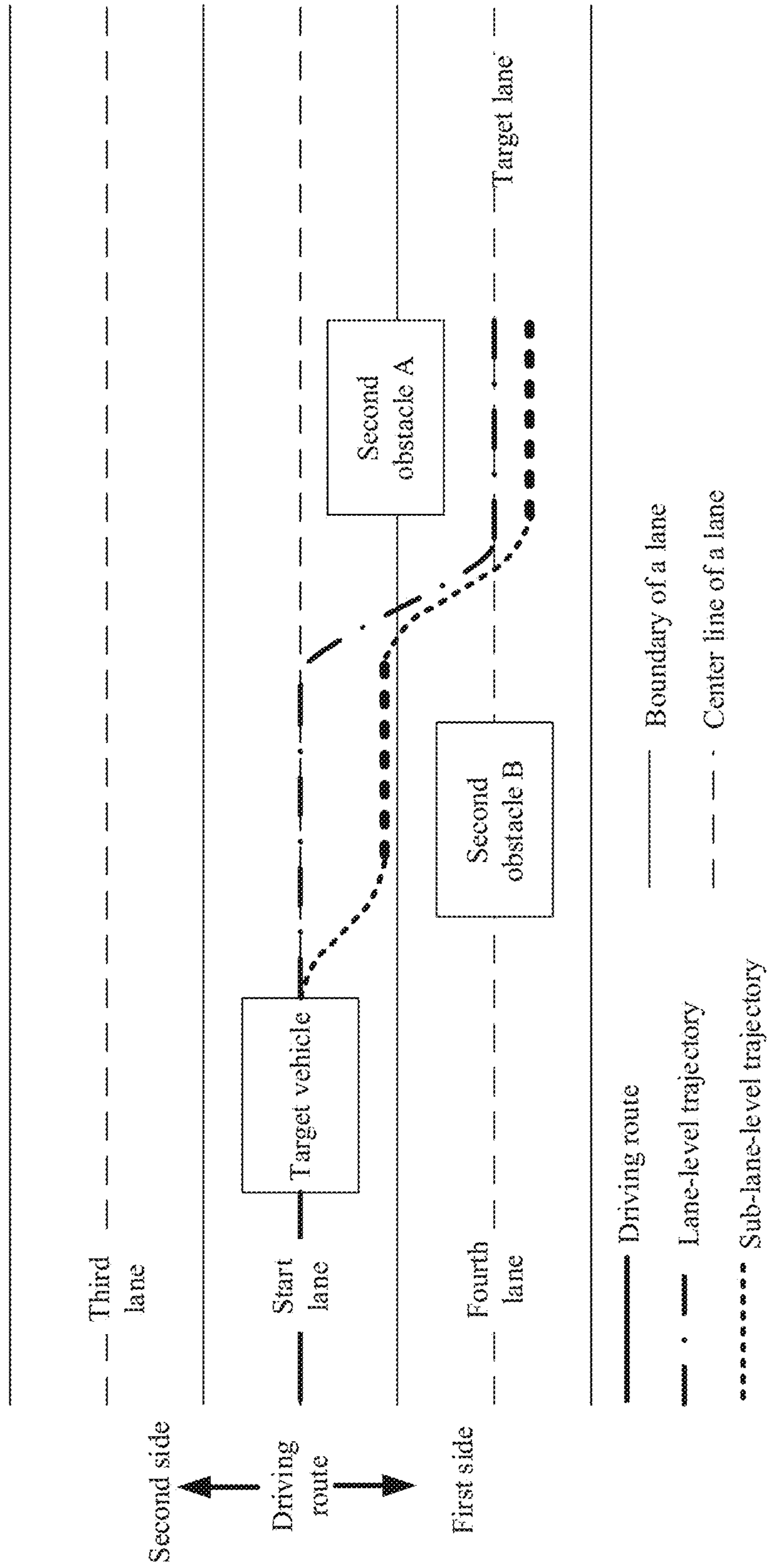
FIG. 11 is a schematic diagram of another application scenario of a sub-lane-level trajectory planning method according to an embodiment of this application.

For example, as shown in FIG. 11, if a second obstacle A and a second obstacle B are included on the first side of the driving route, and the second obstacle B is closer to the driving route than the second obstacle A, in the lane-level trajectory, the target vehicle directly changes a lane from the driving route to the center line of the target lane.

In sub-lane-level trajectory planning, the calculation unit may determine a first segment of target trajectory between a boundary on the second side of the start lane and a center line of the fourth lane, and the first segment of target trajectory is on the second side of the second obstacle B. A distance between the target vehicle and the target lane is reduced by using the first segment of target trajectory, to facilitate lane changing to the target lane, and a safe distance between the target vehicle and the second obstacle B may be kept by using the first segment of target trajectory. The calculation unit may further determine a second segment of target trajectory on the target lane. The second segment of target trajectory is located on the first side of the target lane center line, and is used to keep a safe distance from the second obstacle A, and the two segments of target trajectories are connected by using a connection trajectory. The finally determined lane deviation trajectory includes the foregoing two segments of target trajectories and the connection trajectory connecting the two target trajectories.

The target vehicle drives along the lane deviation trajectory, and may approach the target lane in the first segment of target trajectory, to reduce the deviation degree in an L direction in a lane changing process. The driving direction of the target vehicle per unit time needs to be changed at a smaller angle, and the accumulated curvature of the trajectory points on the trajectory is smaller, to improve driving stability and safety of the target vehicle. In addition, the target vehicle drives on the second segment of target trajectory, so that a safe distance between the target vehicle and the second obstacle A can be kept. Compared with the lane-level trajectory in which the target vehicle can drive only on the center line of the lane, a possibility that the target vehicle collides with the second obstacle A is reduced, and driving safety of the target vehicle is improved.

It should be noted that FIG. 11 is merely an example of the method shown in this embodiment of this application, and does not limit a quantity of second obstacles and a motion status of the second obstacle. When the second obstacle is in another status, the sub-lane-level trajectory shown in FIG. 11 may also be planned. For example, when the second obstacle Ain the figure does not exist, a similar sub-lane-level trajectory may also be planned, and the second obstacle A does not need to be avoided. Therefore, the second segment of target trajectory may become the center line of the target lane. This is not limited herein.

B. The Target Lane is Located on the Second Side of the Driving Route.

When all obstacles are located on the first side of the driving route, and the target lane is located on the second side of the driving route, the target lane is the third lane.

Figure 12:
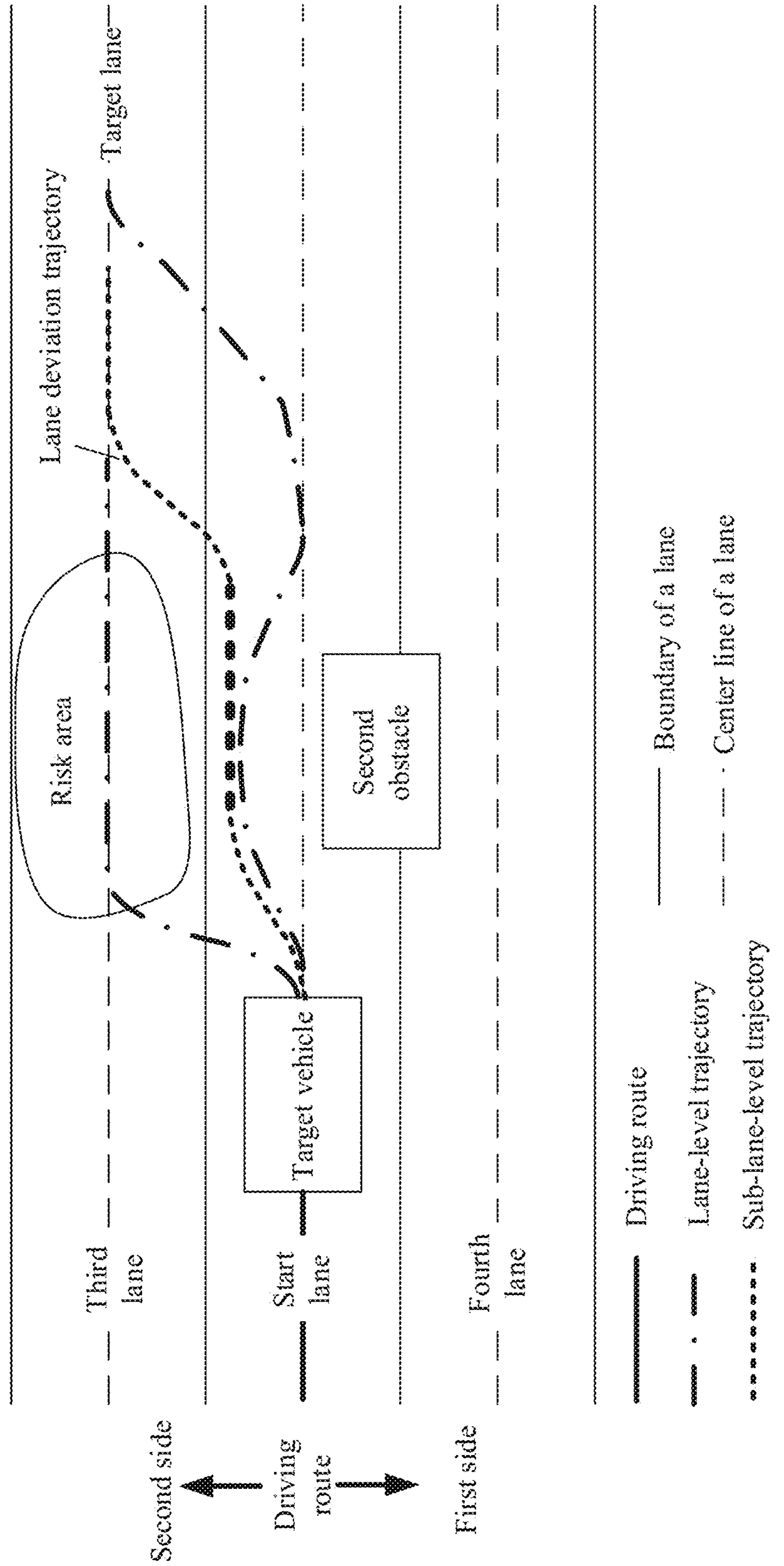
FIG. 12 is a schematic diagram of another application scenario of a sub-lane-level trajectory planning method according to an embodiment of this application.

As shown in FIG. 12, in the lane-level trajectory, the target vehicle directly changes a lane to the center line of the lane of the third lane. If the risk area is included on the second side of the driving route, in the lane-level trajectory, to avoid the second obstacle, the risk area may be not avoided, and the vehicle directly drives into the risk area, as shown in the lane-level trajectory above in FIG. 12. In addition, the lane is changed to the third lane. Alternatively, the second obstacle is first avoided by using the avoidance trajectory near the driving route, and then the lane is changed to the target lane after the driving route is returned, as shown in the lower lane-level trajectory in FIG. 12. For the foregoing two lane-level trajectories, because the first trajectory enters the risk area, there is a high probability that a danger occurs, and driving safety of the target vehicle is low; and because in the second trajectory, a lane needs to be changed after the avoidance, a quantity of turning times is large, and passing efficiency and driving stability of the target vehicle are low.

In the sub-lane-level trajectory, the calculation unit may determine the target trajectory that is located between the boundary on the first side of the start lane and the risk area, and the target trajectory is on the second side of the second obstacle. The calculation unit may further determine a first segment of connection trajectory connecting a current location of the target vehicle and the target trajectory, and a second segment of connection trajectory connecting the target trajectory and the center line of the third lane. The first segment of connection trajectory, the target trajectory, and the second segment of connection trajectory are included the lane deviation trajectory. When the target vehicle drives along the lane deviation trajectory, the target vehicle first turns to the second side along the first segment of connection trajectory and drives to the target trajectory. In a process of driving along the target trajectory, the target vehicle can avoid the second obstacle and the risk area, and then turn to the second side along the second segment of connection trajectory and drives to the third lane.

Compared with the foregoing first lane-level trajectory, the sub-lane-level trajectory in this embodiment of this application avoids the risk area, reduces a possibility that the target vehicle is dangerous, and improves safety. Compared with the foregoing second lane-level trajectory, the sub-lane-level trajectory in this embodiment of this application performs two turnings to the target lane, and turning directions are the same. This reduces a quantity of invalid turning times, and improves passing efficiency, stability, and safety of the target vehicle.

The risk area may include an intersection. In addition to the intersection, the risk area may be another area, for example, a speed-limited road section such as a school.

2.2. There are Obstacles on Both Sides of the Driving Route.

If a second obstacle appears on the first side of the driving route of the target vehicle, and a third obstacle appears on the second side of the driving route of the target vehicle, the obstacles on the both sides need to be avoided.

Figure 13:
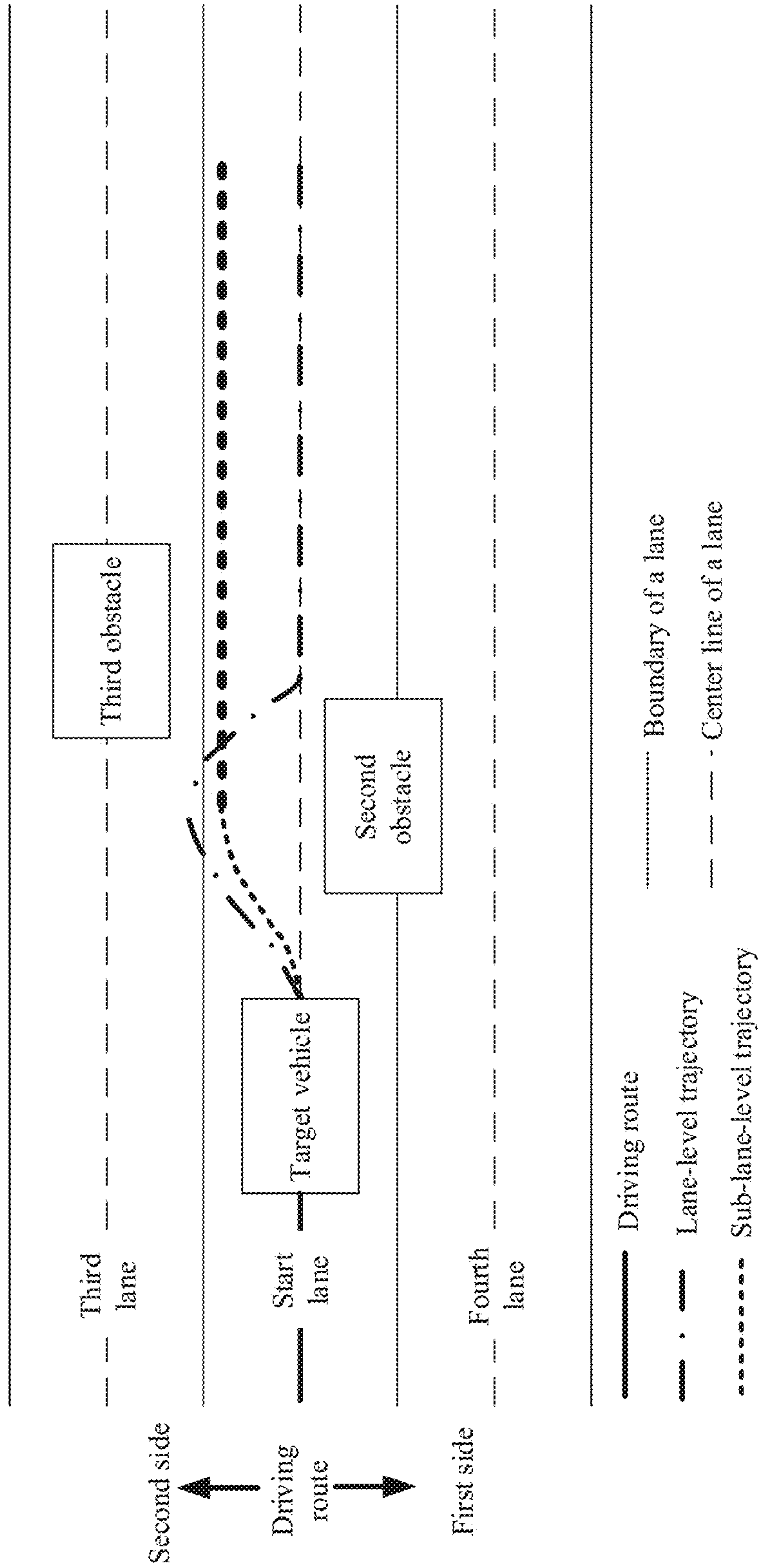
FIG. 13 is a schematic diagram of another application scenario of a sub-lane-level trajectory planning method according to an embodiment of this application.

As shown in FIG. 13, in the lane-level trajectory, the target vehicle needs to turn to the second side to change a lane to avoid the second obstacle, and then turn back to the driving route. If a distance between the third obstacle and the second obstacle in an S direction is small, an avoidance trajectory between the third obstacle and the second obstacle is large relative to a turning angle in an L direction, the driving direction of the target vehicle per unit time needs to be changed at a larger angle, the accumulated curvature of the trajectory points on the trajectory is large, and stability, comfort, and driving safety of the target vehicle are low.

As shown in FIG. 13, in this embodiment of this application, the sub-lane-level trajectory may be determined. The target trajectory in the trajectory is between the boundary on the second side of the start lane and the center line of the lane of the third lane, is on the second side of the second obstacle, and is on the first side of the third obstacle. The connection trajectory is used to connect a current driving location and the target trajectory. The target vehicle may drive along the connection trajectory to the target trajectory, and avoid the second obstacle and the third obstacle at the same time by driving on the target trajectory. In this case, provided that an offset between the target trajectory and the center line of the lane in which the driving route is located is properly determined, driving based on the offset can keep a safe distance from both the second obstacle and the third obstacle, and the obstacles on both the sides of the driving route can be avoided through one turning. Compared with the foregoing lane-level trajectory, the sub-lane-level trajectory does not need a plurality of turning times, and a quantity of invalid turning times is small, to improve passing efficiency of driving of the target vehicle. In addition, the accumulated curvature of the trajectory points on the trajectory is small, and stability, safety, and comfort of the target vehicle are high.

2.2.1. A Lane Needs to be Changed to the Target Lane.

While avoiding the obstacles on both the sides, the target vehicle may further need to change a lane to the target lane. In some embodiments, the target lane may be located on the first side of the driving route, or may be located on the second side of the driving route. The following separately describes the cases.

A. The Target Lane is Located on the First Side of the Driving Route.

When the target lane is on the first side of the driving route, the fourth lane is the target lane.

Figure 14A:
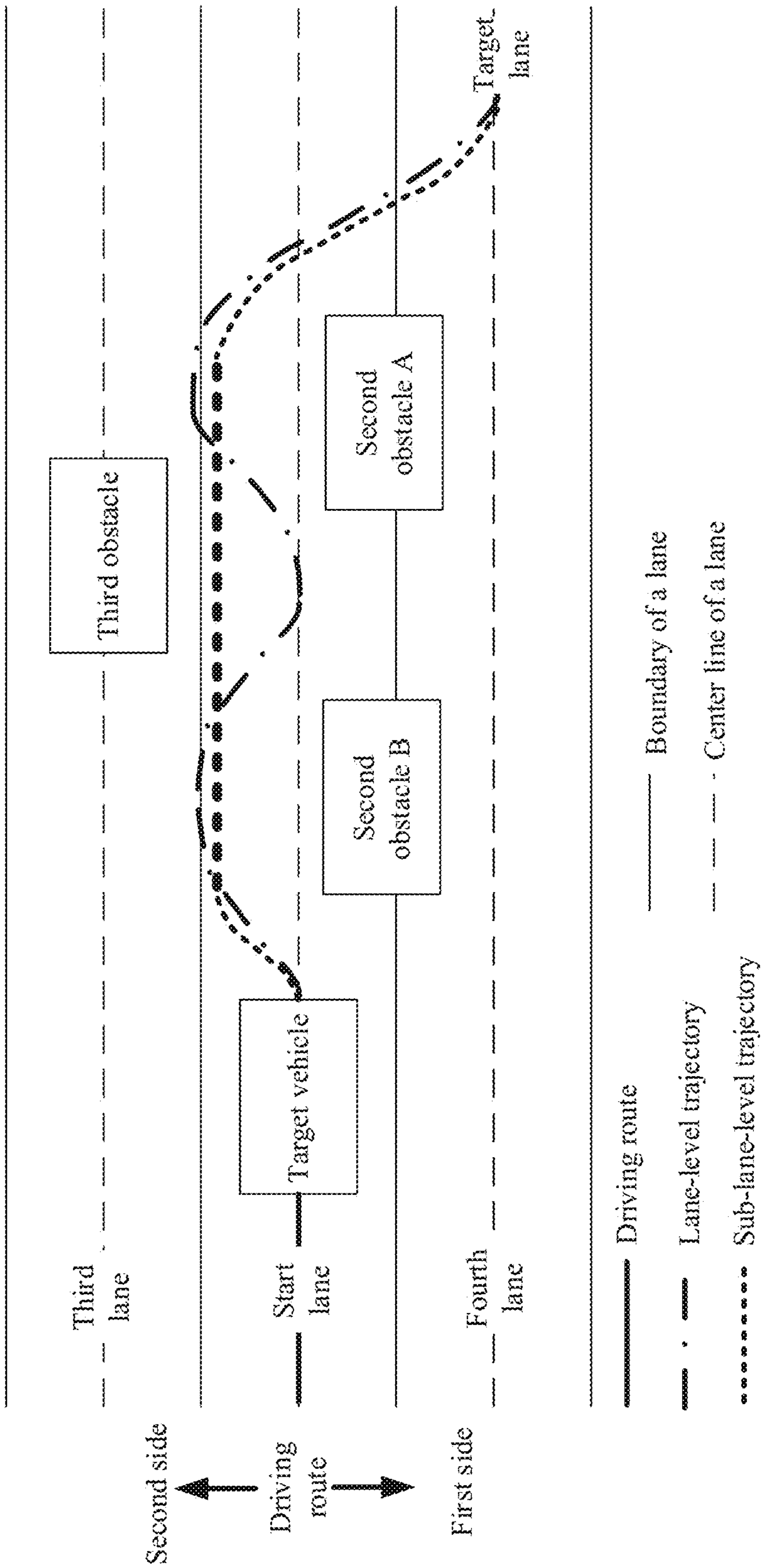
FIG. 14*a* is a schematic diagram of another application scenario of a sub-lane-level trajectory planning method according to an embodiment of this application.

As shown in FIG. 14*a*, in the lane-level trajectory, the target vehicle needs to turn to the second side to avoid the second obstacle B, then turn back to the driving route, avoid the third obstacle at the same time, then turn to the second side to avoid the second obstacle A, then turn back to the driving route, and finally change a lane to the center line of the lane of the fourth lane used as the target lane.

In the sub-lane-level trajectory, the calculation unit may determine the target trajectory that is located between the boundary on the first side of the start lane and the center line of the lane of the third lane, and the target trajectory is on the second side of the second obstacle A and the second side of the second obstacle B. The calculation unit may further determine a first segment of connection trajectory connecting a current location of the target vehicle and the target trajectory, and a second segment of connection trajectory connecting the target trajectory and the center line of the third lane. The first segment of connection trajectory, the target trajectory, and the second segment of connection trajectory are included the lane deviation trajectory. The target vehicle drives along the lane deviation trajectory, and may avoid the second obstacle and the third obstacle on the target trajectory, and then change a lane to the fourth lane along a second segment of lane changing trajectory.

In the planned trajectory in the lane-level trajectory, a total of four turning times need to be performed. However, in the sub-lane-level trajectory in this embodiment of this application, only two turnings need to be performed, so that a quantity of invalid turning times of the target vehicle is reduced, and passing efficiency, stability, and driving safety of the target vehicle are improved. In addition, each turning in the lane-level trajectory is opposite to a previous turning in an L direction. As a result, the driving direction of the target vehicle changes greatly. In the sub-lane-level trajectory planned in this embodiment of this application, each turning is based on an S direction. There is no sharp change in the driving direction as in the lane-level trajectory, and the target vehicle drives more stably and safely.

In addition, compared with the lane-level trajectory, in two turning processes of the sub-lane-level trajectory in this embodiment of this application, an offset distance in an L direction is smaller than an offset distance in an L direction in the lane-level trajectory, change of a driving direction is small, and the target vehicle drives more stably and safely.

B. The Target Lane is Located on the Second Side of the Driving Route.

When the target lane is on the second side of the driving route, the third lane is the target lane.

Figure 14B:
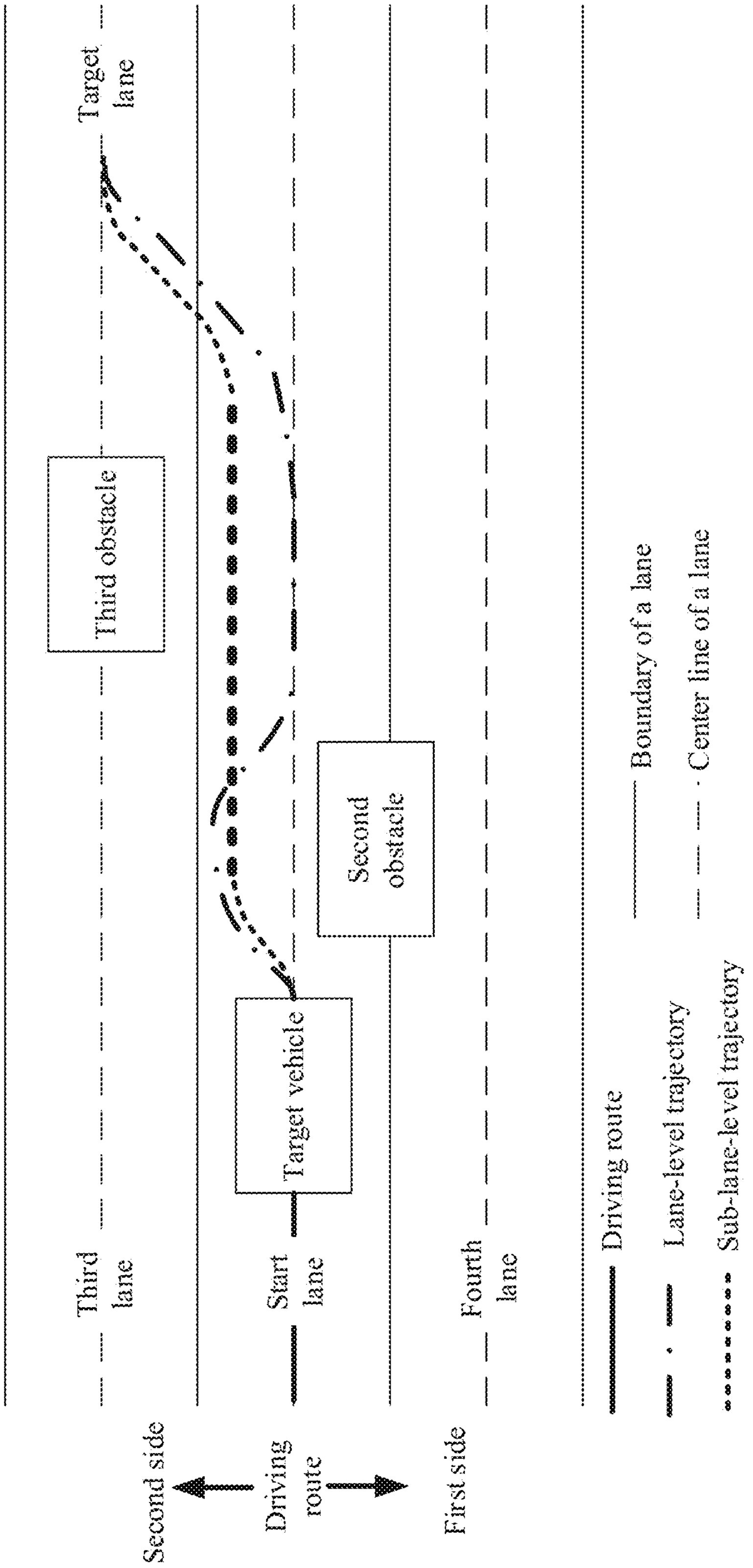
FIG. 14*b* is a schematic diagram of another application scenario of a sub-lane-level trajectory planning method according to an embodiment of this application.

As shown in FIG. 14*b*, in the lane-level trajectory, the target vehicle needs to turn to the second side to avoid the second obstacle, and then turn back to the driving route. After driving on the driving route for a distance, the target vehicle changes a lane from the driving route to the center line of the lane of the third lane, or directly changes a lane to the center line of the lane of the third lane after turning back to the driving route.

In the sub-lane-level trajectory, the calculation unit may determine the target trajectory that is located between the boundary on the first side of the start lane and the center line of the lane of the third lane, and the target trajectory is on the second side of the second obstacle. The calculation unit may further determine a first segment of connection trajectory connecting a current location of the target vehicle and the target trajectory, and a second segment of connection trajectory connecting the target trajectory and the center line of the third lane. The first segment of connection trajectory, the target trajectory, and the second segment of connection trajectory are included the lane deviation trajectory. The target vehicle drives along the lane deviation trajectory, and may avoid the second obstacle and the third obstacle on the target trajectory, and then change a lane to the third lane along the second segment of connection trajectory.

In the planned trajectory in the lane-level trajectory, a total of three turnings need to be performed. However, in the sub-lane-level trajectory in this embodiment of this application, only two turnings need to be performed, so that a quantity of times of changing the driving direction and a quantity of invalid turning times of the target vehicle are reduced, and passing efficiency, stability, and safety are improved. In addition, a plurality of turning directions in the lane-level trajectory are different. As a result, the driving direction of the target vehicle changes greatly. In the sub-lane-level trajectory planned in this embodiment of this application, changed directions of each turning are consistent, and the direction is changed to the second side. There is no sharp change in the driving direction as in the lane-level trajectory, and the target vehicle drives more stably and safely.

In addition, compared with the planned trajectory in the lane-level trajectory, in two turning processes of the sub-lane-level trajectory in this embodiment of this application, an offset distance in an L direction is smaller than an offset distance in an L direction in the lane-level trajectory, change of the driving direction is small, and the target vehicle drives more stably and safely.

2.3. There are Obstacles on One Side and in Front of the Driving Route.

Figure 15:
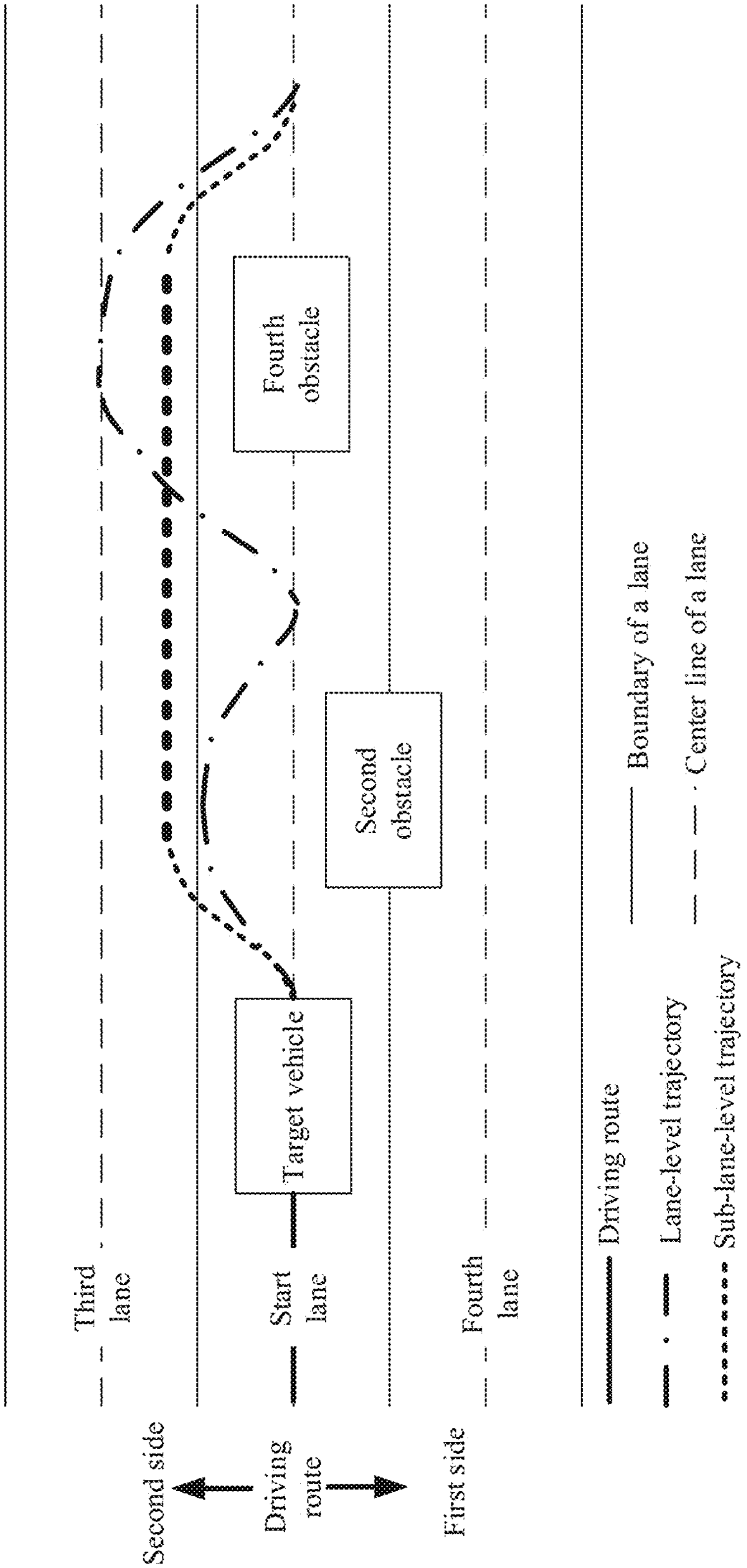
FIG. 15 is a schematic diagram of another application scenario of a sub-lane-level trajectory planning method according to an embodiment of this application.

As shown in FIG. 15, if a second obstacle appears on the first side of the driving route of the target vehicle, and a fourth obstacle appears in front of the target vehicle in a direction of the driving route, the target vehicle needs to drive to the second side to avoid the obstacles.

As shown in FIG. 15, in the lane-level trajectory, the target vehicle needs to turn to the second side to avoid the second obstacle, then turn back to the driving route, and then change a lane from the driving route to the third lane on the second side, to overtake the fourth obstacle by using the third lane to borrow a lane, and return to the driving route after the overtaking ends.

In the sub-lane-level trajectory, the calculation unit may determine the target trajectory that is located between the boundary on the first side of the start lane and the center line of the lane of the third lane, and the target trajectory is on the second side of the second obstacle. The calculation unit may further determine a first segment of connection trajectory connecting a current location of the target vehicle and the target trajectory, and a second segment of connection trajectory connecting the target trajectory and the driving route. The first segment of connection trajectory, the target trajectory, and the second segment of connection trajectory are included the lane deviation trajectory. The target vehicle drives along the lane deviation trajectory, so that the second obstacle and the fourth obstacle can be avoided on the target trajectory.

In this embodiment of this application, the target trajectory is on both the second side of the second obstacle and the second side of the fourth obstacle. The target trajectory directly avoids, through one turning, the obstacle on the first side of the driving route and the obstacle in front of the driving route, and then turns to the first side on the target trajectory to return to the driving route. It is not needed that an avoidance trajectory is used to avoid the obstacle on one side and then overtake the obstacle in front as shown in the lane-level trajectories in FIG. 15, or that the avoidance trajectory is used to avoid the obstacle on one side after overtaking. This reduces a quantity of turning times and a quantity of invalid turning times of the target vehicle, and improves passing efficiency. In addition, switching of the target vehicle between different lane center lines is reduced, and driving stability and safety of the target vehicle are improved.

While avoiding the obstacle on one side and the obstacle in front, the target vehicle may further need to change a lane to the target lane. In some embodiments, the target lane may be located on the first side of the driving route, or may be located on the second side of the driving route. The following separately describes the cases.

A. The Target Lane is Located on the First Side of the Driving Route.

Figure 16A:
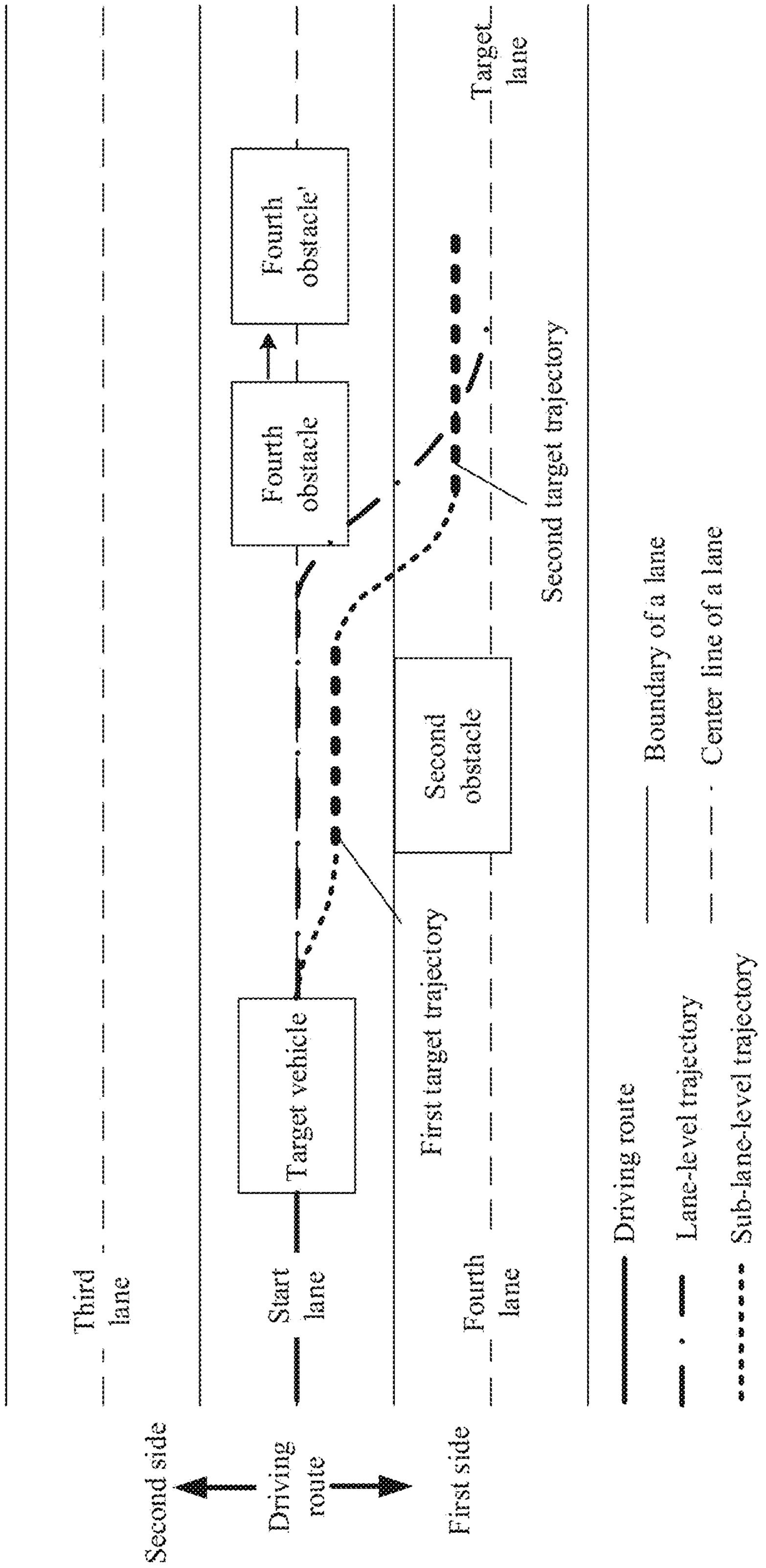
FIG. 16*a* is a schematic diagram of another application scenario of a sub-lane-level trajectory planning method according to an embodiment of this application.

As shown in FIG. 16*a*, when both the target lane and the obstacle are located on the first side of the driving route, and there is the obstacle in front of the driving route, there is the fourth obstacle in front of the target vehicle on the driving route, there is the second obstacle on the first side of the driving route, and the target lane is the fourth lane. In addition, a distance between the fourth obstacle and the second obstacle in an S direction is excessively small, and there is a high probability that the target vehicle collides with fourth obstacle and the second obstacle when the target vehicle is between the fourth obstacle and the second obstacle and changes a lane from the driving route to the fourth lane.

In this case, in the lane-level trajectory, the target vehicle needs to wait until the distance between the fourth obstacle and the second obstacle in an S direction increases, and a location relationship between the two obstacles changes to a location relationship between the fourth obstacle' and the second obstacle in the figure, so that the target vehicle can change a lane to the fourth lane used as the target lane, to ensure that the target vehicle does not collide with the second obstacle or the fourth obstacle. If a relative location relationship between the fourth obstacle and the second obstacle keeps unchanged, the target vehicle may not be able to change a lane to the target lane.

In the sub-lane-level trajectory, a first target trajectory may be determined between the driving route and the fourth lane, so that the first target trajectory is located between the second obstacle and the boundary on the second side of the start lane, and a distance between the first target trajectory and the second obstacle can ensure that the target vehicle does not collide with the second obstacle. A distance from the target lane by using the first target trajectory is reduced, and the second obstacle is avoided at the same time. The first target trajectory is connected to the center line of the target lane to obtain a connection trajectory, lane changing to the fourth lane is implemented by using the connection trajectory, and the fourth obstacle is avoided at the same time. Compared with a lane changing trajectory in the lane-level trajectory, an offset distance in an L direction in the connection trajectory in the sub-lane-level trajectory is reduced, so that in a process in which the target vehicle turns and drives, change of a driving direction is reduced, and an area in which the target vehicle may collide with the obstacle is reduced. In this way, a possibility that no collision occurs when a lane is changed between the second obstacle and the fourth obstacle is increased. Therefore, on a premise of ensuring that no collision occurs, a lane can be changed to the target lane without waiting for increasing the distance between the fourth obstacle and the second obstacle, to improve passing efficiency of the target vehicle.

In some embodiments, as shown in FIG. 16*a*, a parallel trajectory on the target lane may be set as a second target trajectory that is located on the second side of the center line of the target lane, and a trajectory for changing a lane to the target lane is a connection trajectory connecting the first target trajectory and the second target trajectory. Compared with the lane changing trajectory to the target lane in the lane-level trajectory, a distance between the first target trajectory and the second target trajectory is less than a distance between the driving route and the center line of the target lane, and an offset distance of the lane changing trajectory in an L direction is further reduced, so that change of the driving direction in a lane changing process is further reduced. As described in the foregoing paragraph, passing efficiency of the target vehicle is improved.

B. The Target Lane is Located on the Second Side of the Driving Route.

Figure 16B:
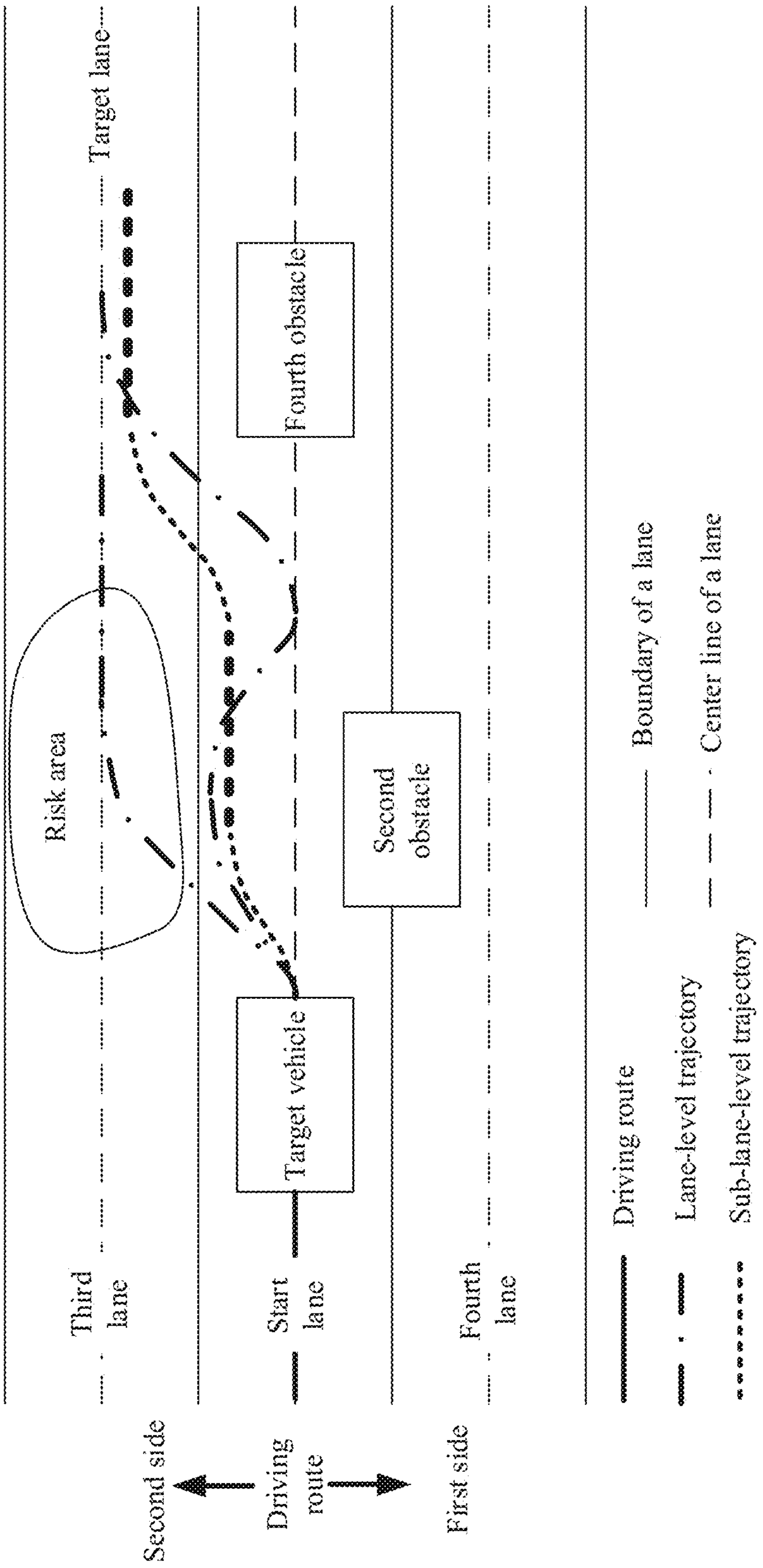
FIG. 16*b* is a schematic diagram of another application scenario of a sub-lane-level trajectory planning method according to an embodiment of this application.

As shown in FIG. 16*b*, when the obstacle is located on the first side of the driving route, the fourth obstacle is further included in front of the target vehicle on the driving route, and a risk area is further included on the second side of the driving route, the target lane is on the second side of the driving route, and the target lane is the third lane.

There are two possible trajectories in the lane-level trajectory. In a first possibility, to avoid the fourth obstacle and the second obstacle, as shown in the upper lane-level trajectory in FIG. 16*b*, the risk area may be not avoided, and the vehicle directly drives into the risk area, and lane changing to the target lane is implemented. In a second possibility, as shown in the lower lane-level trajectory in FIG. 16*b*, the second obstacle is first avoided near the driving route, then lane changing to the target lane is implemented after returning to the driving route, and the fourth obstacle is avoided at the same time. For the foregoing two lane-level trajectories, because the first trajectory enters the risk area, there is a high probability that a danger occurs, and driving safety of the target vehicle is low; and because in the second trajectory, a lane is changed after the avoidance, and a total of three turnings are needed. A quantity of turning times is large, and passing efficiency and driving stability of the target vehicle are low.

In the sub-lane-level trajectory, the calculation unit may determine the target trajectory that is located between the second obstacle and the risk area, a first segment of connection trajectory connecting a current location of the target vehicle and the target trajectory, and a second segment of connection trajectory connecting the target trajectory and the third lane. The first segment of connection trajectory, the target trajectory, and the second segment of connection trajectory are included the lane deviation trajectory. The target vehicle drives along the lane deviation trajectory, and may avoid the second obstacle and the risk area by using the target trajectory, then change a lane to the third lane by using the second segment of connection trajectory, and avoid the fourth obstacle at the same time.

Compared with the foregoing first lane-level trajectory, the sub-lane-level trajectory in this embodiment of this application avoids the risk area, reduces a possibility that the target vehicle is dangerous, and improves safety. Compared with the foregoing second lane-level trajectory, the sub-lane-level trajectory in this embodiment of this application performs two turnings to the target lane, and turning directions are the same. This reduces a quantity of invalid turning times, and improves passing efficiency, stability, and safety of the target vehicle.

The risk area may include an intersection. In addition to the intersection, the risk area may be another area, for example, a speed-limited road section such as a school.

2.4. There are Obstacles on Both Sides and in Front of the Driving Route.

Figure 17:
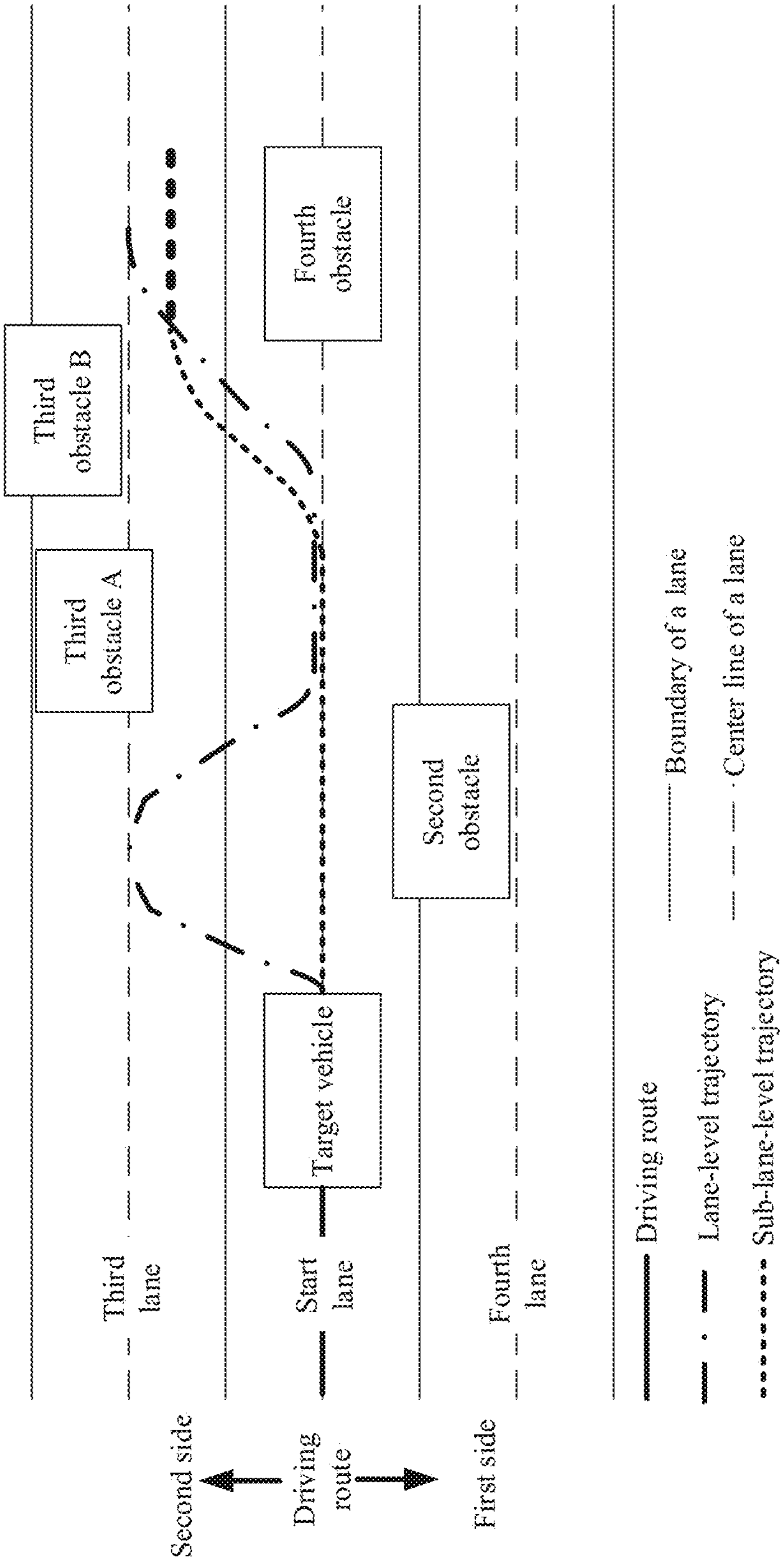
FIG. 17 is a schematic diagram of another application scenario of a sub-lane-level trajectory planning method according to an embodiment of this application.

As shown in FIG. 17, if a second obstacle appears on the first side of the driving route of the target vehicle, a third obstacle A and a third obstacle B appear on the second side of the driving route, and a fourth obstacle appears in front of the target vehicle in a direction of the driving route, the obstacles on three sides need to be avoided. The third obstacle A or the fourth obstacle is a static obstacle or an obstacle that drives at a low speed, for example, a road end or a risk area. The third obstacle A and the third obstacle B are on the third lane, and the third lane is an adjacent lane on the second side of a lane on which the driving route is located.

As shown in FIG. 17, in the lane-level trajectory, to avoid that the fourth obstacle in front of the driving route blocks driving of the target vehicle, the target vehicle needs to change a lane to the center line of the lane of the third lane, to drive on the third lane. However, there is the third obstacle A on the third lane that blocks the target vehicle from continuing to drive. Therefore, the target vehicle needs to change a lane back to the driving route, and then change a lane from the driving route to the third lane, to avoid both the third obstacle B and the fourth obstacle.

In the sub-lane-level trajectory, the calculation unit may determine the target trajectory that is located on the first side of the third obstacle A, the first side of the third obstacle B, and the second side of the fourth obstacle, and determine a connection trajectory connecting the target trajectory to the driving route. The lane deviation trajectory includes the foregoing target trajectory and the connection trajectory.

In this embodiment of this application, the target trajectory is on the second side of the fourth obstacle, the fourth obstacle is directly avoided through one turning, and safe distances are kept between the target trajectory and the third obstacle A and the third obstacle B by using the target trajectory. There is no need to do the actions as shown in the lane-level trajectory in FIG. 17: Three times of lane changing are needed to reach a location that is on the target lane and where there is no obstacle in front to block the target vehicle. This reduces a quantity of turning times of the target vehicle and switching of the target vehicles between different lane center lines, and improves driving stability and safety of the target vehicle.

As shown in FIG. 17, the target trajectory is on the first side of the center line of the third lane, and is used to avoid the third obstacle B on the third lane. In addition to the first side of the center line of the third lane, the target trajectory may also be located at another location, for example, the second side of the center line of the third lane. A prerequisite for this case is that the third obstacle B does not exist, and an actual location of the fourth obstacle needs to be offset to the second side for a little distance compared with the location shown in the figure. In this case, the target trajectory is moved to the second side to avoid the fourth obstacle. This is not limited herein.

While avoiding the obstacle, the target vehicle may further need to change a lane to the target lane. In some embodiments, the target lane may be located on the first side of the driving route, or may be located on the second side of the driving route. The following separately describes the cases.

A. The Target Lane is Located on the First Side of the Driving Route.

Figure 18A:
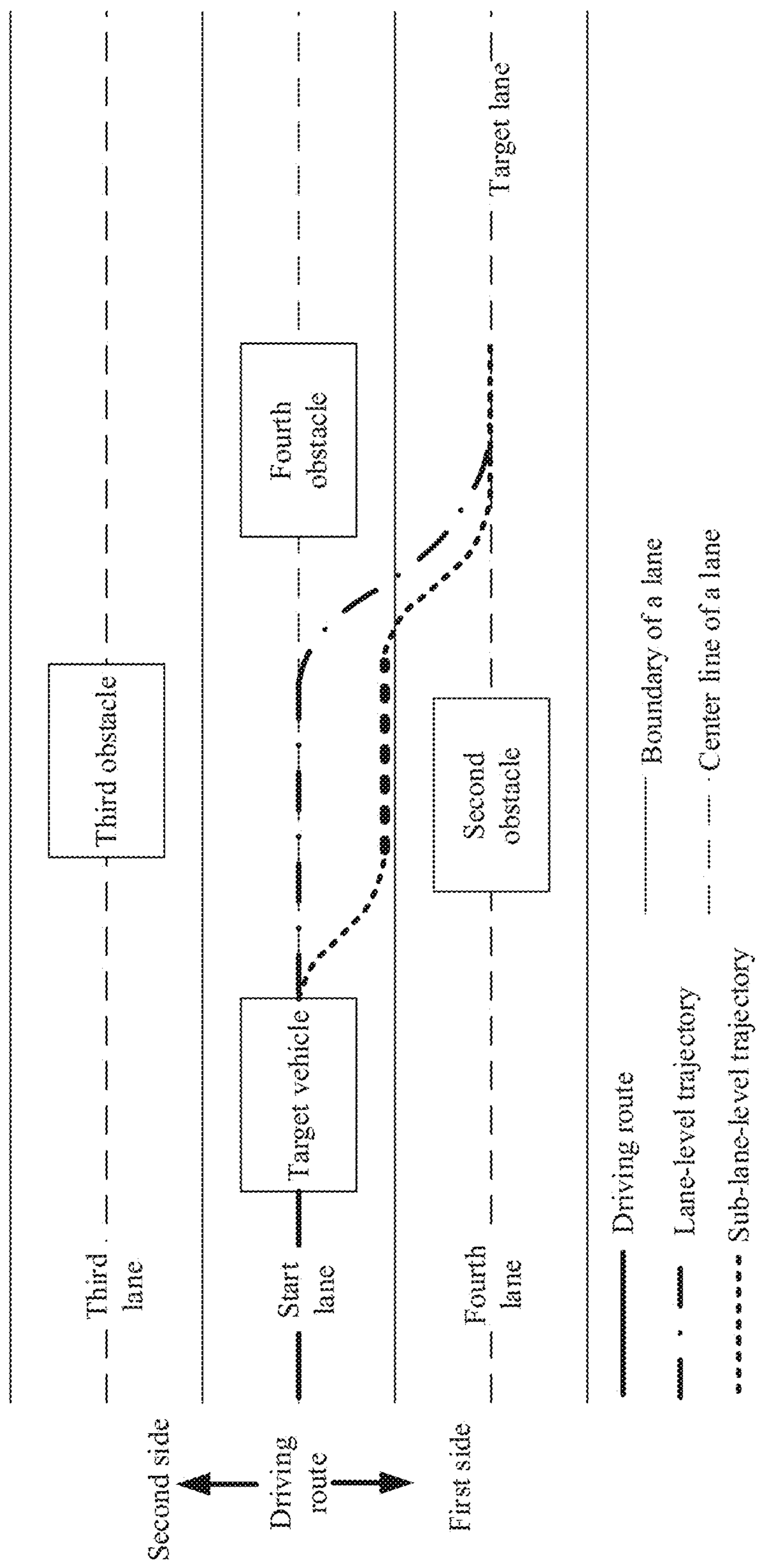
FIG. 18*a* is a schematic diagram of another application scenario of a sub-lane-level trajectory planning method according to an embodiment of this application.

As shown in FIG. 18*a*, when there are obstacles on both sides of the driving route, there is also an obstacle in front of the driving route, and the target lane is located on the first side of the driving route, the fourth lane is the target lane.

In the lane-level trajectory, a lane is directly changed from the driving route to the center line of the fourth lane used as the target lane.

In the sub-lane-level trajectory, the calculation unit may determine the target trajectory that is located between the boundary on the second side of the start lane and the center line of the fourth lane, and a connection trajectory connecting the target trajectory to the fourth lane. The lane deviation trajectory includes the foregoing target trajectory and the connection trajectory. A distance between the target vehicle and the target lane is reduced by using the target trajectory, to facilitate a lane changing to the target lane. In addition, a safe distance between the target vehicle and the second obstacle may be kept by using the target trajectory. The connection trajectory is used to change a lane to the target lane, and is used to avoid the fourth obstacle in front of the driving route.

The target vehicle may be close to the target lane on the target trajectory, to reduce a deviation degree in an L direction in a lane changing process. The driving direction of the target vehicle per unit time needs to be changed at a smaller angle, and accumulated curvature of trajectory points on the trajectory is smaller, to improve driving stability and safety of the target vehicle. In addition, after the trajectory is connected, a parallel trajectory on the target lane may be determined based on a location of the fourth obstacle. As shown in FIG. 18*a*, if the fourth obstacle is on the center line of the lane of the start lane, a lane is changed to the center line of the target lane; or if the location of the fourth obstacle is a location at which the center line of the start lane is deviated for a distance from the fourth lane, a lane may be changed to the target trajectory on the fourth lane. The target trajectory is on the first side of the center line of the fourth lane, and is used to avoid collision with the fourth obstacle.

B. The Target Lane is Located on the Second Side of the Driving Route.

Figure 18B:
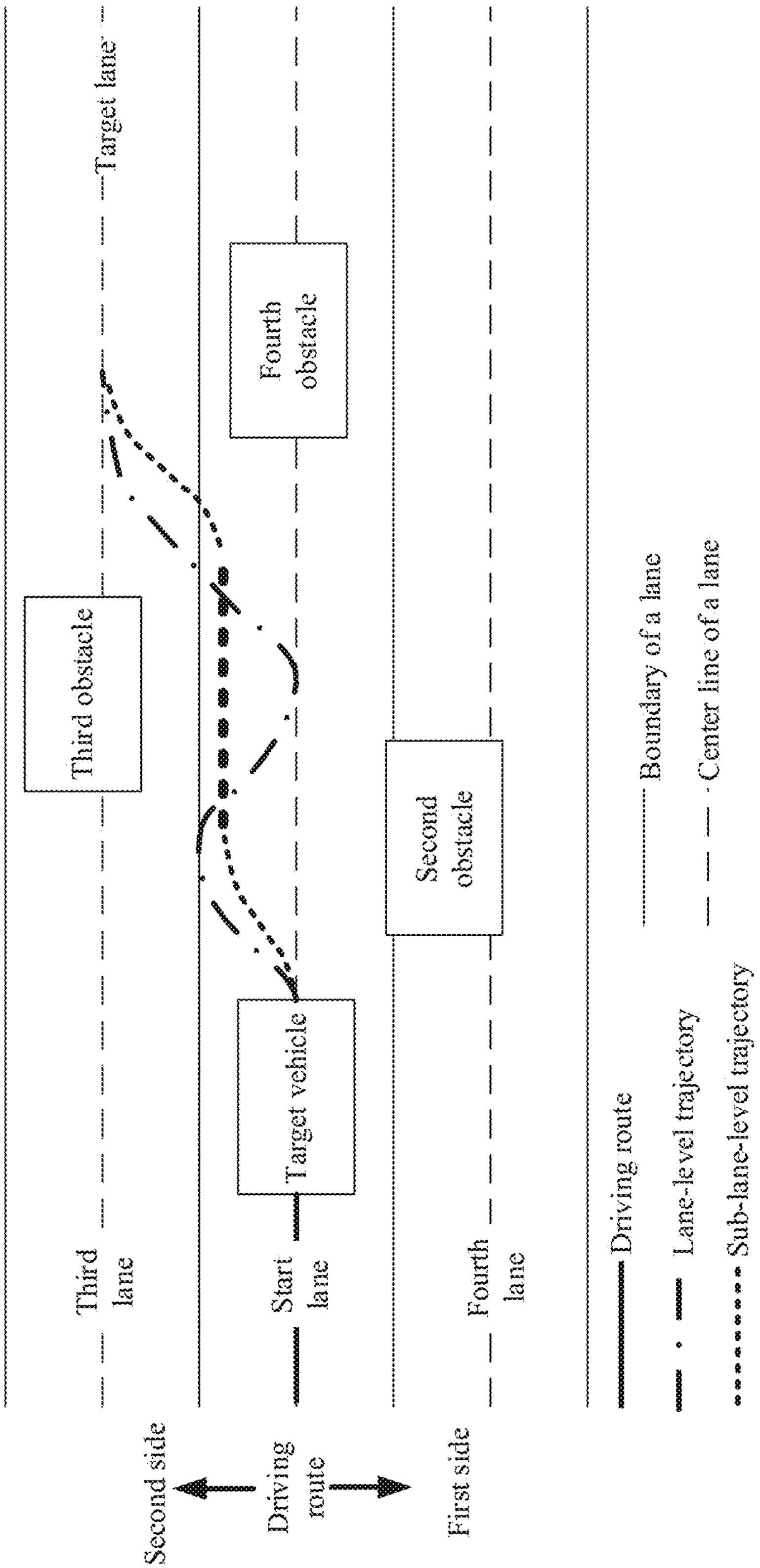
FIG. 18*b* is a schematic diagram of another application scenario of a sub-lane-level trajectory planning method according to an embodiment of this application.

As shown in FIG. 18*b*, when there are obstacles on both sides of the driving route, there is also an obstacle in front of the driving route, and the target lane is located on the second side of the driving route, the third lane is the target lane.

In the lane-level trajectory, the target vehicle needs to turn to the second side to avoid the second obstacle, then turn back to the driving route, and then change a lane from the driving route to the third lane to avoid the fourth obstacle.

In the sub-lane-level trajectory, the calculation unit may determine the target trajectory between the boundary on the first side of the start lane and the center line of the lane of the third lane, and a connection trajectory connecting the target trajectory and the third lane. The lane deviation trajectory includes the foregoing target trajectory and the connection trajectory. An offset between the target trajectory and the center line of the third lane depends on motion information of the third obstacle, provided that an appropriate offset is set to ensure that the target vehicle drives along the target trajectory and does not collide with the third obstacle. The connection trajectory is used to change a lane to the third lane and avoid the fourth obstacle in front of the driving route.

In this embodiment of this application, the target trajectory is on the second side of the second obstacle, the target trajectory avoids, through one turning, the obstacle on the first side of the driving route, and then avoids the fourth obstacle in front of the target vehicle on the driving route by using the connection trajectory. There is no need for the target vehicle to enter the target lane with three turnings on the premise of avoiding collision, as shown in the lane-level trajectory in FIG. 18*c*, to reduce a quantity of turning times of the target vehicle and switching between different lane center lines, and improve passing efficiency, stability, and driving safety of the target vehicle.

3. the Target Vehicle is in a State in which the Target Vehicle is to Change a Lane.

When the target vehicle needs to change a lane from the start lane to the target lane, there may be two cases based on road condition information: 1. There is an obstacle between the start lane and the target lane. 2. There is an obstacle, on the target lane, on the side far away from the start lane. Descriptions are separately provided below.

3.1. There is an Obstacle Between the Start Lane and the Target Lane.

Figure 19A:
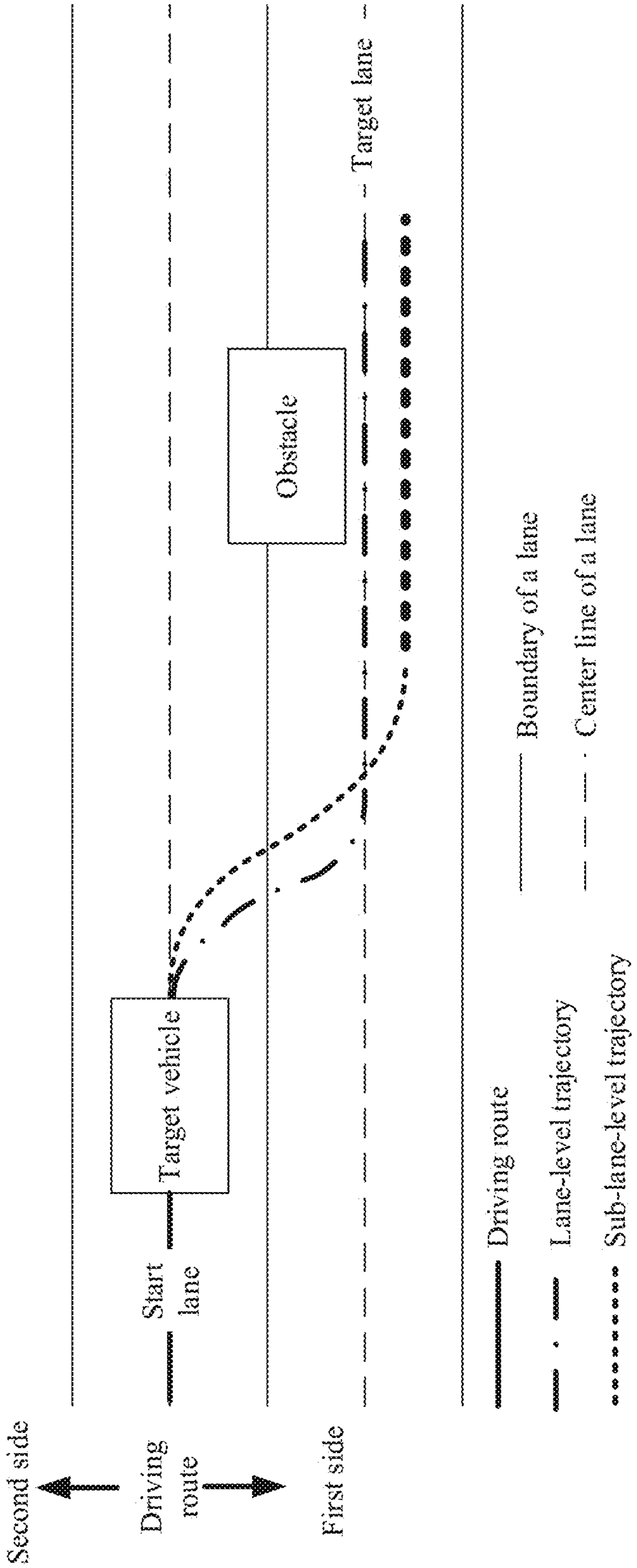
FIG. 19*a* is a schematic diagram of another application scenario of a sub-lane-level trajectory planning method according to an embodiment of this application.

Refer to FIG. 19*a*. When there is the obstacle between the center line of the start lane and the center line of the target lane, to be specific, when there is the obstacle on the second side of the center line of the target lane, in the lane-level trajectory, a lane can be changed only from the center line of the start lane to the center line of the target lane, and the obstacle cannot be avoided.

In the sub-lane-level trajectory, the target trajectory that is on the target lane and that is on the first side of the center line of the target lane may be determined, and a distance between the target trajectory and the obstacle is set, so that the target vehicle does not collide with the obstacle. The target vehicle changes a lane from the start lane to the target trajectory, to avoid collision with the obstacle, and improve driving safety of the target vehicle. In the lane-level trajectory, avoiding the obstacle can only be implemented by using an avoidance trajectory or a lane changing trajectory. In addition to the lane changing trajectory, a turning is need. However, in the sub-lane-level trajectory, both lane changing and avoidance functions are included by using one lane changing trajectory, to reduce a quantity of turning times and a quantity of invalid turning times, and improve passing efficiency, stability, and driving safety of the target vehicle.

3.2. There is an Obstacle, on the Target Lane, on a Side Away from the Start Lane.

Figure 19B:
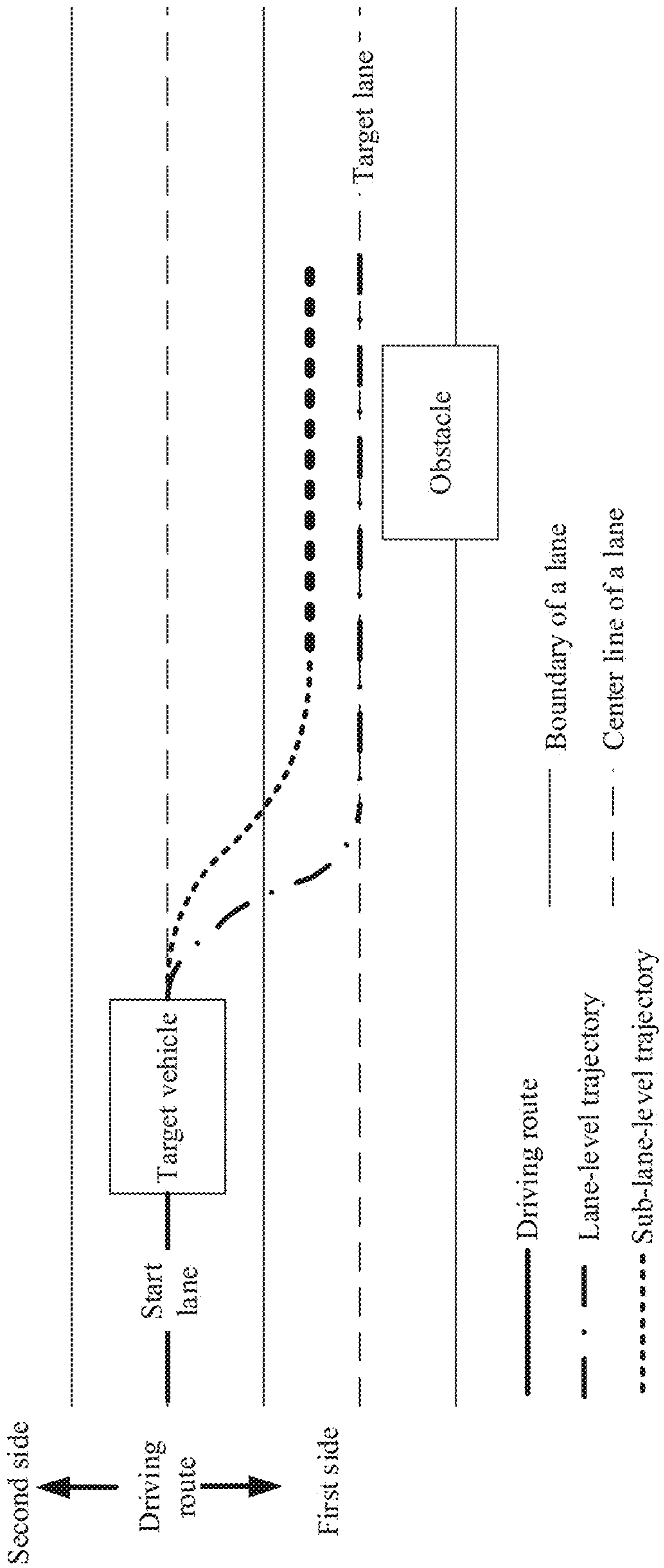
FIG. 19*b* is a schematic diagram of another application scenario of a sub-lane-level trajectory planning method according to an embodiment of this application.

Refer to FIG. 19*b*. When there is the obstacle, on the target lane, on the side away from the start lane, to be specific, when there is the obstacle on the first side of the center line of the target lane, in the lane-level trajectory, a lane can be changed only from the center line of the start lane to the center line of the target lane, and the obstacle cannot be avoided.

In the sub-lane-level trajectory, the target trajectory that is on the target lane and that is on the second side of the center line of the target lane may be determined, and a distance between the target trajectory and the obstacle is set, so that the target vehicle does not collide with the obstacle. The target vehicle changes a lane from the start lane to the target trajectory, to avoid collision with the obstacle, and improve driving safety of the target vehicle. In the lane-level trajectory, avoiding the obstacle can only be implemented by using an avoidance trajectory or a lane changing trajectory. In addition to the lane changing trajectory, a turning is need. However, in the sub-lane-level trajectory, both lane changing and avoidance functions are included by using one lane changing trajectory, to reduce a quantity of turning times and a quantity of invalid turning times, and improve passing efficiency, stability, and driving safety of the target vehicle.

It should be noted that, for all the sub-lane-level trajectories in FIG. 8 to FIG. 19*b*, to avoid the obstacle or the risk area, the target trajectory that deviates from the center line of the lane is set. Therefore, all the sub-lane-level trajectories in FIG. 8 to FIG. 19*b* may be referred to as lane deviation trajectories.

The foregoing describes the sub-lane-level trajectory planning method and the various application scenarios in embodiments of this application. The sub-lane-level trajectory planning method provided in embodiments of this application needs to be implemented by using a calculation unit. The following describes a structure of the calculation unit used to implement the method.

4. Structure of the Calculation Unit in this Embodiment of this Application

Figure 20A:
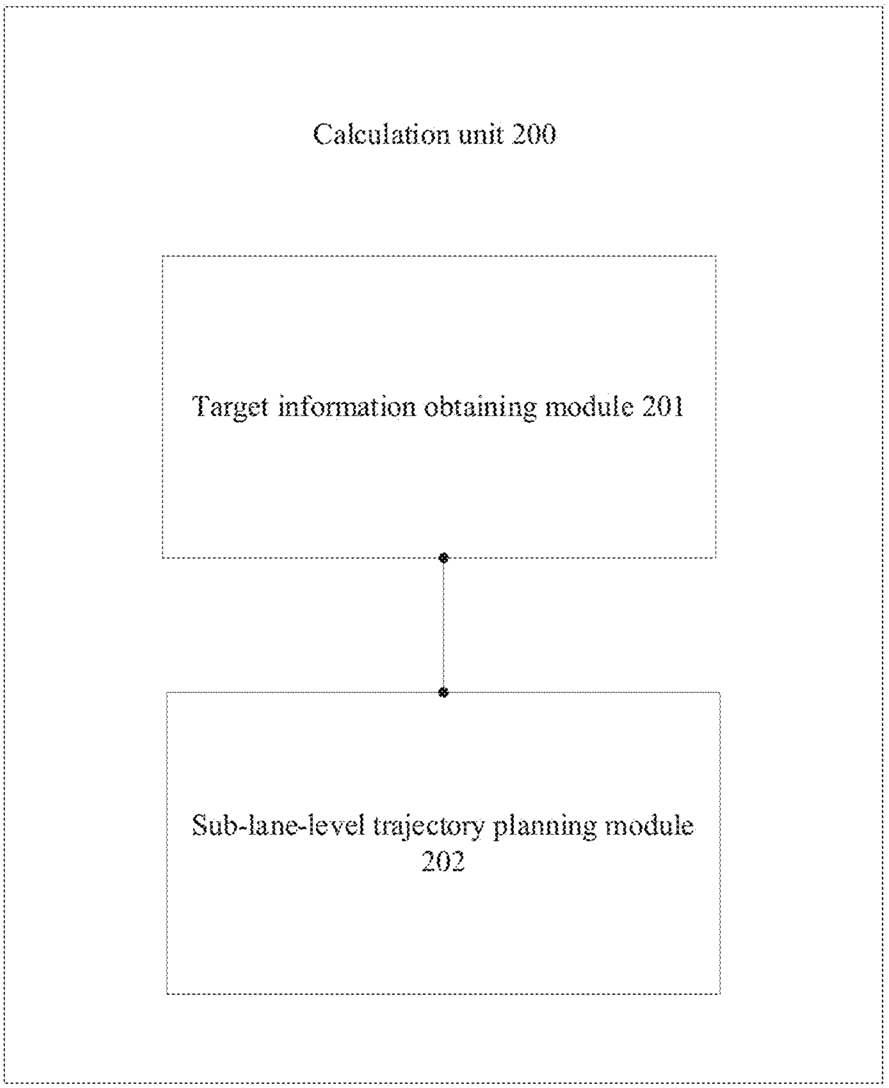
FIG. 20*a* is a schematic diagram of a structure of a calculation unit according to an embodiment of this application.

Refer to FIG. 20*a*. FIG. 20*a* is a diagram of a structure of a calculation unit 200 according to an embodiment of this application. The calculation unit 200 includes a target information obtaining module 201 and a sub-lane-level trajectory planning module 202.

The target information obtaining module 201 is configured to: obtain target information, where the target information includes at least one of a driving status of a target vehicle and first road condition information.

The sub-lane-level trajectory planning module 202 is configured to: determine a first planned trajectory of the target vehicle based on the target information, where the first planned trajectory includes a target trajectory, the target trajectory is parallel to a center line of a lane, and the target trajectory is located in an area between the center line of the lane and a boundary of the lane, or on the boundary of the lane.

The target information obtaining module 201 is configured to perform step 201 in the embodiment shown in FIG. 2 and step 401 in the embodiment shown in FIG. 4. The sub-lane-level trajectory planning module 202 is configured to perform step 202 in the embodiment shown in FIG. 2 or steps 402 to 409 in the embodiment shown in FIG. 4.

The calculation unit 200 is configured to implement the sub-lane-level trajectory planning methods shown in FIG. 2 to FIG. 19*b*.

In an optional implementation, the driving status includes a driving route of the target vehicle, and the first road condition information includes motion information of at least one obstacle and/or a target lane.

The sub-lane-level trajectory planning module 202 is configured to: determine the first planned trajectory based on the motion information of the at least one obstacle, where the first planned trajectory indicates the target vehicle to drive to the target trajectory, and the target trajectory is on a lane on which the at least one obstacle is located and/or a target lane, or the target trajectory is on a lane adjacent to a lane on which the at least one obstacle is located and/or the target lane.

In an optional implementation, the first road condition information includes a first lane on which the target vehicle is currently located, a second lane adjacent to the first lane, and motion information of a first obstacle on the second lane, and the driving status includes that the target vehicle drives along a lane changing trajectory, and the lane changing trajectory points from the first lane to the second lane.

The sub-lane-level trajectory planning module 202 is configured to: determine the first planned trajectory as a lane changing keeping trajectory based on the motion information of the first obstacle, where the lane changing keeping trajectory includes a target trajectory, the lane changing keeping trajectory indicates the target vehicle to drive to the target trajectory, and the target trajectory is between a center line of the first lane and a center line of the second lane.

In an optional implementation, the sub-lane-level trajectory planning module 202 is further configured to: control, based on the lane changing keeping trajectory, the target vehicle to drive to the target trajectory.

The target information obtaining module 201 is further configured to: obtain second road condition information of the target vehicle.

The sub-lane-level trajectory planning module 202 is further configured to: determine a second planned trajectory of the target vehicle based on the second road condition information, where the second planned trajectory indicates the target vehicle to change a lane from the target trajectory to the second lane.

In an optional implementation, the first road condition information includes the driving route of the target vehicle and motion information of a second obstacle, the second obstacle is located on a first side of the driving route, and the driving route is parallel to the center line of the lane.

The sub-lane-level trajectory planning module 202 is configured to: determine the first planned trajectory as a lane deviation trajectory based on the motion information of the second obstacle, where the lane deviation trajectory includes a deviation trajectory and the target trajectory, the deviation trajectory indicates the target vehicle to turn to a second side until the target vehicle drives to the target trajectory, the second side and the first side are on different sides of the driving route, and there is at least one second obstacle.

In an optional implementation, the first road condition information includes motion information of a third obstacle, and the third obstacle is located on the second side of the driving route.

The sub-lane-level trajectory planning module 202 is configured to: determine the first planned trajectory as the lane deviation trajectory based on the motion information of the second obstacle and the third obstacle, where the lane deviation trajectory indicates the target vehicle to turn to the second side along the deviation trajectory until the target vehicle drives to the target trajectory, where the target trajectory is on the second side of the second obstacle and the first side of the third obstacle.

In an optional implementation, the first road condition information includes motion information of a fourth obstacle, and the fourth obstacle is located in front of the target vehicle on the driving route.

The sub-lane-level trajectory planning module 202 is configured to: determine the first planned trajectory as the lane deviation trajectory based on the motion information of the second obstacle and the fourth obstacle, where the lane deviation trajectory indicates the target vehicle to turn to the second side along the deviation trajectory until the target vehicle drives to the target trajectory, where the target trajectory is on the second side of the second obstacle and the second side of the fourth obstacle.

In an optional implementation, the first road condition information includes motion information of a fourth obstacle, and the fourth obstacle is located in front of the target vehicle on the driving route.

The sub-lane-level trajectory planning module 202 is configured to determine the first planned trajectory as the lane deviation trajectory based on the motion information of the second obstacle, the third obstacle, and the fourth obstacle, where the lane deviation trajectory indicates the target vehicle to drive along the deviation trajectory to the target trajectory, where the target trajectory is on the second side of the second obstacle, the second side of the fourth obstacle, and the first side of the third obstacle; or indicates the target vehicle to drive to a first target trajectory in the target trajectory, and then drive to a second target trajectory in the target trajectory, where the first target trajectory is on the second side of the second obstacle, the second side of the fourth obstacle, and the first side of the third obstacle, and the second target trajectory is on the second side of the second obstacle, the second side of the fourth obstacle, and the first side of the third obstacle.

In an optional implementation, the first road condition information includes motion information of a second obstacle and a fourth obstacle, the second obstacle is located on a first side of the driving route, the fourth obstacle is located in front of the target vehicle on the driving route.

The sub-lane-level trajectory planning module 202 is configured to: determine the first planned trajectory as the lane deviation trajectory based on the first road condition information, where the lane deviation trajectory includes a first deviation trajectory, the target trajectory, and a second deviation trajectory, and the lane deviation trajectory indicates the target vehicle to drive along the first deviation trajectory to the target trajectory, and then drive along the second deviation trajectory to the front of the fourth obstacle on the driving route, where the target trajectory is on a second side of the second obstacle and the first side of the fourth obstacle.

In an optional implementation, the driving route is located on a start lane, the lane deviation trajectory further includes the lane changing trajectory, the lane changing trajectory indicates the target vehicle to turn from the target trajectory to a center line of a lane of the target lane, and the start lane is different from the target lane.

In an optional implementation, the sub-lane-level trajectory planning module 202 is configured to: determine a plurality of candidate trajectories of the target vehicle based on the target information; and determine the first planned trajectory from the plurality of candidate trajectories based on at least one of the following: degrees of deviation of points on the plurality of candidate trajectories from the center line of the lane, curvature of the plurality of candidate trajectories, switching degrees of the plurality of candidate trajectories relative to a current trajectory, and a degree of deviation between a lane on which the target trajectory is located and a lane on which the driving route of the target vehicle is located.

In an optional implementation, the sub-lane-level trajectory planning module 202 is configured to: determine an action sequence based on the target information, where the action sequence includes at least one action and an action time sequence between the at least one action; and determine a first planned trajectory for implementing the action sequence.

Figure 20B:
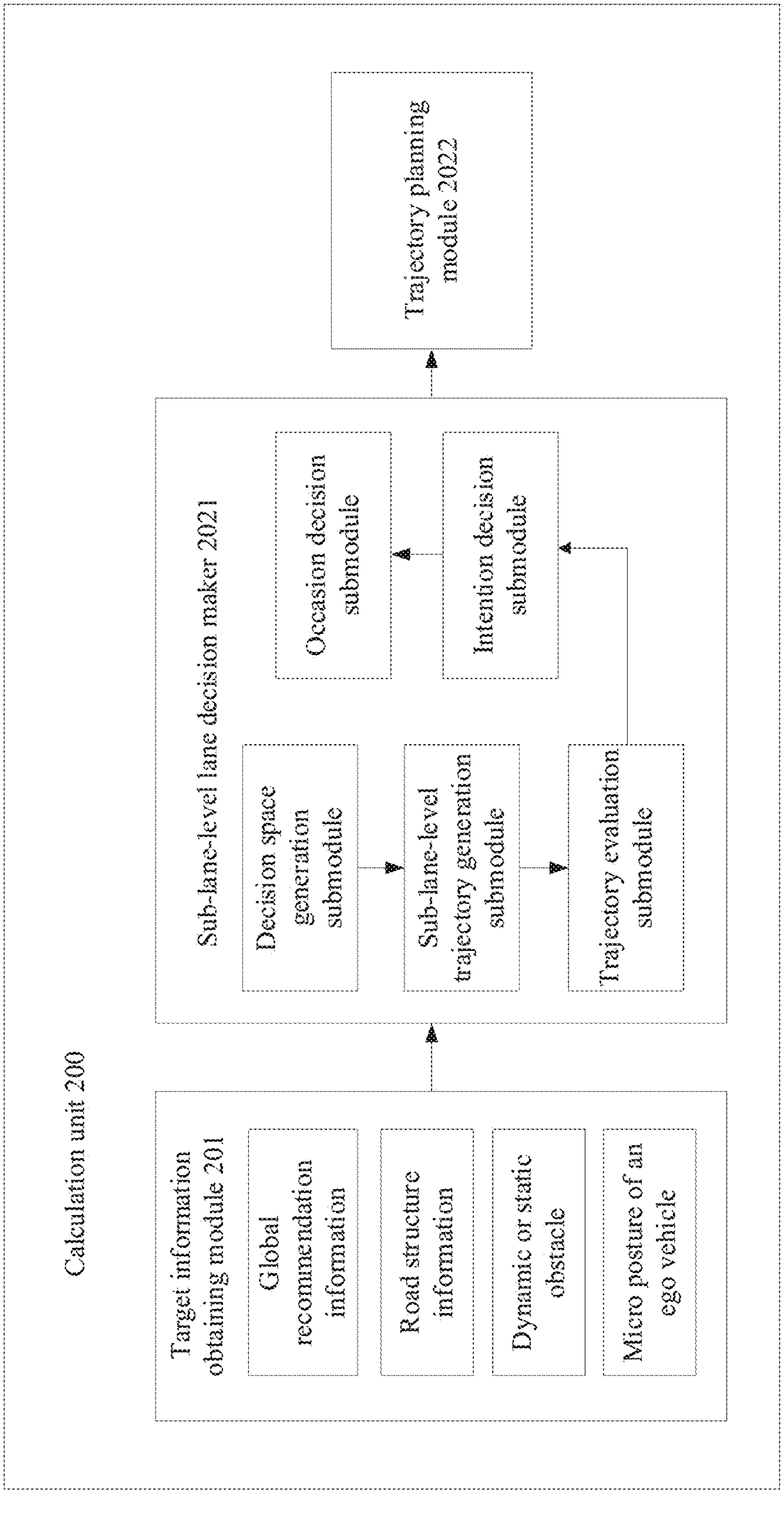
FIG. 20*b* is another schematic diagram of a structure of a calculation unit according to an embodiment of this application.

Based on the diagram of the structure of the calculation unit shown in FIG. 20*a*, the target information obtaining module 201 and the sub-lane-level trajectory planning module 202 are subdivided, to obtain a diagram of a structure of the calculation unit shown in FIG. 20*b*. In the structure, the calculation unit 200 includes the target information obtaining module 201, a sub-lane-level lane decision maker 2021, and a trajectory planning module 2022. The target information obtaining module 201 is the target information obtaining module 201 in FIG. 19, and the sub-lane-level lane decision maker 2021 and the trajectory planning module 2022 correspond to the sub-lane-level trajectory planning module 202. The following describes the three modules separately.

(1). Target Information Obtaining Module

The target information obtaining module 201 is configured to obtain target information in a driving process of a target vehicle, where the target information indicates a current driving status and road condition information of the target vehicle. The module is configured to complete step 201 in the embodiment shown in FIG. 2 or step 401 in the embodiment shown in FIG. 4.

(2). Sub-Lane-Level Lane Decision Maker 2021

The sub-lane-level lane decision maker is configured to plan a sub-lane-level trajectory based on the target information from the target information obtaining module. In some embodiments, the sub-lane-level lane decision maker includes five submodules: a decision space generation submodule, a sub-lane-level trajectory generation submodule, a trajectory evaluation submodule, an intention decision submodule, and an occasion decision submodule. The following describes the five modules.

(2.1). Decision Space Generation Submodule

The decision space generation submodule is configured to determine decision space, and complete steps 402 and 403 in the embodiment shown in FIG. 4.

(2.2). Sub-Lane-Level Trajectory Generation Submodule

The sub-lane-level trajectory generation submodule is configured to determine the sub-lane-level trajectory in the decision space, and complete steps 404 and 405 in the embodiment shown in FIG. 4.

(2.3). Trajectory Evaluation Submodule

The trajectory evaluation submodule is configured to evaluate the sub-lane-level trajectory to obtain an evaluation result of each sub-lane-level trajectory, and complete step 406 in the embodiment shown in FIG. 4.

(2.4). Intention Decision Submodule

The intention decision submodule is configured to select an optimal candidate trajectory from a plurality of candidate trajectories based on the evaluation result obtained by the trajectory evaluation submodule, and generate a lane decision policy corresponding to the optimal candidate trajectory, where the lane decision policy includes a motion intention. The motion intention may include an action corresponding to the sub-lane-level trajectory such as lane changing preparation, lane changing, lane changing cancellation, lane changing keeping, lane keeping, and lane deviation. The intention decision submodule is configured to complete step 407 in the embodiment shown in FIG. 4.

(2.5). Occasion Decision Submodule

The occasion decision submodule is configured to determine, based on the lane decision policy obtained by the intention decision submodule, a motion occasion for implementing each action in the motion intention, to complete step 408 in the embodiment shown in FIG. 4. The motion intention may include an action corresponding to the sub-lane-level trajectory such as lane changing preparation, lane changing, lane changing cancellation, lane changing keeping, lane keeping, and lane deviation.

(3). Trajectory Planning Module 2022

The trajectory planning module is configured to determine, based on the motion intention and the motion occasion that are generated by the sub-lane-level lane decision maker, a planned trajectory for implementing the motion intention, to complete step 409 in the embodiment shown in FIG. 4.

The calculation unit 200 is configured to implement the sub-lane-level trajectory planning methods shown in FIG. 2 to FIG. 19*b*.

The foregoing describes the calculation unit for implementing the sub-lane-level trajectory planning method provided in this application. The following describes a trajectory planning apparatus for implementing the sub-lane-level trajectory planning method.

Figure 21:
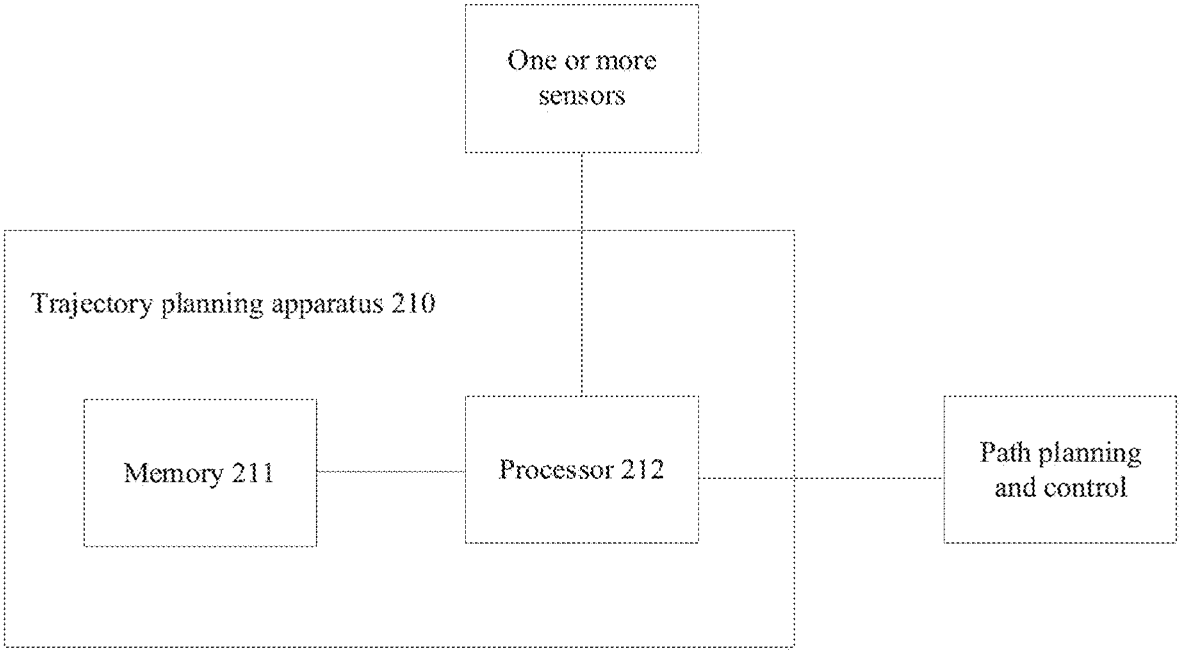
FIG. 21 is a schematic diagram of a structure of a trajectory planning apparatus according to an embodiment of this application.

FIG. 21 is a block diagram of a structure of a trajectory planning apparatus 210 according to an embodiment of the present invention. As shown in FIG. 21, the trajectory planning apparatus 210 includes a memory 211 and a processor 212. The memory 211 stores computer program instructions, and the processor 212 runs the computer program instructions to perform a related operation of sub-lane-level trajectory planning described in the embodiments. The processor 212 is further connected to one or more sensors outside the trajectory planning apparatus 210, and receives raw data of a target vehicle and a surrounding environment. The sensor includes but is not limited to a camera, a laser radar, an ultrasonic radar, or a millimeter wave radar. A trajectory planning result output by the trajectory planning apparatus 210 is generally sent to a path planning and control module of an intelligent driving vehicle, to provide vehicle control reference information. The path planning and control module may be a software module executed by the processor 212 or integrated into the processor 212. This is not limited in this embodiment. The processor 212 includes but is not limited to various central processing units (central processing units, CPUs), a DSP, a microcontroller, a microprocessor, or an artificial intelligence processor.

The trajectory planning apparatus 210 is configured to implement the sub-lane-level trajectory planning methods shown in FIG. 2 to FIG. 19*b*.

Figure 22:
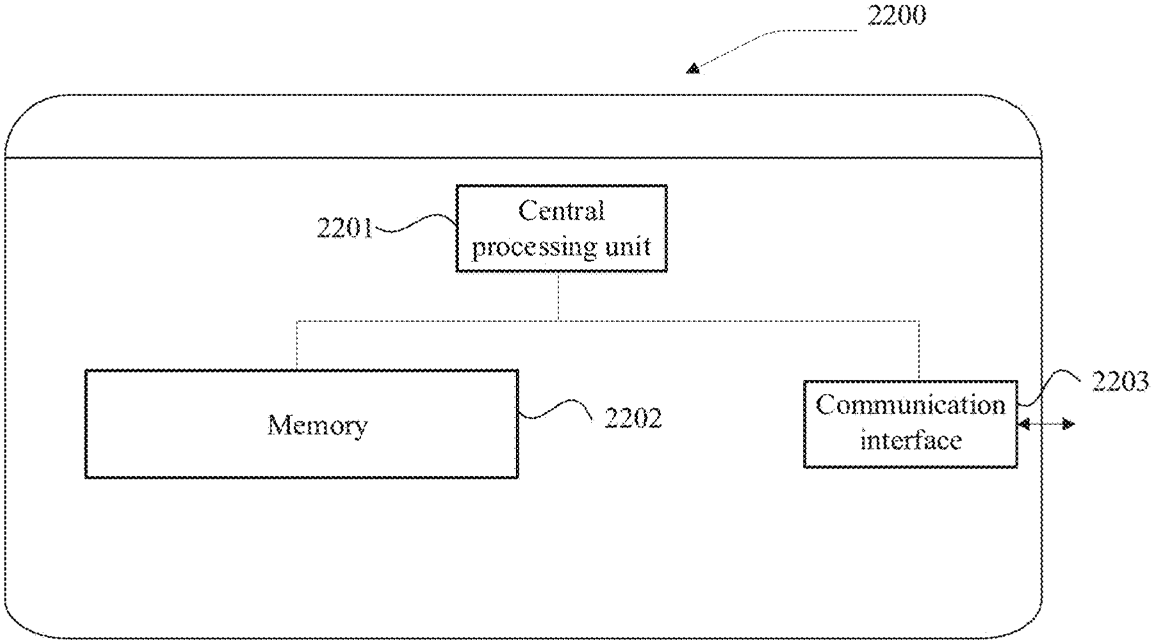
FIG. 22 is another schematic diagram of a structure of a trajectory planning apparatus according to an embodiment of this application.

FIG. 22 is a schematic diagram of a structure of a trajectory planning apparatus according to an embodiment of this application. The trajectory planning apparatus 2200 may include one or more CPUs 2201 and a memory 2202, and the memory 2202 stores one or more application programs or data.

The memory 2202 may be volatile storage or persistent storage. The program stored in the memory 2202 may include one or more modules, and each module may include a series of instruction operations for the trajectory planning apparatus. Further, the central processing unit 2201 may be configured to communicate with the memory 2202, and execute, on the trajectory planning apparatus 2200, the series of instruction operations in the memory 2202.

The trajectory planning apparatus 2200 may further include one or more communication interfaces 2203, and/or one or more operating systems, such as a Windows Server™, Mac OS X™, Unix™, Linux™ and FreeBSD™.

The trajectory planning apparatus 2200 may perform operations performed by the calculation unit in the embodiments shown in FIG. 2 to FIG. 19*b*. Details are not described herein again.

An embodiment of this application further provides a computer program product. When the computer program product is run on a computer, the computer is enabled to perform the steps performed by the calculation unit in the methods described in the embodiments shown in FIG. 2 to FIG. 19*b*.

An embodiment of this application further provides a computer-readable storage medium. The computer-readable storage medium stores a program for signal processing. When the program is run on a computer, the computer is enabled to perform the steps performed by the calculation unit in the methods described in the embodiments shown in FIG. 2 to FIG. 19*b*.

In some embodiments, the data processing apparatus provided in embodiments of this application may be a chip. The chip includes a processing unit and a communication unit. The processing unit may be, for example, a processor, and the communication unit may be, for example, an input/output interface, a pin, or a circuit. The processing unit may execute computer executable instructions stored in a storage unit, so that the chip in the training device performs the steps performed by the calculation unit in the methods described in the embodiments shown in FIG. 2 to FIG. 19*b*. In some embodiments, the storage unit is a storage unit in the chip, such as a register or a cache. Alternatively, the storage unit may be a storage unit that is outside the chip and that is in a wireless access device, such as a read-only memory (read-only memory, ROM for short) or another type of static storage device that can store static information and instructions, or a random access memory (RAM).

It may be clearly understood by a person skilled in the art that, for convenient and brief description, for a detailed working process of the foregoing system, apparatus, and unit, refer to a corresponding process in the foregoing method embodiments. Details are not described herein again.

In the several embodiments provided in this application, it can be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory ROM, a random access memory RAM, a magnetic disk, or an optical disc.

What is claimed is:

1. A trajectory planning method performed by a target vehicle, the method comprises:

obtaining target information comprising at least one of a driving status of the target vehicle and first road condition information; and determining a first planned trajectory of the target vehicle based on the target information, wherein the first planned trajectory comprises a target trajectory parallel to a center line of a lane, and the target trajectory is located in an area between the center line of the lane and a boundary of the lane, or on the boundary, wherein the target trajectory is configured to provide an intermediate transition from a first lane to a second lane adjacent to the first lane in a lane changing process, wherein the first lane is a lane on which the target vehicle is currently located, wherein the intermediate transition comprises driving the target vehicle along the target trajectory parallel to the center line of the lane to maintain a distance from a center line of the second lane prior to determining a next action in the lane changing process.

2. The method according to claim 1, wherein the driving status comprises a driving route of the target vehicle, and the first road condition information comprises one or more of motion information of at least one obstacle or the target lane; and wherein determining the first planned trajectory of the target vehicle based on the target information comprises:

determining the first planned trajectory based on the motion information of the at least one obstacle, wherein the first planned trajectory indicates the target vehicle to drive to the target trajectory, and the target trajectory is on a lane on which the at least one obstacle is located or the target lane, or the target trajectory is on a lane adjacent to a lane on which the at least one obstacle is located or the target lane.

3. The method according to claim 1, wherein the first road condition information comprises a first lane on which the target vehicle is currently located, the second lane, and motion information of a first obstacle on the second lane, the driving status comprises that the target vehicle drives along a lane changing trajectory, and the lane changing trajectory points from the first lane to the second lane; and wherein determining the first planned trajectory of the target vehicle based on the target information comprises:

determining the first planned trajectory as a lane changing keeping trajectory based on the motion information of the first obstacle, wherein the lane changing keeping trajectory comprises the target trajectory, the lane changing keeping trajectory indicates the target vehicle to drive to the target trajectory, and the target trajectory is between a center line of the first lane and a center line of the second lane.

4. The method according to claim 3, wherein after determining the first planned trajectory as the lane changing keeping trajectory, the method further comprises:

controlling, based on the lane changing keeping trajectory, the target vehicle to drive to the target trajectory;

obtaining second road condition information of the target vehicle; and determining a second planned trajectory of the target vehicle based on the second road condition information, wherein the second planned trajectory indicates the target vehicle to change a lane from the target trajectory to the second lane.

5. The method according to claim 1, wherein the first road condition information comprises the driving route of the target vehicle and motion information of a second obstacle, the second obstacle is located on a first side of the driving route, and the driving route is parallel to the center line of the lane; and wherein the determining a first planned trajectory of the target vehicle based on the target information comprises:

determining the first planned trajectory as a lane deviation trajectory based on the motion information of the second obstacle, wherein the lane deviation trajectory comprises a deviation trajectory and the target trajectory, the deviation trajectory indicates the target vehicle to turn to a second side until the target vehicle drives to the target trajectory, the second side and the first side are on different sides of the driving route.

6. The method according to claim 5, wherein the first road condition information comprises motion information of a third obstacle, and the third obstacle is located on the second side of the driving route; and wherein the determining the first planned trajectory as a lane deviation trajectory based on the motion information of the second obstacle comprises:

determining the first planned trajectory as the lane deviation trajectory based on the motion information of the second obstacle and the third obstacle, wherein the lane deviation trajectory indicates the target vehicle to turn to the second side along the deviation trajectory until the target vehicle drives to the target trajectory, wherein the target trajectory is on the second side of the second obstacle and the first side of the third obstacle, wherein the second side and the first side are on different sides of the driving route.

7. The method according to claim 5, wherein the first road condition information comprises motion information of a fourth obstacle, and the fourth obstacle is located in front of the target vehicle on the driving route; and the determining the first planned trajectory as a lane deviation trajectory based on the motion information of the second obstacle comprises:

determining the first planned trajectory as the lane deviation trajectory based on the motion information of the second obstacle and the fourth obstacle, wherein the lane deviation trajectory indicates the target vehicle to turn to the second side along the deviation trajectory until the target vehicle drives to the target trajectory, wherein the target trajectory is on the second side of the second obstacle and the second side of the fourth obstacle, wherein the second side and the first side are on different sides of the driving route.

8. The method according to claim 6, wherein the first road condition information comprises motion information of a fourth obstacle, and the fourth obstacle is located in front of the target vehicle on the driving route; and the determining the first planned trajectory as a lane deviation trajectory based on the motion information of the second obstacle comprises:

determining the first planned trajectory as the lane deviation trajectory based on the motion information of the second obstacle, the third obstacle, and the fourth obstacle, wherein the lane deviation trajectory indicates:

the target vehicle to drive along the deviation trajectory to the target trajectory, wherein the target trajectory is on the second side of the second obstacle, the second side of the fourth obstacle, and the first side of the third obstacle, or the target vehicle to drive to a first target trajectory in the target trajectory, and then drive to a second target trajectory in the target trajectory, wherein the first target trajectory is on the second side of the second obstacle, the second side of the fourth obstacle, and the first side of the third obstacle, and the second target trajectory is on the second side of the second obstacle, the second side of the fourth obstacle, and the first side of the third obstacle.

9. The method according to claim 5, wherein the first road condition information comprises the motion information of the second obstacle and motion information of a fourth obstacle, the second obstacle is located on the first side of the driving route, the fourth obstacle is located in front of the target vehicle on the driving route; and the determining the first planned trajectory as a lane deviation trajectory comprises:

determining the first planned trajectory as the lane deviation trajectory based on the first road condition information, wherein the lane deviation trajectory comprises a first deviation trajectory, the target trajectory, and a second deviation trajectory, and the lane deviation trajectory indicates the target vehicle to drive along the first deviation trajectory to the target trajectory, and then drive along the second deviation trajectory to the front of the fourth obstacle on the driving route, and wherein the target trajectory is on the second side of the second obstacle and the first side of the fourth obstacle.

10. The method according to claim 9, wherein the driving route is located on a start lane different from the target lane, the lane deviation trajectory further comprises the lane changing trajectory, the lane changing trajectory indicates the target vehicle to turn from the target trajectory to the target lane.

11. The method according to claim 1, wherein determining the first planned trajectory of the target vehicle based on the target information comprises:

determining a plurality of candidate trajectories of the target vehicle based on the target information; and determining the first planned trajectory from the plurality of candidate trajectories based on at least one of: deviation degrees of points on the plurality of candidate trajectories from the center line of the lane, curvature of the plurality of candidate trajectories, switching degrees of the plurality of candidate trajectories relative to a current trajectory, and a degree of deviation between a lane on which the target trajectory is located and a lane on which the driving route of the target vehicle is located.

12. The method according to claim 1, wherein determining the first planned trajectory of the target vehicle based on the target information comprises:

determining an action sequence based on the target information, wherein the action sequence comprises at least one action and an action time sequence between the at least one action; and determining the first planned trajectory for implementing the action sequence.

13. An apparatus configured to determine a planned trajectory for a target vehicle, and the apparatus comprises:

at least one processor; and a memory coupled to the at least one processor and storing programming instructions for execution by the at least one processor to perform operations comprising:

obtaining target information comprising at least one of a driving status of the target vehicle and first road condition information; and determining a first planned trajectory of the target vehicle based on the target information, wherein the first planned trajectory comprises a target trajectory parallel to a center line of a lane, and the target trajectory is located in an area between the center line of the lane and a boundary of the lane, or on the boundary, wherein the target trajectory is configured to provide an intermediate transition from a first lane to a second lane adjacent to the first lane in a lane changing process, wherein the first lane is a lane on which the target vehicle is currently located, wherein the intermediate transition comprises driving the target vehicle along the target trajectory parallel to the center line of the lane to maintain a distance from a center line of the second lane prior to determining a next action in the lane changing process.

14. The apparatus according to claim 13, wherein the driving status comprises a driving route of the target vehicle, and the first road condition information comprises one or more of motion information of at least one obstacle or the target lane; and wherein determining the first planned trajectory of the target vehicle based on the target information comprises:

determining the first planned trajectory based on the motion information of the at least one obstacle, wherein the first planned trajectory indicates the target vehicle to drive to the target trajectory, and the target trajectory is on a lane on which the at least one obstacle is located or the target lane, or the target trajectory is on a lane adjacent to a lane on which the at least one obstacle is located or the target lane.

15. The apparatus according to claim 13, wherein the first road condition information comprises a first lane on which the target vehicle is currently located, the second lane, and motion information of a first obstacle on the second lane, the driving status comprises that the target vehicle drives along a lane changing trajectory, and the lane changing trajectory points from the first lane to the second lane; and wherein determining the first planned trajectory of the target vehicle based on the target information comprises:

determining the first planned trajectory as a lane changing keeping trajectory based on the motion information of the first obstacle, wherein the lane changing keeping trajectory comprises the target trajectory, the lane changing keeping trajectory indicates the target vehicle to drive to the target trajectory, and the target trajectory is between a center line of the first lane and a center line of the second lane.

16. The apparatus according to claim 15, wherein the operations further comprising:

controlling, based on the lane changing keeping trajectory, the target vehicle to drive to the target trajectory;

obtaining second road condition information of the target vehicle; and determining a second planned trajectory of the target vehicle based on the second road condition information, wherein the second planned trajectory indicates the target vehicle to change a lane from the target trajectory to the second lane.

17. The apparatus according to claim 13, wherein the first road condition information comprises the driving route of the target vehicle and motion information of a second obstacle, the second obstacle is located on a first side of the driving route, and the driving route is parallel to the center line of the lane; and wherein determining the first planned trajectory of the target vehicle based on the target information comprises:

determining the first planned trajectory as a lane deviation trajectory based on the motion information of the second obstacle, wherein the lane deviation trajectory comprises a deviation trajectory and the target trajectory, the deviation trajectory indicates the target vehicle to turn to a second side until the target vehicle drives to the target trajectory, the second side and the first side are on different sides of the driving route.

18. The apparatus according to claim 17, wherein the first road condition information comprises motion information of a third obstacle, and the third obstacle is located on the second side of the driving route; and wherein determining the first planned trajectory as the lane deviation trajectory based on the motion information of the second obstacle comprises:

determining the first planned trajectory as the lane deviation trajectory based on the motion information of the second obstacle and the third obstacle, wherein the lane deviation trajectory indicates the target vehicle to turn to the second side along the deviation trajectory until the target vehicle drives to the target trajectory, wherein the target trajectory is on the second side of the second obstacle and the first side of the third obstacle, wherein the second side and the first side are on different sides of the driving route.

19. The apparatus according to claim 17, wherein the first road condition information comprises motion information of a fourth obstacle, and the fourth obstacle is located in front of the target vehicle on the driving route; and wherein determining the first planned trajectory as the lane deviation trajectory based on the motion information of the second obstacle comprises:

determining the first planned trajectory as the lane deviation trajectory based on the motion information of the second obstacle and the fourth obstacle, wherein the lane deviation trajectory indicates the target vehicle to turn to the second side along the deviation trajectory until the target vehicle drives to the target trajectory, wherein the target trajectory is on the second side of the second obstacle and the second side of the fourth obstacle.

20. A computer program product comprising computer-executable instructions stored on a non-transitory computer-readable storage medium that, when executed by a processor, cause an apparatus to:

obtaining target information comprising at least one of a driving status of a target vehicle and first road condition information; and determining a first planned trajectory of the target vehicle based on the target information, wherein the first planned trajectory comprises a target trajectory parallel to a center line of a lane, and the target trajectory is located in an area between the center line of the lane and a boundary of the lane, or on the boundary, wherein the target trajectory is configured to provide an intermediate transition from a first lane to a second lane adjacent to the first lane in a lane changing process, wherein the first lane is a lane on which the target vehicle is currently located, wherein the intermediate transition comprises driving the target vehicle along the target trajectory parallel to the center line of the lane to maintain a distance from a center line of the second lane prior to determining a next action in the lane changing process.

* * * * *